(12) United States Patent
Irani et al.

(10) Patent No.: US 9,495,021 B2
(45) Date of Patent: Nov. 15, 2016

(54) COMPUTER INPUT DEVICE

(71) Applicant: University of Manitoba, Winnipeg (CA)

(72) Inventors: Pourang Irani, Winnipeg (CA); Kang Shi, Winnipeg (CA); Jared Cechanowicz, Winnipeg (CA); Sriram Subramanian, Eindhoven (NL)

(*) Notice: Subject to any disclaimer, the term of this patent is extended or adjusted under 35 U.S.C. 154(b) by 36 days.

(21) Appl. No.: 14/562,903

(22) Filed: Dec. 8, 2014

(65) Prior Publication Data
US 2015/0153847 A1 Jun. 4, 2015

Related U.S. Application Data

(63) Continuation of application No. 12/597,684, filed as application No. PCT/CA2008/000791 on Apr. 28, 2008, now abandoned.

(60) Provisional application No. 60/914,114, filed on Apr. 26, 2007.

(51) Int. Cl.
*G06F 3/0354* (2013.01)
*G06F 3/038* (2013.01)

(52) U.S. Cl.
CPC ......... *G06F 3/03543* (2013.01); *G06F 3/038* (2013.01); *G06F 2203/04105* (2013.01)

(58) Field of Classification Search
CPC .................................................. G06F 3/03543
See application file for complete search history.

(56) References Cited

U.S. PATENT DOCUMENTS

| | | | |
|---|---|---|---|
| 5,699,082 A * | 12/1997 | Marks | G06F 3/0338 345/157 |
| 7,619,616 B2 * | 11/2009 | Rimas Ribikauskas | G06F 3/04847 178/18.01 |
| 2006/0274042 A1 * | 12/2006 | Krah | G06F 3/03543 345/163 |

* cited by examiner

*Primary Examiner* — Lixi C Simpson
*Assistant Examiner* — Ngan T Pham Lu
(74) *Attorney, Agent, or Firm* — Ryan W. Dupuis; Kyle R. Satlerthwaite; Ade & Company Inc.

(57) ABSTRACT

The use of a uni-pressure and dual-pressure augmented mouse permits users to simultaneously control cursor positions as well as multiple levels of discrete action modes for common desktop application tasks. One, two or more independent pressure sensors can be mounted onto several locations on the body of the mouse. Various selection techniques are described to control many discrete levels and to simultaneously control different variable functions with pressure sensors on an input device for an electronic device.

16 Claims, 13 Drawing Sheets

$$R = (l-1)*(r/a) + r$$

R : pressure range, r: fisheye radius l: number of levels, a: position of the cursor in current level

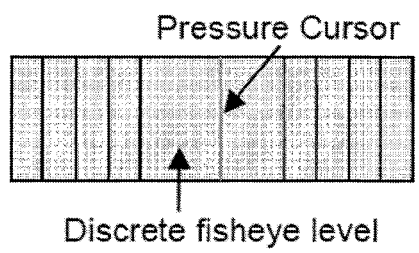
FIG. 11a
FIG. 11b
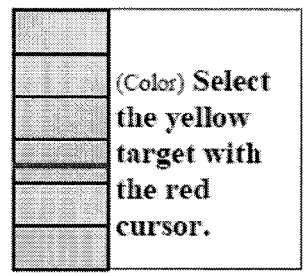
FIG. 12
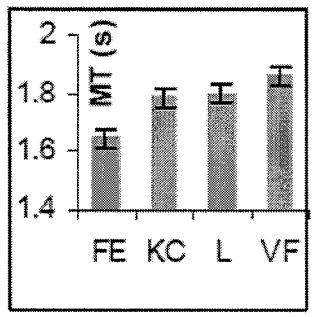
(a)
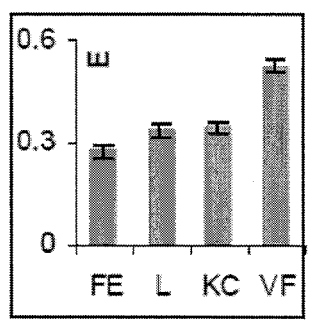
(b)
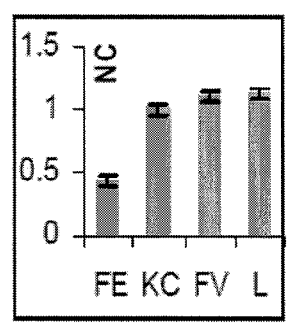
(c)
FIG. 13
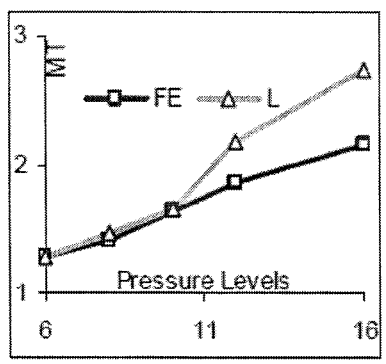
FIG. 14(a)
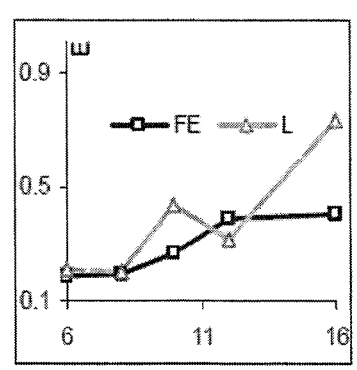
FIG. 14(b)

 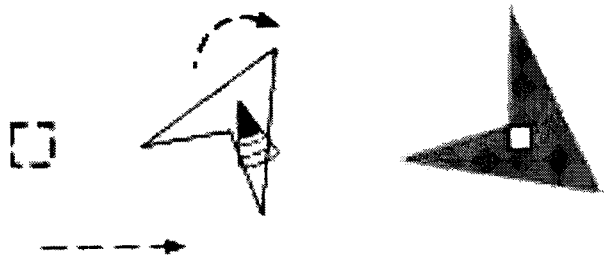
FIG. 15(a)  FIG. 15(b)
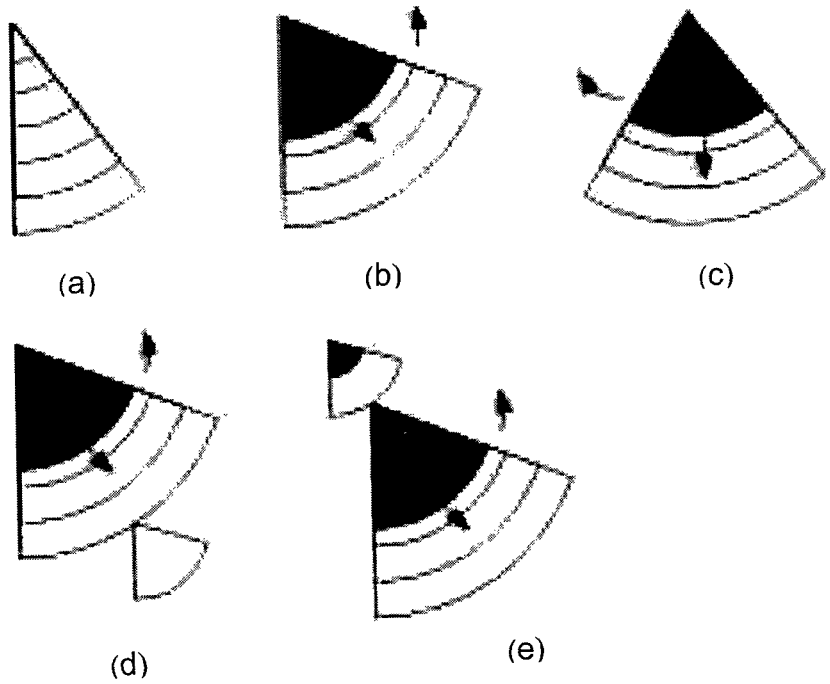
FIGURE 16

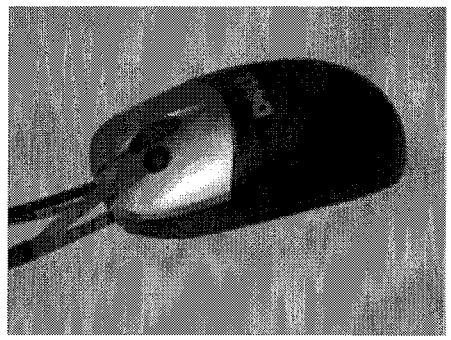 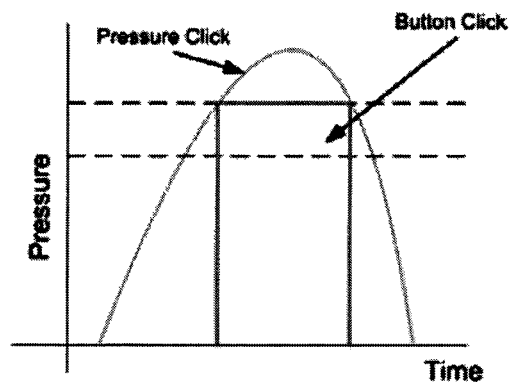
FIG. 24(a)　　　　　　　　　FIG. 24(b)
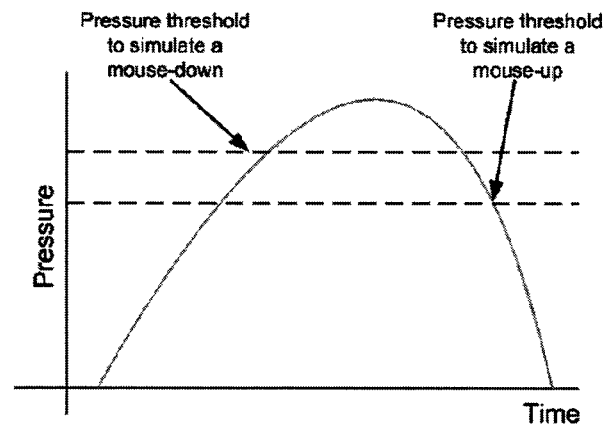
FIG. 25
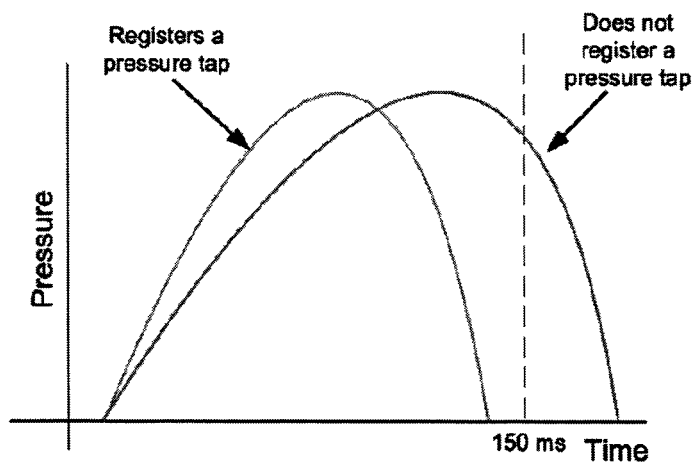
FIG. 26

COMPUTER INPUT DEVICE

FIELD OF THE INVENTION

The present invention relates to an input device for an electronic device, for example a computer, and more particularly relates to a computer input device having one or more pressure sensitive switches arranged to generate a range of pressure values corresponding to different pressures being applied by a user.

BACKGROUND

What seems to be a natural addition to the next generation of mice is apparent in Apple's MightyMouse™ [10] in which two pressure buttons are available on each side of the mouse. Although, pressure based input is featured in many digitizers and TabletPCs and has been widely studied [3,11, 15,16], little is known about the limitations to pressure based input using a mouse. This lack of knowledge may explain why the pressure buttons available on the MightyMouse™ do not supply continuous pressure values and operate similar to a two-state button. One possible reason is that there is not sufficient knowledge on the limitations and benefits of a pressure augmented input with a mouse.

Designers can naively augment a mouse by adding a pressure sensor to a fixed location on the mouse. This approach, while providing an additional input dimension to most mouse-based interactions, can also be limiting. The location of the sensor may not be appropriate for interacting with some of the major features of a mouse, such as clicking. Additionally, a poorly augmented mouse would restrict users to a limited number of pressure levels [11,15]. Furthermore, selection mechanisms would be limited to the current methods for selecting pressure values, such as quick release or dwell [15]. Finally, a simple augmentation may not facilitate bi-directional pressure input (where pressure control starts at 0 and moves to a higher pressure and the reverse).

Understanding the limitations and benefits of pressure based input with a mouse can allow designers to augment the mouse with pressure sensors (FIG. 1) and utilize the augmented device in a variety of novel contexts. To effectively harness the potential of a pressure augmented mouse designers need to know where to mount the pressure sensors on the mouse, create some mechanisms for controlling pressure input, and identify methods for selecting a pressure value.

RELATED LITERATURE

We review the literature in two related areas: augmented mice and pressure-based interaction.
Augmented Mice The traditional two-button mouse has been augmented in numerous ways such as by adding multiple buttons, by providing tactile feedback or by serving as a device with more than two degrees-of-freedom.

Manufacturers continue to add buttons to the mouse. Multiple secondary buttons make certain tasks easier but they require that users remember the mappings between the button and its function and in some cases require repositioning the fingers to facilitate input. The scroll wheel is a variation of a button that allows users to scroll vertically or horizontally in a window. Studies show that the scroll wheel is particularly useful in navigating through long documents [5,20].

The tactile mouse [1] contains a small actuator that makes the mouse vibrate under certain conditions. This form of feedback can inform the user when the cursor is moving into different areas of a window or when the user is crossing window boundaries. Akamatstu et al. [1] conducted a study to compare the effect of tactile feedback in a mouse with visual and auditory feedback. Their results show that users complete selection tasks better with tactile feedback over visual and auditory conditions [1].

The Rockin'Mouse [2] augments the mouse with tilt sensors. The Rockin'Mouse has a rounded bottom which allows users to tilt it and control objects in 3D. Balakrishnan et al. [21 show that in a 3D object positioning task users were 30% with the Rockin'Mouse over the conventional mouse.

The VideoMouse (61 augmented the mouse by adding a video camera as its input sensor. In the VideoMouse a real-time vision algorithm determines the six degree-of-freedom mouse position, which consists of x-y motion, tilts in the forward/backward and left/right axes, rotation of the mouse around the z-axis and limited height sensing. As a result the VideoMouse facilitates a number of 3D manipulation tasks.

MacKenzie et al. [9] designed a two-ball mouse by adding an additional ball to capture angular movement along the z-axis. The angular motion is computed based on simple calculations on the two sets of x-y displacement data. This enhancement makes rotation tasks easier to perform.

Siio et al. [17] introduced the FieldMouse which augments the mouse with an ID recognizer similar to a barcode reader. With the FieldMouse, users can interact with virtual objects using any flat surface that is embedded with ID recognizers, such as a paper book.
Pressure Based Interaction Numerous studies have proposed novel interaction techniques or investigated different applications and offered guidelines for working with pressure based input.

Ramos et al. [15] explored the design space of pressure based interaction with styluses. They proposed a set of pressure widgets that operate based on the users' ability to effectively control a discrete set of pressure values. Ramos et al. [15] identified that adequate control of pressure values is tightly coupled to a fixed number of discrete pressure levels (six maximum levels), the type of selection mechanism and a high degree of visual feedback, However, their results are mainly applicable to the use of pressure based input on a stylus and they did not examine the design space resulting from more than one pressure sensor.

Mizobuchi et al. (11] conducted a study to investigate how accurately people control pressure exerted on a pen-based device. Their results show that continuous visual feedback is better than discrete visual feedback, users can better control forces that are smaller than 3N, and 5 to 7 levels of pressure are appropriate for accurate discrimination and control of input values. Their results apply to pen based pressure and they do not investigate multi-pressure input.

Isometric input devices are common and use pressure based input to control the mouse cursor speed. The pointing stick is a pressure sensitive nub used like, a joystick on laptops. Users decrease or increase the amount of force on the nub to control the velocity of the mouse cursor. Similarly, the PalmMouse™ [12] allows users to control cursor speed by applying a slight amount of pressure to a navigation dome which is placed on the top of the mouse. Both examples map pressure input to the speed of the cursor.

Researchers studied pressure input in the context of multilevel interaction. Zeleznik et al. [19] proposed an additional "pop-through" state to the mechanical operation of the mouse button. As a result, a number of techniques can take advantage of a soft-press and a hard-press on a pop-through button. Forlines et al. [4] proposed an intermediary "glimpse" state to facilitate various editing tasks. With glimpse users can preview the effects of their editing without executing any commands. Multi-level input can facilitate navigation, editing or selection tasks but utilize pressure input in a limited way.

Touch-pads that sense pressure are widespread input devices in notebooks or portable music players. Blasko and Feiner [3] proposed multiple pressure-sensitive strips by segmenting a touchpad into different regions. They show that pressure-sensitive strips do not require visual feedback and users can control a large number of widgets using their fingers. Rekimoto and Schwesig [16] propose a touchpad based pressure sensing device called PreSenseII that recognizes position, contact area and pressure of a user's finger. PreSenseII eliminates the need for visual feedback by providing tactile feedback on the amount of pressure being applied. Unlike many of the previously discussed pressure based mechanisms, PreSenseII allows users to control bi-directional pressure input (i.e. from 0 to the highest pressure level as well as the reverse).

SUMMARY OF THE INVENTION

According to one aspect of the invention there is provided an input device for an electronic device comprising:
 a housing;
 electronic circuitry in the housing arranged to detect user inputs and generate control signals corresponding to said user inputs to be transmitted to the electronic device;
 the electronic circuitry comprising:
  a first switch arranged to generate a first control signal when depressed by the user;
  a second switch arranged to generate a second control signal when depressed by the user;
  at least the second switch comprising a pressure sensitive switch arranged to generate continuous pressure values in at least two different identifiable discrete pressure ranges corresponding to different pressures being applied by the user in depressing the pressure sensitive switch.

When the input device is used with a computer including a plurality of sequential selection items to be selected in a range from a first selection item to a last selection item, each discrete pressure range of the pressure sensitive switch preferably corresponds to one of the selection items. Accordingly increasing pressure applied to the pressure sensitive switch advances the selection item being selected towards the last selection item and reducing pressure applied to the pressure sensitive switch returns the selection item being selected towards the first selection item.

In some embodiments, the first switch accompanying the pressure sensitive switch comprises a two state button which is not sensitive to different applied pressures.

The first control signal generated by the first switch may be arranged to confirm entry to the computer of a selected one of the discrete pressure ranges of the second switch. Other method of confirming entry to the computer of the selected one of the discrete pressure ranges include dwelling in the pressure range or rapidly removing pressure from the pressure sensitive switch.

The combination of switches described herein is well suited for use with a computer mouse comprising a housing which is generally arranged to be received in a palm of a hand of a user and electronic circuitry which includes a tracking mechanism arranged to generate control signals in response to relative movement between the housing and a supporting surface receiving the housing thereon. In this instance, the switches are preferably arranged to be readily accessible by fingers of the user when the housing is received in the palm of the hand of the user.

When the first switch accompanying the pressure sensitive switch is a two state switch, it is preferably arranged to be actuated by an index finger of the user, while the pressure sensitive switch is arranged to be actuated by either a middle finger or a thumb of the user.

When using the input device with a computer comprising a plurality of sequential selection items arranged in a plurality of groups, the pressure sensitive switch is preferably arranged to generate both:
 i) an advancing control signal arranged to advance selection of one group through the plurality of groups when the pressure sensitive switch is momentarily depressed; and
 ii) control signals in the form of continuous pressure values wherein the discrete pressure ranges are arranged to correspond to the selection items of the selected group when continuous pressure is applied to the pressure sensitive switch for selecting one of the selection items within the selected group.

When the electronic circuitry comprises two pressure sensitive switches, both are preferably arranged similarly to one another but the advancing control signals are preferably in opposing directions relative to one another when the switches are momentarily depressed.

In some embodiments, both the first switch and the second switch comprise a pressure sensitive switch arranged to generate continuous pressure values in at least two different identifiable discrete pressure ranges corresponding to different pressures being applied by the user in depressing the pressure sensitive switch.

The two pressure sensitive switches may also be combined with a computer mouse including a tracking mechanism to track relative movement of the mouse and one or more two-state switches for confirming entry of selections to the computer. In this instance, one of the pressure sensitive switches is preferably arranged to be readily accessible by a middle finger of the user, and the other one of the pressure sensitive switches is preferably arranged to be readily accessible by a thumb of the user in the normal operating position of the mouse.

When used with a computer comprising a plurality of sequential selection items arranged in a plurality of groups, the first switch is preferably arranged to generate an advancing control signal arranged to advance selection of one selected group through the plurality of groups when the first switch is momentarily depressed. In this instance, the discrete pressure ranges of the pressure sensitive switch are preferably arranged to correspond to the selection items of the selected group when continuous pressure is applied to the pressure sensitive switch for selecting one of the selection items within the selected group.

When used with a computer comprising a plurality of sequential selection items arranged in cascading levels, the discrete pressure ranges of the pressure sensitive switches are preferably arranged to correspond to the selection items of alternating cascading levels. Within each level, continuous pressure may be applied to the pressure sensitive switch for selecting one of the selection items within a selected level. Switching applied pressure between the two pressure switches is preferably arranged to generate a control signal which confirms entry to the computer of the selected item within each level to proceed to selection of items within the next cascading level.

According to a second aspect of the present invention there is provided an input device for an electronic device comprising a pressure sensitive switch arranged to generate continuous pressure values over a range of pressure values to be transmitted to the electronic device, the improvement comprising:

a discretization function arranged to divide the range of pressure values into discrete pressures units according to the following equation:

$$y = \begin{cases} \text{floor}\left(\frac{(x-r)*(l-1)}{R-r}\right) + 1 & x > r - \frac{R-r}{l-1} \\ 0 & x \leq r - \frac{R-r}{l-1} \end{cases}$$

where x is the raw pressure value from the pressure switch, l is the number of pressure ranges, r is the fisheye radius, and R is the total number of raw pressure values.

According to a further aspect of the present invention there is provided an input device for an electronic device including a plurality of sequential selection items to be selected in a range from a first selection item to a last selection item, the input device comprising:

a housing;

electronic circuitry in the housing arranged to detect user inputs and generate control signals corresponding to said user inputs to be transmitted to the electronic device;

the electronic circuitry comprising a pressure switch arranged to generate a control signal comprising continuous pressure values in at least two different identifiable discrete pressure ranges corresponding to different pressures being applied by the user in depressing the pressure sensitive switch;

each discrete pressure range of the pressure sensitive switch corresponding to one of the selection items;

the electronic circuitry being arranged such that increasing pressure applied to the pressure sensitive switch advances the selection item being selected towards the last selection item and reducing pressure applied to the pressure sensitive switch returns the selection item being selected towards the first selection item.

According to a further aspect of the present invention there is provided an input device for an electronic device comprising a plurality of sequential selection items arranged in a plurality of groups, the input device comprising:

a housing;

electronic circuitry in the housing arranged to detect user inputs and generate control signals corresponding to said user inputs to be transmitted to the electronic device;

the electronic circuitry comprising a pressure switch arranged to generate a control signal when depressed by the user comprising continuous pressure values in at least two different identifiable discrete pressure ranges corresponding to different pressures being applied by the user in depressing the pressure sensitive switch;

wherein the pressure sensitive switch is arranged to generate an advancing control signal arranged to advance selection of one group through the plurality of groups when the pressure sensitive switch is momentarily depressed and wherein the discrete pressure ranges are arranged to correspond to the selection items of the selected group when continuous pressure is applied to the pressure sensitive switch for selecting one of the selection items within the selected group.

When the electronic circuitry comprises two pressure sensitive switches, the pressure sensitive switches are preferably arranged to generate advancing control signals arranged to advance selection of one group through the plurality of groups in opposing directions relative to one another when the pressure sensitive switches are momentarily depressed and wherein the discrete pressure ranges of each pressure sensitive switch are arranged to correspond to the selection items of the selected group when continuous pressure is applied to the pressure sensitive switch for selecting one of the selection items within the selected group.

According to a further aspect of the present invention there is provided an input device for an electronic device comprising:

a housing;

electronic circuitry in the housing arranged to detect user inputs and generate control signals corresponding to said user inputs to be transmitted to the electronic device;

the electronic circuitry comprising a pressure switch arranged to generate a control signal when depressed by the user comprising continuous pressure values in at least two different identifiable discrete pressure ranges corresponding to different pressures being applied by the user in depressing the pressure sensitive switch;

the pressure switch being operable in a first mode in which a variable function associated with the pressure switch is arranged to be varied in a first direction responsive to increased pressure applied to the switch and a second mode in which the variable function is arranged to be varied in a second direction opposite to the first direction responsive to increased pressure applied to the switch.

There may be provided an auxiliary switch arranged to convert the pressure switch between the first and second modes upon activation of the auxiliary switch.

The variable function may be arranged to be varied by the pressure switch responsive to a continuous pressure being applied to the pressure switch. The pressure switch may be further arranged to be converted between the first and second modes responsive to a momentary pressure applied to the pressure switch.

According to a further aspect of the present invention there is provided an input device for an electronic device comprising:

a housing;

electronic circuitry in the housing arranged to detect user inputs and generate control signals corresponding to said user inputs to be transmitted to the electronic device;

the electronic circuitry comprising:
a pressure switch arranged to generate a control signal when depressed by the user comprising continuous pressure values in at least two different identifiable discrete pressure ranges corresponding to different pressures being applied by the user in depressing the pressure sensitive switch; and
a tracking mechanism arranged to track movement of the housing relative to a supporting surface;
the pressure switch and the tracking mechanism being arranged to respectively controllably vary two different variable functions simultaneously.

The two different variable functions may comprise manipulations of an object, for example a translation of an object, a rotation of an object and/or a zoom function.

Preferably the pressure switch is arranged to generate pressure values in approximately five to ten different identifiable discrete pressure ranges.

An increase in pressure applied to the pressure switch may be arranged to controllably vary one of the variable functions in one direction and a decrease in pressure applied to the pressure switch may be arranged to controllably vary said one of the variable functions in an opposing second direction.

There may be provided an auxiliary switch arranged to fix one of the variable functions associated with the pressure switch upon activation of the auxiliary switch.

When there is provided two pressure switches associated with one of the variable functions, the two switches may be arranged such that an increase in pressure to one of the pressure switches controllably varies the variable function in one direction and an increase in pressure applied to the other pressure switch controllably varies the variable function in the opposing direction.

When the pressure switch is arranged to controllably vary one of the variable functions in one direction, an increase in pressure to the pressure switch may be arranged to correspond to an increase in a rate of variation of the variable function.

The pressure switch may be arranged to controllably vary the variable function through a range of values when continuous pressure is applied and may be arranged to vary the variable function in prescribed increments when momentarily depressed.

There may be provided an auxiliary switch arranged to convert the pressure switch between a coarse mode and a fine mode, wherein in each mode the pressure switch is arranged to controllably vary one of the variable functions in increments according to the discrete pressure ranges applied by the user with the increments in the coarse mode being greater than the increments in the fine mode.

Alternatively, in the coarse mode the pressure switch may be arranged to controllably vary the variable function associated therewith according to variation in pressure applied by the user, and the fine mode the pressure switch may be arranged to controllably vary the variable function associated therewith according to different pressures applied by the user at a slower rate than the coarse mode.

According to another aspect of the present invention there is provided an input device for an electronic device comprising a selection function and an action initiation function, the input device comprising:

a housing;

electronic circuitry in the housing arranged to detect user inputs and generate control signals corresponding to said user inputs to be transmitted to the electronic device;

the electronic circuitry comprising a pressure switch arranged to generate continuous pressure values in at least two different identifiable discrete pressure ranges corresponding to different pressures being applied by the user in depressing the pressure sensitive switch;

the pressure switch being arranged to generate a first signal responsive to a first user interaction and a second signal responsive to a second user interaction, the pressure switch being arranged to generate a selection signal responsive to the first and second signals being generated in which the selection signal is identifiable as a selection by the selection function of the electronic device.

The pressure switch may be arranged to generate the first signal responsive to applying a pressure to the pressure switch which exceeds a first pressure threshold and to generate the second signal responsive to applied pressure to the pressure switch falling below a second pressure threshold.

The pressure switch may be arranged to generate an audio signal with the second signal.

Alternatively, the pressure switch may be arranged to generate the second signal responsive to a pressure being released from the pressure switch within a prescribed duration from the first signal. In this instance, the pressure switch may be arranged to generate an audio signal if pressure is not released from the pressure switch within the prescribed duration from the first signal.

The pressure switch may be arranged to generate an action initiation signal responsive to two selection signals being generated within a prescribed period of time in which the action initiation signal is identifiable as an initiation of an action by the action initiation function of the electronic device. In this instance, the first signal may correspond to a pressure applied to the pressure switch which exceeds a first pressure threshold and the second signal corresponds to an applied pressure falling below a second pressure threshold. Alternatively, the pressure switch may be arranged to generate the second signal responsive to pressure being released from the pressure switch within a prescribed duration from the first signal being generated.

The pressure switch may also be arranged to generate an action initiation signal identifiable as an initiation of an action by the action initiation function of the electronic device responsive to a pressure being applied to the pressure switch which exceeds an upper pressure threshold which is greater than any pressure thresholds associated with the first and second signals. Preferably the upper threshold is arranged to be adjusted by a user.

Some embodiments of the invention will now be described in conjunction with the accompanying drawings in which:

BRIEF DESCRIPTION OF THE DRAWINGS

FIG. 11 (a) is a schematic illustration of a pressure menu according to a Fisheye discretization.

FIG. 11 (b) illustrates a computer mouse augmented with one pressure sensor.

FIG. 12 illustrates a target selection with a cursor.

FIG. 13 illustrates average performance of the different functions from left to right with performance measures of (a) Movement Time (MT); (b) Errors (E); and (c) Number of Crossings (C).

FIGS. 14 (a) and (b) graphically illustrate average performance of FE and L across various pressure levels for Movement time and Error rates respectively.

FIG. 15 (a) illustrates a computer mouse augmented with two pressure sensors.

FIG. 15 (b) schematically illustrates rotation of a triangular object with pressure input and simultaneous displacement using mouse movement as an exemplary task which is common in several applications.

FIG. 16 illustrates a cursor state in various PressureMove techniques including: (a) a standard cursor without any pressure applied to it; (b) a cursor filling up when pressure is being applied; (c) movement in a clockwise direction; (d) movement in a counter-clockwise direction; and (e) a hierarchical manner, for first pressure level, wherein the arrows are not part of the cursor and only used to indicate how the cursor moves.

FIG. 24 (a) illustrates a computer mouse augmented with a pressure sensor on top of the mouse button.

FIG. 24 (b) graphically illustrates a pressure sensor for activating a mouse-down and mouse-up events typical of a mouse click.

FIG. 25 is a graphic representation of a pressure click in which a mouse down is invoked after providing a pressure of 4 units and a mouse up is recorded when releasing immediately after a mouse down and when the pressure level is equal of less than 2 units.

FIG. 26 is a graphic representation of use of a pressure tap to trigger a click when the user presses up to a threshold and releases within 150 ms wherein if the release takes place after 150 ms then the system does not record a click.

FIG. 28 (b) illustrates right: total errors for each interaction mode including: BC—Button Click; PC—Pressure-Click; PC+A—Pressure click with audio; PT—Pressure-Tap; and PT+A—Pressure Tap with audio.

DETAILED DESCRIPTION

Figure 1:
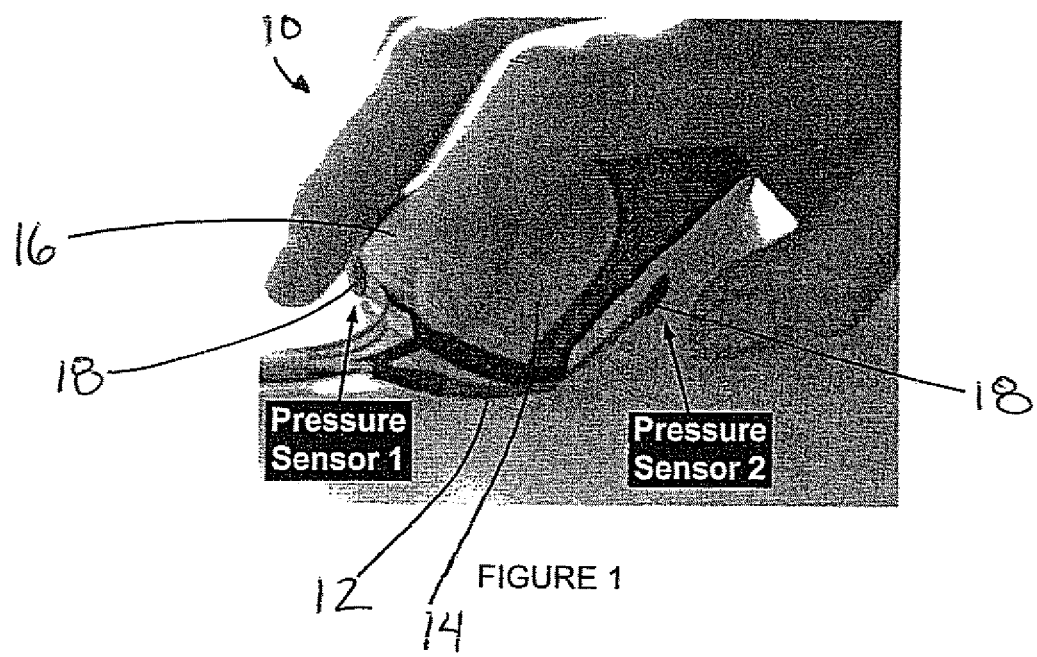
FIG. 1 illustrates a computer mouse augmented with two pressure sensors.

Referring to the accompanying figures there is illustrated an input device generally indicated by reference numeral 10. The device 10 in illustrated embodiment comprises a mouse for a computer including a housing 12 arranged to be received in the palm of a user's hand. In other embodiments, the device 10 may assume other forms while still taking advantage of many features of the present invention as defined further herein. For instance, the input device 10 may be used for any type of electronic device requiring an input, for example, a computer, a cellular phone, video games, personal electronic assistants, and the like.

The housing 12 of the illustrated mouse includes electronic circuitry therein which is arranged to detect user inputs and to generate respective control signals corresponding to the user inputs which are in turn transmitted to the computer for controlling operation of the computer. As in a typical computer mouse, the device also includes in preferred embodiments a tracking mechanism arranged to track movement of the mouse housing relative to a supporting surface, for example a table, supporting the mouse thereon. In typical applications, the computer mouse includes a left click switch 14 and a right click switch 16 each comprising two state buttons operable between an inactive state and an active state when depressed by the user. When the housing is comfortably received within the palm of the user's hand, the left click button is readily accessible by the finger tip of the index finger of the user while the right click button is readily accessible by the finger tip of the middle finger of the user.

According to the present invention, the input device 10 is enhanced by providing pressure sensitive switches 18 on the housing 12 for access by the finger tips of the user when the housing is supported within the palm of the user's hand as in the conventional use of a computer mouse. In preferred embodiments two pressure switches 18 are provided with one being located for ready access by the middle finger of the user so as to be located near the right click switch 16, while the other pressure sensitive switch 18 is located at a side of the housing 12 for ready access by a thumb of the user.

In some embodiments of the input device 10 only a single pressure sensitive switch 18 is provided in combination with a two state button of the mouse so that the pressure sensitive switch can be arranged to select one item from a plurality of selection items. The two state right click or left click switch in combination therewith can then be used to confirm entry into the computer of the item selected using the pressure sensitive switch.

In further embodiments, the two pressure switches may be provided alone or in combination with a two state button to permit various combinations of selections to be made as described further herein. In yet further embodiments, only a single pressure switch may be provided and operated similarly to some of the embodiments described herein.

In each of the preferred embodiments, an input device is provided having both a first switch and a second switch arranged to generate respective controls signals when depressed by the user. In some embodiments only the second switch comprises a pressure sensitive switch while the first switch comprises a two state button. For increasing the range of selection items to be selected, both the first and second switches preferably comprise pressure sensitive switches in combination with yet a further switch having a two state operation.

In each instance where the computer includes a plurality of sequential selection items to be selected in a range from a first selection to a last selection item, each pressure sensitive switch is arranged to generate continuous pressure values in identifiable discrete pressure ranges different from one another corresponding to different pressures being applied by the user in depressing the pressure sensitive switch. Each discrete pressure range of the pressure sensitive switch corresponds to one of a list of items to be selected on the computer whereby increasing applied pressure to the pressure sensitive switch advances the selection item being selected towards the last selection item while reducing pressure applied to the pressure sensitive switch returns the selection item being selected towards the first selection item. Depressing the other pressure sensitive switch or one of the two state buttons of the input device permits confirmation of the selection item to be entered to the computer at any time.

The electronic circuitry can be arranged to perform various tasks depending upon the configuration thereof. In some arrangements when there is provided one or more pressure sensitive switches and one or more two state switches, at least one of the switches in some embodiments is arranged to generate an advancing control signal, when the pressure sensitive switch is momentarily depressed or tapped, which advances selection of one group through a plurality of groups designating a plurality of sequential selection items among each group. The tapping of the switch thus provides a coarse selection process whereby the general proximity of an item to be selected can be reached quickly by sequentially selecting groups of items. Once the proper group has been selected which locates a desired selection item to be selected therein, application of continuous pressure to one of the pressure sensitive switches permits selection of the desired item from the list of selection items within that selected group. In this instance, two pressure switches are preferably provided in which tapping or momentarily depressing the pressure sensitive switches by the user generates respective advancing control signals to advance selection of one group from the plurality of groups in opposing direction relative to one another.

In embodiments where two pressure sensitive switches are provided, and it is desired to navigate through a plurality of cascading levels of sequential selection items, the range of pressure values of each pressure sensitive switch preferably corresponds to the selection items of a given level in which the pressure sensitive switch associated with each successive level alternates between the two switches. Accordingly by varying the application of pressure to a first one of the switches, the user can select one of the selection items within a first level. By switching application of pressure to the other pressure sensitive switch a subsequent level of selection items is selected and navigated through by varying the pressure applied to the next pressure sensitive switch. In a continuing alternating manner, applying pressure to the opposing switch causes a selection to be made within a respective level to permit the selection to proceed to the next level of selection items.

In yet further embodiments, the pressure switches can be combined with the various functions of two state buttons or scroll wheels on a typical computer mouse or other suitable input device for a computer to permit other combinations of computer control signals to be generated for controlling a computer in yet further applications.

In some embodiments of the input device, the pressure switch may be operable in a first mode in which a variable function associated with the pressure switch is arranged to be varied in a first direction responsive to increased pressure applied to the switch and a second mode in which the variable function is arranged to be varied in a second direction opposite to the first direction responsive to increased pressure applied to the switch. As an increase in pressure applied by a user offers more natural control to a user, the user in this instance may be provided the option of controlling which direction a variable function is varied or a selection is scrolled when an increase in pressure is applied. The may initially apply pressure with the selection or variable function beginning at an initial selection such that increasing pressure results in the selection or function being advanced in a forward direction. If the desired item to be selected, or the desired value of a function is passed by, the user has the option to convert the mode of the pressure switch so that further increases in pressure cause the item to be selected or the desired function to be varied in an opposing rearward direction back towards the initial selection.

Conversion of the mode may be accomplished by contacting an auxiliary switch, for example a second pressure switch or a two state button provided in association with the first pressure switch on a common housing. Alternatively, the mode of the pressure switch can be converted to reverse the direction of selection or the direction of variation of the variable function by altering the method of contact to the pressure switch itself. In this instance, a continuous pressure applied to the pressure switch can function to vary the variable function in the direction of the current mode, however a momentary pressure applied to the pressure switch instead acts to convert the mode of the pressure switch to reverse the direction that the variable function is varied with increasing pressure applied to the pressure switch.

In a further embodiment, a pressure switch can be provided in combination with a tracking mechanism of the input device, for example the tracking mechanism of a computer mouse which is arranged to track movement of the housing relative to a supporting surface upon which it is supported. In this instance, the pressure switch and the tracking mechanism can be arranged to each controllably vary a respective variable function simultaneously with one another. The simultaneously control of the variation of two variable functions or two items to be selected from respective sequential lists or groups is particularly useful when it is desirable to control two different manipulations of an object in a virtual desktop environment. Examples of manipulations of the object can include translation of an object, rotation of an object, or a zoom function to zoom the object. In preferred arrangements, the tracking mechanism of the input device controls translational movement of the object within its environment while the pressure switch functions as noted in previous embodiments above to controllably vary a rotation, a zoom or other variable selection relating to the object.

The pressure switch in this instance, is arranged to function similarly to previous embodiments such that an increase in pressure applied to the pressure switch is arranged to controllably vary one of the variable functions in one direction and a decrease in pressure applied to the pressure switch is arranged to controllably vary said one of the variable functions in an opposing second direction. Accordingly, in a first mode, the object can be zoomed out or rotated clockwise when increasing pressure is applied to the pressure switch and in a second mode, the object can be zoomed in or rotated counter-clockwise when pressure applied to the pressure switch is decreased.

To enhance control of the tracking mechanism, a second switch in the form of a second pressure switch or a two state button can be arranged to fix the variable function associated with the pressure switch upon activation of the second switch so that variations in pressure applied when displacing the housing using the tracking mechanism will no longer vary the other variable function once it has been set to the desired setting.

When there are two pressure switches in addition to the tracking mechanism, both pressure switches can be associated with the same one of the two variable functions to be simultaneously controlled. In this instance, one of the pressure switches can be arranged such that an increase in pressure controllably varies the variable function or advances a selection in a first forward direction while the other pressure switch is arranged such that an increase in applied pressure thereto controllably varies the same variable function or selection to vary in an opposing rearward direction.

The amount of applied pressure can be correlated to a discrete pressure range to determine the selection or value of the variable function. Alternatively, the pressure switch can be arranged to controllably vary one of the variable functions such that any pressure applied advances a selection or varies the value of the function in one direction and variation in pressure applied to the pressure switch corresponds to the rate of variation of the variable function. An increase in pressure thus increases the rate of change of the value of the variable function in one direction.

When there is provided a plurality of items or values to be selected and the values are organized in groups, as noted above, a coarse selection can be provided to first select which group the desired item or value belongs followed by a fine selection to select one particular value within the group. In some embodiments the pressure switch can be arranged to controllably vary the variable function through a range of values by selecting between the different groups when continuous pressure is applied such that each amount of pressure applied is identified with a given discrete pressure range associated with a respective one of the groups. The same pressure switch can then be arranged to vary the variable function among the selections within the selected group by momentarily applying pressure to the pressure switch. In this instance, each momentary pressure applied corresponds to a prescribed incremental increase in the value of the function to be selected in one direction.

Instead of relying on a continuous pressure versus a momentary applied pressure, one of the auxiliary switches on the input device can instead be arranged to convert the pressure switch between the coarse mode and the fine mode. In each mode the pressure switch can be arranged as in previous embodiments to controllably vary a desired variable function. The pressure switch may identify the pressure applied with a respective discrete pressure ranges applied by the user with each increasing pressure range corresponding to an incremental increase in the function being controlled. The incremental changes to the variable function associated with each discrete pressure range of applied pressure are greater in the coarse mode than in the fine mode.

Alternatively, in both the coarse mode and the fine mode, the pressure switch can be arranged to controllably vary one variable function such that pressure applied advances a selection or varies the value of the function in one direction and variation in pressure applied to the pressure switch varies the rate of variation of the variable function. In this instance, the rate of change of the variable responsive to designated applied pressures is greater in the coarse mode than in the fine mode.

When used in an input device for an electronic device comprising a selection function, typically a single mouse button click, and an action initiation function, typically a double mouse button click, the input device may rely on the pressure switches to generate a selection signal identifiable as a selection by the selection function and an action initiation signal identifiable as an initiation of an action by the action initiation function of the electronic device.

To accomplish this, the pressure switch can be arranged to generate a first signal responsive to a first user interaction and a second signal responsive to a second user interaction in which the selection signal is then generated responsive to the first and second signals.

In typical arrangements, the first signal is arranged to be generated responsive to applying a pressure to the pressure switch which exceeds a first pressure threshold. Subsequently the second signal can be generated either responsive to applied pressure to the pressure switch falling below a second pressure threshold or responsive to a pressure being released from the pressure switch within a prescribed duration from the first signal.

An audio signal representing a familiar mouse button click can be generated with the second signal to confirm that a selection signal is to be generated and recognized by the selection function of the electronic device.

When relying a prescribed duration between the first and second signals being generated to determine if a selection signal is generated, an audio signal, in the form of an error indication, can be generated if pressure is not released from the pressure switch within the prescribed duration from the first signal to indicate that the selection signal will not be generated.

Regarding the action initiation or action invocation function, the pressure switch can also be arranged to generate the action initiation signal responsive to two selection signals being generated within a prescribed period of time similar to a double click. In this instance, the selection signals can be generated by either of the methods noted above.

Alternatively, the pressure switch may be arranged to generate the action initiation signal responsive to a pressure being applied to the pressure switch which exceeds an upper pressure threshold which is greater than any pressure thresholds associated with the first and second signals. Typically the upper pressure threshold would be adjusted by a user preference on the electronic device and would permit the upper threshold to be set at a value which may be considerably greater than pressure thresholds of the selection signals by a factor of 2 or more.

The design considerations of augmenting a mouse with one and two sensors are considered herein through two experiments. In the first study we investigated the ideal locations for affixing pressure sensors to a mouse, the methods for selecting continuous pressure values, and the number of pressure values that can be controlled with one sensor. The results of the first study show that users can efficiently control pressure sensors with the thumb and middle-finger. The results also agree with previously established norms that users can comfortably control only up to 6 pressure levels [11,15]. To extend the user's ability to control a larger number of pressure levels we designed two dual-pressure control techniques, switch and tap. Switch and tap facilitate control of over 64 pressure levels and give users the ability to control pressure in two directions. The results of a second study show that a technique such as tap allows users to control higher pressure levels and provide bi-directional pressure input.

The main contributions of this paper are to: 1) extend the design space by augmenting the mouse with pressure input; 2) describe a framework for the design of pressure augmented mice; 3) identify strategies for controlling large number of pressure values with two sensors; and 4) provide a mechanism for controlling bi-directional pressure input.

We built a design framework to identify various factors that can influence performance with a pressure augmented mouse. The framework uses six attributes to characterize the factors that can influence performance: sensor positions, number of sensors, discretization of raw pressure values, pressure control mechanism, selection technique and visual feedback.

Sensor Positions

Designers can add pressure sensors to a mouse in multiple different locations. Ideally, pressure input should not require the user to interrupt a task or to reposition the hand to access a pressure button. Additionally, pressure control is best at the fingertips [18]. Therefore to provide greater user control and better resolution of pressure levels, designers should position the sensors so that they can be accessed within the reach of the finger tips, such as on the rim instead of the surface of the mouse. Several manufacturers such as Logitech or Apple's MightyMouse™ use this approach of adding buttons to the rim of the mouse and within the range of the finger tips.

The primary button on a mouse is typically controlled by the index finger unless the mappings of the button are modified. As a result, unlike styluses or touchpads [11,15] with which pressure input is provided by the index finger, designers should not place on a mouse a pressure button in a location that interferes with the index finger. Accordingly, for easy access, higher ergonomic control and reduced task interruption, users should be provided access to pressure buttons through the thumb, middle-finger, ring-finger or little-finger.

Number of Sensors

Most studies have investigated the use of pressure based input on devices such as digitizers, pens or touchpads [11,15,16]. These devices are limited in terms of adding more sensors. However, with respect to the physical design and common usage of a mouse, we can easily affix one (uni-pressure) or two (dual-pressure) sensors onto it so that users can control them simultaneously. We propose that up to two sensors can be controlled simultaneously on a mouse, and controlling more than two sensors would strain the user.

Discretization of Raw Pressure Values

Exerting force on a pressure sensor produces a raw stream of discrete numeric integer values. The analog force exerted by the user gets converted to a digital data stream through a manufacturer specific Analog-to-Digital (AtoD) converter. As a result, manufacturers provide 256, 512 or 1024 discrete integer pressure values. However, users cannot control effectively the raw discrete values. As a result, applications further discretize the mw integer values by grouping near-by values into unique controllable pressure levels [11,15].

In stylus and pen based pressure input, studies have shown that users can comfortably control up to 6 tl discrete pressure levels [11,15]. Furthermore, users can better control forces that are less than 3N [11], Since manufacturers apply different analog-to-digital converters there is no standard mechanism to discretize the number of pressure levels. As a result, there are numerous methods and mappings for discretizing the number of controllable levels using a pressure based input [11,14].

Figure 2:
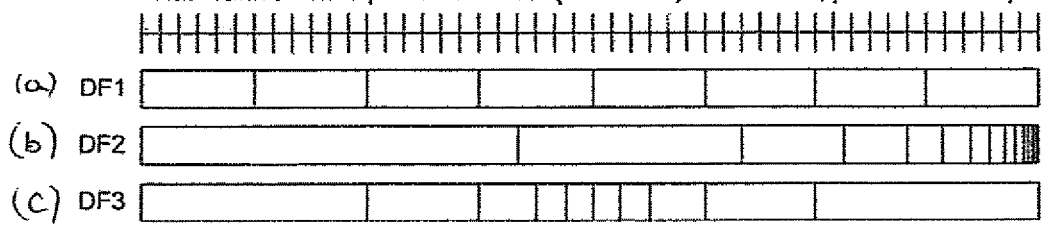
FIG. 2 is an illustration of different discretization functions including: (a) DF1: Linear, (b) DF2: Quadratic centered at the lower range, (c) DF3: Quadratic centered in the middle range.

In one reported case of pressure discretization, Ramos et al. [14] process the raw pressure values through a low-pass filter, a hysteria function to stabilize the raw signal, and a parabolic-sigmoid transfer function to account for pressing on the stylus' pressure tip. As a result there is a slow response at low pressure levels, linear behaviour in the middle levels and slow response at the high levels of the pressure range [14]. Mizobuchi et al. [11] used a linear discretization function by creating equal pressure levels consisting of 0.41 N each. Ramos et al. [15] use a linear discretization function to map 1024 pressure values into units with the same number of pressure values. Some examples of different discretization methods are depicted in FIG. 2. The discretization function needs to take into consideration the type of pressure sensor and the user's ability to comfortably control the pressure values.

Pressure Control Mechanism

A pressure control mechanism allows the user to iterate through a list of available pressure levels. In most pressure based interactions, pressure input is usually better controlled in one direction, i.e, when going upward from 0 to the highest value but not in the reverse direction. As a result, in a uni-pressure augmented mouse, the pressure control mechanism is basic and simply consists of pressing down on one sensor to iterate through a limited number of pressure levels. However, it would be beneficial to devise a pressure control mechanism that facilitates controlling input in both directions. This mechanism can be provided by means of some specialized hardware [16] or by augmenting the mouse with more than one sensor.

Many types of interactions, such as mode switching and menu selection can benefit from a large number of pressure levels than what has been typically reported. Increasing the number of accessible pressure levels may be possible with two sensors. We propose that pressure control mechanisms with a dual-pressure augmented mouse consider the following design goals: the user should access a larger number of pressure values than with one pressure input; there should be minimal overhead when the user switches applying pressure between the different sensors; each pressure sensor should not extend beyond the comfortable control range available to the user; if possible dual-pressure mouse should provide pressure control in both directions.

Selection Mechanism

A selection mechanism allows users to pick the required value after using the pressure control mechanism to hone into a pressure level. Ramos et al. [15] proposed several selection mechanisms-QuickRelease, Dwell, Stroke and Click-for stylus based pressure input. QuickRelease operates by quickly lifting the stylus from the tablet's surface after reaching the appropriate pressure level. Dwell triggers the selection after the user maintains the pressure control over a prescribed amount of time. Stroke activates the selection mechanism after the user makes a quick spatial movement with the stylus. Click selects a level by pressing the stylus' barrel button. On a stylus, QuickRelease was shown to be the most effective selection technique [15]. However, it is not clear whether this method is appropriate for a uni-pressure and dual-pressure mouse. Furthermore, it is possible that different selection mechanisms are required in a dual-pressure augmented mouse to allow the user to Switch between sensors.

Visual Feedback

Kinesthetic feedback alone is insufficient for adequately controlling and selecting a pressure value. Visual feedback is a necessary component of the interaction space with pressure based input [11,15]. The most common form of feedback is through a visual highlight over the active item that is selectable. Ramos et al. [15] investigated the effects of two different visual feedback conditions: full visual and partial visual feedback, in the full visual feedback (or continuous feedback) condition all the potential targets are visible. As the user applies pressure, the visual indicator (typically a highlight) iterates through the list of selectable items. In the partial feedback (or discrete feedback) condition only the selected target is visible, in a similar setup, Mizobuchi et al. [II] investigated the effect of continuous and discrete visual feedback. In both the above described studies, users performed better with the continuous feedback condition.

Study of a Pressure Augmented Mouse

To investigate the influence of the above factors on performance we carried out two studies. The first study informs the design choice of different sensor positions and selection mechanisms. The second study examines the effects of uni- and dual-pressure control mechanisms on performance.

Hardware Configuration and Discretization Function

Both our studies used an optical mouse with pressure sensors mounted on its rim (FIG. 1). The sensors (model #1ESF-R-5L, from CUI Inc.) could measure a maximum pressure value of 1.5 Ns. Each sensor provided 1024 pressure levels. The application was developed in C# and the sensor was controlled using the Phidgets library [13]. The experiments were conducted in full-screen mode at 1024× 768 pixels on a P4 3.2 GHz Windows XP OS.

We first carried out a pilot study with three subjects to compare three different pressure discretization functions: a linear function, a quadratic function centered at the lowest pressure value and a quadratic function centered at the middle pressure value (DF1, DF2, DF3 in FIG. 2).

With the linear function we observed that users controlled less effectively the lower pressure values than the higher values. We found that users were fastest with the quadratic function centered at the lowest pressure values. In this discretization method, targets in the lower range contained more pressure units than those in the higher range.

Performance Measures

The experimental software recorded trial completion time, errors and number of crossings as dependent variables. Trial completion time (MT) is defined as the total time taken for the user to apply the appropriate amount of pressure and select the target. The number of crossings (NC) is defined as the number of times the cursor enters or leaves a target for a particular trial. The software records an error (E) when the participant selects a location which is not a target. The trial ended only when the user selected the right target, so multiple errors were possible for each trial. While MT and E give us an overall success rate, NC provides information about the level of control achievable using each of the different pressure control mechanisms. Participants were also asked in an exit questionnaire to rank the different selection and pressure control techniques.

Experiment 1 Methods

The goal of this experiment was to examine differences in performance with different sensor locations and different pressure selection mechanisms. The experiment was also designed to examine differences in selection time and accuracy at different pressure levels. We adapted the experimental design used in [15] to this study.

Participants

Nine participants (5 males and 4 females) between the ages of 19 and 25 were recruited from a local university. All subjects had previous experience with graphical interfaces and used the mouse in their right hand.

Task and Stimuli

We used a serial target acquisition and selection task similar to the task in [15]. Participants controlled the movement of a red pointer along a vertical line through a sequential list of items using pressure input. 900 pressure values were discretized in a quadratic manner (DF2 in FIG. 2). A set of consecutive rectangles were drawn along the line's length. During each trial a target was coloured in blue. The user's task was to apply sufficient pressure to move the red pointer into the blue target. We provided complete visual feedback to the user by highlighting the items in teal when the user iterates through them. The user invokes a selection mechanism for choosing an item once the cursor is at the required pressure level. The color of the target changed to yellow when the user selected it. The system generated an audio sound to give feedback when the task was completed correctly.

Experiment 1 Procedure and Design

The study used a 5×3×3×4 within-participants factorial design. The factors were:
Pressure Levels: 4, 6, 8, 10, 12.
Selection Mechanism: Quick Release, Dwell, Click.
Sensor Location: Right, Left, Top.
Relative Pressure Distance: 395, 535, 675, 815.

The order of presentation first controlled for sensor location and then for selection Mechanism. Levels of the other two factors were presented randomly, We explained the selection mechanisms and participants were given ample time to practice the techniques at the beginning of the experiment. The experiment consisted of three blocks with each block comprising of two repetitions for each condition. With 9 participants, 5 pressure levels, 3 selection mechanisms, 3 sensor locations, 4 distances, 3 blocks, and 2 trials, the system recorded a total of (9×5×3×3×4×3×2) 9720 trials. The experiment took approximately 60 minutes per participant.

Selection Mechanisms

Three selection mechanisms were tested for the uni-pressure augmented mouse: Quick Release (QR), Dwell and Click.

Quick Release: This technique is similar to the one designed in [15]. In QR, once the user reaches the desired target they select it by quickly releasing the linger off the pressure sensor.

Dwell: This technique is similar to the one designed in [15]. In this method the user maintains the cursor within the target for a predetermined amount of time. We use a delay period of 1 sec to trigger the selection.

Click: In this method the user iterates to the desired target and clicks on the left mouse button to select the item.

Sensor Locations

Three sensor locations were tested in the experiment: top, left and right. The top sensor can be easily acquired by the user's middle finger. The left sensor is accessible by the user's thumb and the sensor in the right location is accessible with the ring or little finger. We did not select a sensor location that requires using the index finger as it hampers the click selection technique. The mouse was equipped with only one sensor and the experimenter changed the location to match the corresponding experimental condition.

Relative Pressure Distances (Distance)

Figure 3:
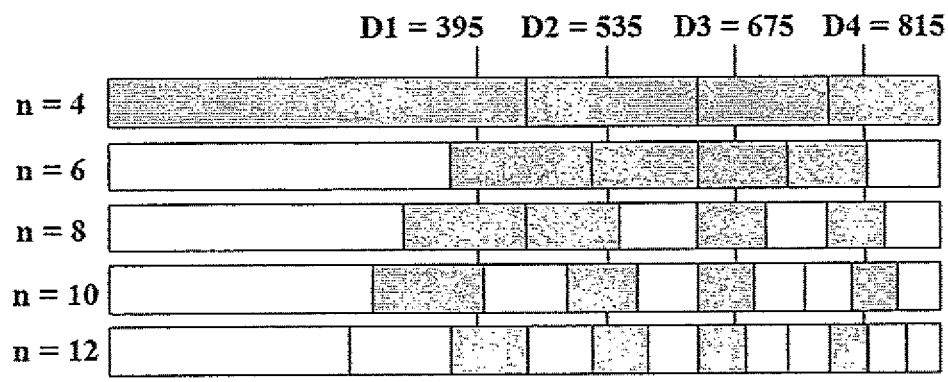
FIG. 3 illustrates the location of targets in one of four different relative pressure distances based on the pressure level.

In each trial a target appeared in one of four different relative pressure distances, 395, 535, 675, and 815. The relative pressure distance is the number of pressure units from the start of the pressure range (FIG. 3).

Results of Experiment 1

Completion Time

We used the univariate ANOVA test and Tannhane post-hoc pair-wise tests (unequal variances) for all our analyses. To make the data conform to the homogeneity requirements for ANOVA we used a natural-log-transform on the completion time. Results showed main effect of selection technique, sensor location, pressure-levels and target-distances (all $p<0.01$) on trial completion time with $F_{2,16}=20.05$, $F_{2,16}=4.57$, $F_{4,32}=113.06$, and $F_{3,24}=21.655$ respectively.

Post-hoc pair-wise comparisons of pressure-levels yielded significant differences (all $p<0.01$) in trial completion times for all pairs except between pressure-levels 4 and 6. Users were fastest when the pressure level was 4 and slowest at pressure level 12.

Figure 4:
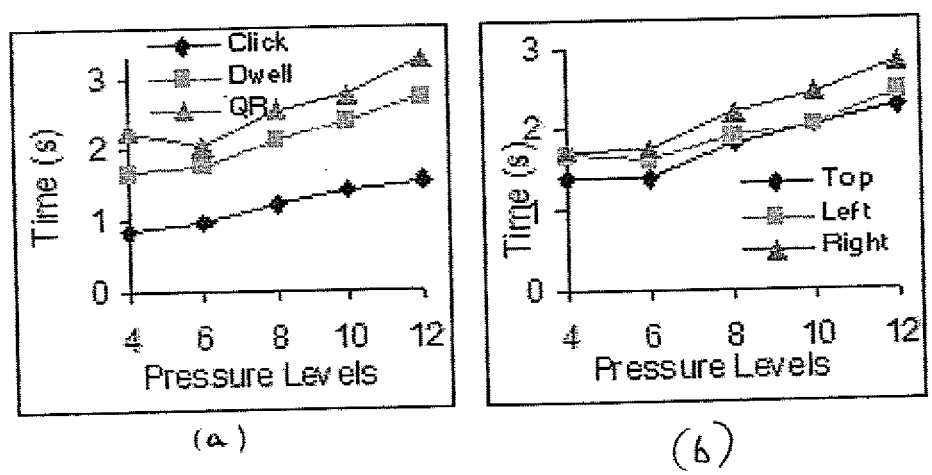
FIG. 4 illustrates the Mean Completion times for each (a) selection technique [left] and (b) sensor location [right].

Post-hoc pair-wise comparisons of selection techniques yielded significant differences (all $p<0.01$) in trial completion times for all pairs. Participants were fastest with click, followed by dwell and QR. FIG. 4 (left) shows the mean completion time of each technique per pressure level.

Post-hoc pair-wise comparisons of sensor location yielded significant differences ($p<0.01$) in trial completion times between right-and-top and right-and-left sensor pairs. Participants were faster with the sensor in the top sensor location followed by left and then right. FIG. 4 (right) shows the mean completion time for each sensor location across the different pressure levels.

Post-hoc pair-wise comparison of target distance yielded significant differences (all $p<0.01$) in trial completion times for all pairs except targets at relative distance D1 and D2.

Crossings and Errors

Figure 5:
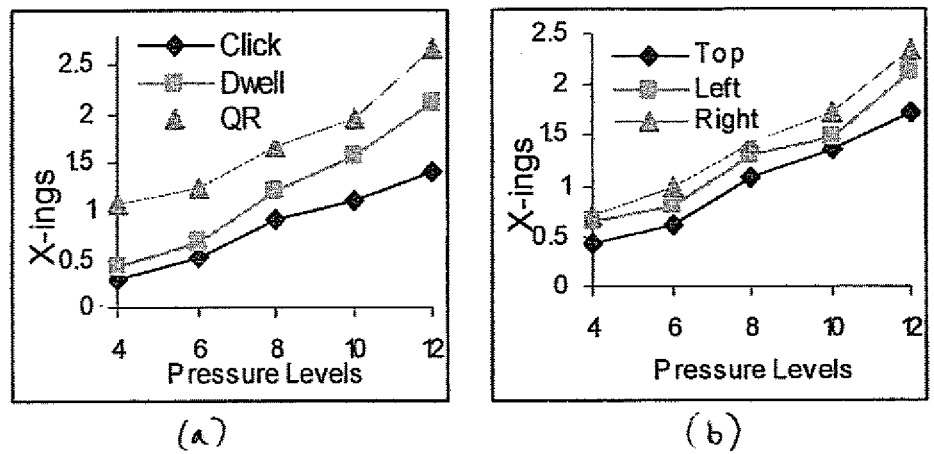
FIG. 5 illustrates the Average Crossings for (a) each technique [left] and (b) sensor location [right].

The average number of crossings per trial across all conditions was 1.3 (standard error=0.022). ANOVA tests revealed a significant effect of selection technique on number of crossings ($F_{2,16}=11.35$, $p<0.001$). Post-hoc pair-wise comparisons of selection techniques yielded significant differences (all $p<0.001$) in number of crossings for all pairs. Click resulted in the least number of crossings, followed by dwell and QR. Our tests did not show significant effect of sensor location on crossings. FIG. 5 shows the average crossings per pressure level for each technique (FIG. 5 left) and sensor Location (FIG. 5 right), The average number of misses across all conditions was 0.23 errors per trial (standard error—0.007). With respect to selection techniques dwell had the least number of errors (0.01) followed by Click (0.26) and QR (0.42). For sensor locations the ordering was top (0.22), left (0.23) and right (0.25). The ordering of errors for different pressure levels was 4 (0.09), 6 (0.14), 8 (0.24), 10 (0.28) and 12 (0.41). The ordering of errors for target position was D2 (0.22), D 1 (0.24), D3 (0.23) and D4 (0.23).

Subjective Ranking

In the exit questionnaire we asked participants to rank the different selection techniques and sensor locations in terms of preference. Most participants preferred click (6 first places, 3 second places) followed by dwell (2 first, 4 second and 3 third) and quick-release (1 first, 2 second and 6 third). Most participants preferred the left location for controlling the pressure sensor (6 first, 3 third) followed by top (3 first, 5 second and 1 third) and then right (4 second and 5 third). We also asked participants to rank the different selection techniques for each sensor location. The results were similar to the overall preference of the selection techniques.

Discussion

Selection Technique

The results of our study show that participants were fastest, had a higher level of control (as indicated by the number of crossings) and highly preferred the click selection technique. This result is different from that reported by Ramos et al. [15] for a pen, in which they found performance with Quick-Release to be the fastest. There are several possible reasons for this finding. The proximity of the button to the pressure sensor and the resulting ergonomics made it easy for the participants to use their index-finger to click the left mouse button. Additionally, users reported being more comfortable clicking to invoke a selection, as this is common with mouse input. However, we also notice a large number of errors with click. One possible explanation is that clicking on the mouse button requires support from the other fingers such as the thumb which can adversely affect the pressure input (our results show that the largest number of errors with click occur when the user interacts with the left sensor-thumb).

Our results indicate the dwell is a relatively good selection technique as seen by the significantly lower number of errors. This is in-line with the results reported by Ramos et. al. [15]. Users completed the task with higher accuracy in dwell than in click and quick-release. One explanation for this is that with dwell users can ensure the correct object is selected by dwelling on it for a sufficiently long period of time. However, with dwell, if users cannot reach the appropriate level a significant amount of adjustments are made. This is noticeable in the higher number of crossings, particularly with the larger pressure values. Additionally, in our study dwell triggers a selection after a 1 second delay, It is possible that with a smaller delay users perform equally well with dwell as they do with click, However, smaller delays may result in a larger number of errors and possibly a much higher number of crossings.

Interestingly, unlike results from prior studies, quick release resulted with the poorest performance values for completion times and number of crossings. One possible explanation is that unlike pen based interaction, lifting individual fingers off the mouse is not as natural or as easy as lifting a pen from a Tablet's surface, Furthermore, there is only a limited range of movement for individual fingers and lifting them separately from the surface of the mouse requires considerable effort.

Sensor Location

We found that participants were significantly slower with the right sensor location and preferred it the least of all the locations. Our results do not favor the design choice of mounting pressure sensors to the right side of the mouse. This finding counters the growing trend among commercial manufacturers (MightyMouse™) that mount sensors or buttons that are accessible with the ring or little finger.

Interestingly, the interaction effects between number of pressure levels and sensor location suggest that different sensor locations are better suited for controlling varying degrees of pressure levels. For smaller pressure levels users committed a smaller number of errors with the top sensor (middle finger) while at larger pressure-levels users committed fewer errors with the left sensor (thumb).

Pressure-Levels

Results on speed, number of crossings and accuracy, indicate that performance degrades rapidly when the number of pressure-levels increases beyond 6. This result is supported by prior studies on pen-based interfaces that suggest it is difficult to control more than 6±1 pressure levels [11,15]. In experiment 2, we extend the design of the uni-pressure augmented mouse by affixing an additional pressure sensor to determine if this limit can be extended.

Dual-Pressure Input

Augmenting the mouse with one pressure sensor limits the number of accessible pressure levels. Many applications such as zooming-in/out of a workspace, modifying the brush thickness in a drawing application or iterating through a long list of items can benefit from interacting with a large number of pressure levels. Additionally, a uni-pressure augmented mouse does not facilitate bi-directional input. In our context, bi-directional input refers to the user's ability to control, equally well, pressure input when pressing (forward) and releasing (backward) the sensor. From our observations (and prior work [15]), continuous pressure input with one sensor affords a much higher degree of forward control over backward control. These limitations led to the design of pressure control techniques, with two sensors.

The dual-pressure augmented mouse uses one pressure sensor that is controlled by the middle-finger and the other controlled by the thumb, Results from experiment 1 suggest that users apply a coarse grained movement to get closer to a target and then apply a finer movement to "coast" onto the target. This observation led to the design of switch-to-refine and tap-and-refine.

Switch-to-Refine

Figure 6:
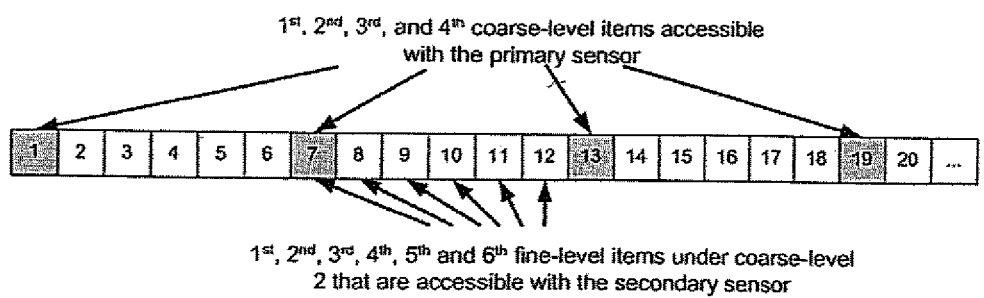
FIG. 6 illustrates the Categorization of pressure levels in terms of coarse-level and fine-level items.

Switch-to-refine (or switch) allows users to switch between two sensors to control a large range of pressure values. In switch-to-refine one sensor is considered as primary and the other as secondary. The range of pressure values are divided such that users apply pressure on the primary sensor to access a coarse-level set of pressure values, each of which is interleaved by a range of fine-level pressure values (FIG. 6). In this pressure control mechanism the participant uses the primary sensor to coarsely jump through the coarse-level items and switches to the secondary sensor to control and navigate in a finer manner through the set of values between the coarse-level items. To assist the user, the primary sensor does not respond while the user is refining their selection with the secondary sensor. Once the user reaches the appropriate pressure level they click on the left mouse button to select the item.

If the total number of selectable items is 48, we can group the items into eight coarse-level values each containing six fine-level items (see FIG. 6). To select the $15^{th}$ item the users starts with the primary sensor and applies pressure to reach the $3^{rd}$ coarse-level item (which is item 13 in the entire range). This is followed by switching to the secondary sensor to navigate through each of the fine-level items in coarse-level item number 3. As a result, the secondary sensor allows the user to navigate through each of the 6 items from item-13 to 18. To select the $15^{th}$ item the user applies 3 levels of pressure with the secondary sensor. "This technique allows users to select n×m levels where n and m are the maximum number of pressure values that users can control with the primary and secondary sensors, respectively. Unfortunately, switching from one sensor to the next creates additional overhead in switch-to-refine. Furthermore, switch-to-refine does not facilitate bidirectional pressure input.

Tap-and-Refine

Tap-and-refine (tap) categorizes pressure values into coarse-level and fine-level items similar to that in switch-to-refine. However, the interaction method in controlling the pressure input is different. The user iterates through the coarse-level items by tapping (quick press and release within 60 ms) onto the primary sensor which sets the pressure cursor at that level. Once the pressure cursor is at a given coarse-level, the user accesses the finer levels by pressing onto the same pressure sensor. For example, to access the $15^{th}$ item, the user taps 3 times. On the third tap the user holds down on the primary sensor to iterate to the $15^{th}$ item and then clicks on the mouse button to select it. Interacting with each sensor allows the user to move through the items in one of two directions (upward from 0 to maximum with the primary sensor, or downward from maximum to 0 with the secondary sensor). As a result of bidirectional control with tapping, users can easily adjust any overshoots that results from tapping too quickly.

Experiment 2 Methods

In this experiment we evaluate the various pressure control mechanisms we designed and investigate the benefits and trade-offs of uni- and dual-pressure input.

Participants and Apparatus

Eight paid volunteers (7 males and 1 female) between the ages of 21 and 26 participated in experiment 2. All subjects had previous experience with graphical interfaces and used the mouse in their right hand. The apparatus was similar to that of experiment 1 with the difference that we used a pressure augmented mouse with two sensors.

Experiment 2 Procedure and Design

The experimental task and the performance measures collected were the same as for the previous experiment.

The study used a 4×3×4 within-participants factorial design. The factors were:
- Pressure Levels: 4, 12, 16, 64.
- Pressure Control Technique: Switch-to-Refine, Tap-and-Refine, Normal.
- Relative Pressure Distance: 395, 535, 675, 815.

All conditions were presented randomly. Participants were explained how the selection techniques worked and were given ample time to practice the techniques at the beginning of the experiment. The experiment consisted of three blocks each with five repetitions per condition.

Pilot trials showed that users were unable to control 64 levels with the Normal technique. So we only tested it for pressure levels 4, 12 and 16. With 8 participants, 4 pressure levels for switch and tap and 3 pressure levels for normal, 4 distances, 3 blocks, end 5 repetitions per block, the system recorded a total of 5280 trials per participant. The experiment took approximately 60 minutes per participant.

Pressure Control Techniques

We evaluated switch-to-refine and tap-and-refine (described above) and compared these to Normal technique used in Experiment 1 which relied on only one pressure sensor. All techniques used the click selection mechanism used in experiment 1.

Results of Experiment 2

Time

The overall mean completion times across all conditions was 1.57 s (standard error=0.044 s). To make the data conform to the homogeneity requirements for ANOVA we used a natural-log transform on the completion time. Results show a main effect of Control Mechanism and Pressure-levels on trial completion times with $F_{2,14}=18.46$, ($p<0.01$) and $F_{3,21}=178.106$, (pa0.01) respectively.

Post-hoc pair-wise comparisons of pressure-levels yielded significant differences (all $p<0.01$) in trial completion times for all pairs except between pressure-levels 12 and 16. Users were fastest when the pressure level was 4 followed by 12, 16 and 64.

Figure 7:
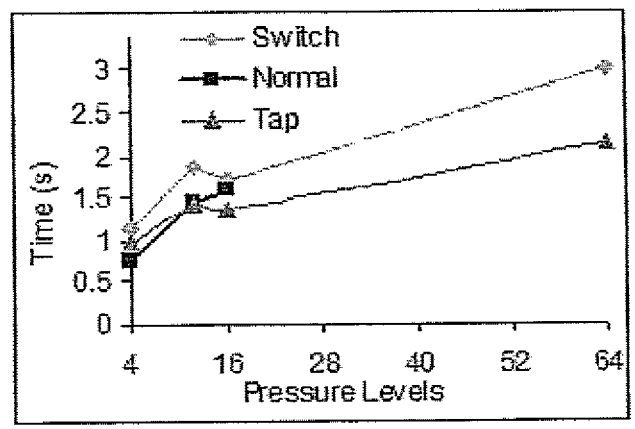
FIG. 7 illustrates Mean completion times for each control mechanism.

Post-hoc pair-wise comparisons of control-mechanisms yielded significant differences (all $p<0.01$) in trial completion times between Tap and Normal and Tap and Switch. We did not find any significant difference between Normal and Switch-to-Refine techniques. Users were fastest with Tap followed by Normal and Switch, FIG. 7 shows the mean completion time of each technique per pressure level.

Crossings and Errors

Figure 8:
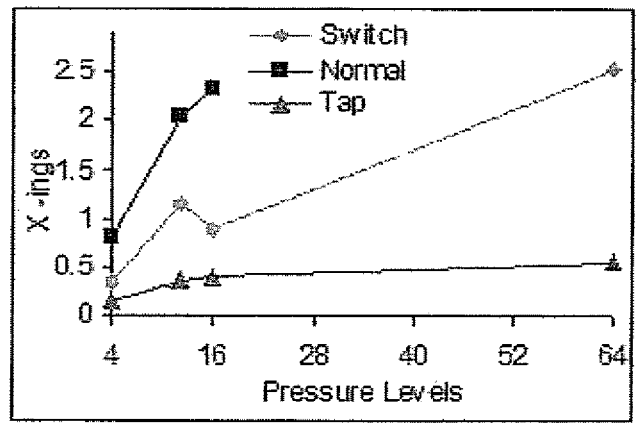
FIG. 8 illustrates Mean crossings for each control mechanism.

The average number of crossings per trial across all conditions was 1.053 (standard error=0.0735). ANOVA tests reveal a significant effect of control mechanism on number of crossings ($F_{2,14}=19.101$, $p<0.001$). Post-hoc pair-wise comparisons of control mechanisms showed that Tap had significantly (all $p<0.001$) less number of crossings than all other techniques. Pressure-levels also had a significant effect on number of crossings ($F_{3,21}=39.764$, $p<0.001$). Post-hoc pair-wise comparisons show that pressure-level 4 had significantly less crossings than levels 12, 16 and 64. However, we found no significant difference in crossings between all the other levels. FIG. 8 shows the average crossings per pressure level for each.

The average number of errors across all conditions was 0.25 errors per trial (standard error=0.01). With regard to control mechanisms tap and switch had 0.17 errors followed by Normal (0.47). The ordering of average number of errors for different pressure levels was 4 (0.12), 12 (0.31), 16 (0.32) and 64 (0.25).

Discussion

The results of the second experiment show that the mouse can be augmented with more than one pressure sensor to extend the user's pressure control range. In the following sections we discuss the benefits and limitations of the various pressure control mechanisms we developed, application areas that can benefit from a pressure augmented mouse and summarize the main lessons for practitioners.

Pressure Control Mechanisms

We observed various pressure control strategies with the uni-pressure and dual-pressure augmented mouse.

Uni-Pressure Control Strategies

Figure 9:
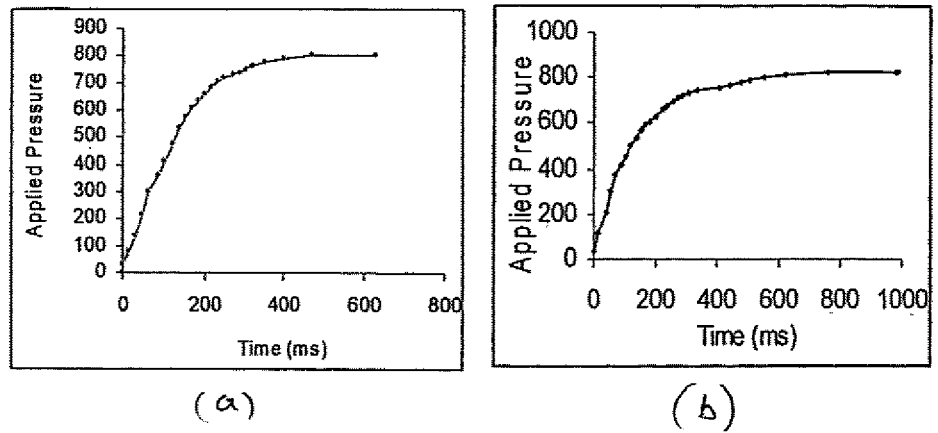
FIG. 9 illustrates a trace of applied pressure over time of a typical user control when using the top sensor with the click-technique for pressure levels (a) 8 and (b) 10 when selecting a target at a distance of 815 pressure pixels.
Figure 10:
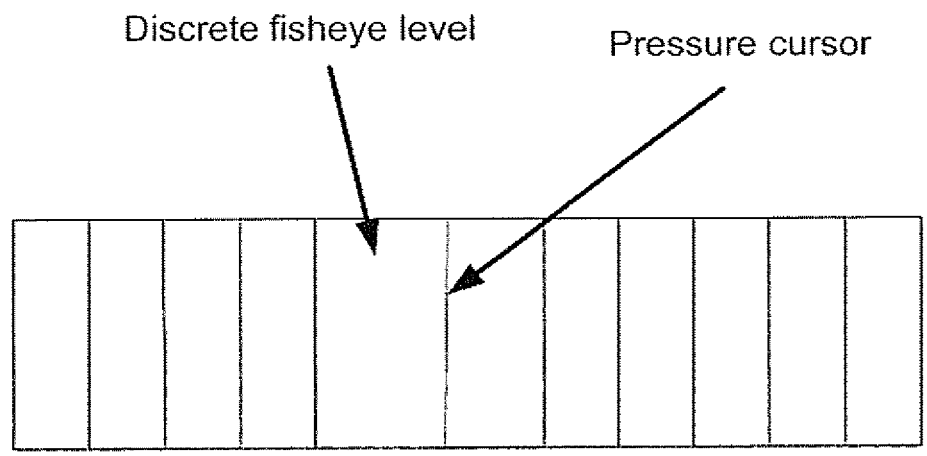
FIG. 10 is an illustration of the details of a fisheye discretization function. The purpose of the fisheye function is to allow for smoother and more accurate control of the pressure selection mechanisms. The size of each pressure level is adjusted according to the current position of the pressure cursor. Larger space is reserved for the current pressure level. The amount of pressure units reserved for the fisheye is defined by the radius, r. The figure also presents the relationship between all the elements involved in the fisheye function.

The experimental software recorded continuous time and pressure values for each trial. A typical trace of a user's selection task when using the click mechanism is shown in FIG. 9. Users' action can be characterized by two steps: First a coarse-grained pressure input to get closer to the target and then a fine-grained precision movement to select the target. 1n the coarse-grained movement users apply instantly and rapidly a pressure amount to get in the range of the desired pressure value. However, to select the appropriate target, users then control more carefully the pressure input up to the target.

More precisely, we notice that once users get within the vicinity of the target they take approximately between 150 and 300 ms to refine their pressure movement to select the target. This is often the time it takes the user to feel confident that they have the correct pressure value and momentarily switch their attention to the index finger for clicking the button. Further enhancements in this fine-grained stage will improve performance of the click selection technique and possibly allow the user to select more than 6 pressure levels.

Dual-Pressure Control Strategies

With dual-pressure strategies users were able to better control different pressure levels using tap-and-refine than switch-to-refine. This was a result of the several factors. With tap, users can control pressure levels bi-directionally. As a result, overshoots can be easily corrected. Additionally, since with tap users depend on tapping to get toward the vicinity of the target, users have a higher degree of control over the coarse-level items. The fine-level items require further control which can easily be handled if the set of fine-level items contain less than six items, Switch is partially restricted by the number of levels controllable with each sensor, In our study we compared the two techniques at 64 discrete levels. These were separated into 8×8 discrete levels. As a result, adding more levels to any of the two sensors would show significant performance decreases with switch.

The tap in Tap-and-Refine may be replaced by a simple button. The design would need two additional buttons (one for each direction) and one pressure sensor to work effectively. However, using the standard right or left-click buttons would interfere with the click selection mechanism and other mouse functionalities. Further, the context switch that would ensue switching between the button and the pressure sensor would further contribute to reduced performance of the technique. Analysis of our log files suggest that typical tap times are about 50 to 80 ms which seems faster that the button click times reported in [8], However, further research is needed to investigate alternatives to Tap-and-Refine.

Applications

A pressure augmented mouse can enhance interactivity in a number of different applications, Integrated scaling and parameter manipulation. Ramos et al. [14] proposed a fluid pen-based interaction technique, Zliding that integrates scaling and parameter manipulation. In Zliding users control the scaling factor by applying pressure at the stylus' tip and delegate parameter manipulation to the stylus' x-y position. Tap-and-refine can be modified to accommodate the design goals of an integrated scale and parameter manipulation technique. In tap, the parameter manipulation would be assigned to the coarse-level movement of tapping onto the pressure button. The scale factor would be relegated to the holding-down action in the tap.

Mode switching. Many applications require that users switch between modes rapidly [8]. In games for instance, it is critical that users switch modes quickly to access a weapon or some other tool. In drawing applications, a significant amount of work takes place in small local regions of the workspace. Drawing applications require that users access different options on palettes in the application for such tasks as modifying the thickness of the pen of changing a color. Pressure buttons can allow users to select a mode without making significant displacements in the application.

Pressure Menus. Pressure menus could be designed in a similar manner to polygon marking menus [21]. On the spot, users can trigger and interact with a large menu. Using tap users can iterate through an infinite amount of menu values and refine their selection as needed.

Design Recommendations

There are several lessons that designers can take from our experiments:

Place pressure buttons so that they are accessible by the middle-finger and the thumb.

Consider mechanisms for selecting pressure values based on mouse button clicks.

Use dual-pressure mechanisms for increasing the selectable range of pressure levels and modes.

Consider tap-and-refine as a control mechanism for providing bi-directional pressure input on a large number of pressure levels.

Augmenting a mouse with pressure based input poses several design challenges, some of which we addressed in this paper. Results of the first experiment show that pressure buttons are best controllable by the middle-finger and the thumb. The first study also confirmed that users can comfortably control a limited number of pressure levels with one pressure button. Additionally, the uni-pressure augmented mouse did not facilitate bi-directional pressure input. The limitations of a uni-pressure augmented mouse led to the design of a dual-pressure augmented mouse along with two interactive mechanisms, tap-and-refine and switch-to-refine, to control pressure levels. The results of the second study showed that with tap-and-refine users can comfortably control a large number of pressure levels. Furthermore, with tap-and-refine users can provide pressure input in a bi-directional manner.

Discretization Functions

As described above, the pressure sensitive switch is arranged to distinguish among pressure values in discrete pressure ranges corresponding to different pressures being applied by the user by dividing the entire range of pressure values into discrete units with a discretization function. The entire range of pressure values can be divided into 8 or fewer discrete units in some embodiment, however when using certain discretization functions, the pressure values may be divided into 8 or many more discrete units. In each instance, the discretization function is arranged to produce a limited number of discrete levels to facilitate the control of raw pressure values obtained from the pressure switch. In other words the discretization function converts analog pressure values to a limited number of discrete levels.

The discretization function can be linear, quadratic or fisheye.

When the function is linear, the function is given by the following equation, $$y = \text{floor}\left(\frac{x*l}{R}\right)$$

where x is the raw pressure value from the pressure switch, l is the number of pressure ranges, and R is the total number of raw pressure values.

When the function is quadratic, the function is given by the following equation, $$y = \text{floor}\left(\frac{(x^2*l)}{R^2}\right)$$

where x is the raw pressure value from the pressure switch, l is the number of pressure ranges, and R is the total number of raw pressure values.

The fisheye discretization function is particularly advantageous for increasing the controllable number of discrete pressure units as it is arranged to divide the range of pressure values into discrete pressures units such that a currently selected one of the discrete pressure units is arranged to be larger between respective upper and lower pressure value limits than remaining non-selected discrete pressure units. Accordingly, once the pressure switch is depressed by a given pressure value, the correspondingly selected discrete pressure unit will remain selected despite small variations in the applied pressure value. The fisheye function is given by the following equation.

$$y = \begin{cases} \text{floor}\left(\frac{(x-r)*(l-1)}{R-r}\right)+1 & x > r - \frac{R-r}{l-1} \\ 0 & x \le r - \frac{R-r}{l-1} \end{cases}$$

where x is the raw pressure value from the pressure switch, l is the number of pressure ranges, r is the fisheye radius, and R is the total number of raw pressure values.

Recently, several studies have reported the benefits of pressure-based interaction as an alternative input channel [24,27-29]. Ramos et al. [28,29] explored the design space of pressure-based interactions with styli. Their results revealed that adequate control of pressure values is tightly coupled to a fixed number of discrete pressure levels (maximum of six levels). Mizobuchi et al. [26] investigated accurate control of pressure exerted on a pen-based device and showed that users can better control forces that are divided into discrete levels and smaller than 3N. Cechanowicz et al. [24] investigated augmenting a mouse with one or two pressure sensors and showed that with one sensor users can control between 8 and 10 discrete levels.

One common outcome reported by previous studies is the high number of errors that result from pressure-based input [24,29]. As a result, pressure input may not be highly practical as a reliable input dimension. This limited ability to properly control pressure has made it difficult to introduce pressure input to facilitate tasks that require multiple levels of pressure control such as in menu navigation [24], scrolling, and high-precision zooming [28].

The discretization method that researchers employed for dividing the pressure range into discrete units or levels is an important aspect of the pressure-based systems in previous studies. However, since manufacturers of pressure-sensing devices apply different analog-to-digital (AtoD) converters there is no standard mechanism to discretize the number of pressure levels. As a result, there are many methods and mappings for discretizing the number of controllable levels using a pressure-based device [24,27,29]. Ramos et al. [28] and Mizobuchi et al. [27] used a linear discretization function, while Ramos et al. [29] used a parabolic-sigmoid discretization function that resulted in a slow response at low pressure levels, linear behaviour in the middle levels, and a slow response at the high levels of the pressure range. Cechanowicz et al. [24] used a quadratic discretization function that allocated larger pressure ranges at the lower levels and smaller pressure ranges at higher levels.

Studies investigating user control of pressure input have reported time-accuracy trade-offs of, on average, over 30%, when interacting with a large number of pressure levels. To increase the level of control with pressure input, we designed and evaluated four different discretization functions: linear, fisheye, visual fisheye, and clustered. The fisheye discretization dynamically modifies the range of pressure values based on the position of the pressure cursor. Our results show that a fisheye function results in significantly lower error rates and a lower number of crossings than have been reported in the literature. Furthermore, the fisheye function improves control without compromising speed. We discuss the findings of our study and identify several design recommendations for integrating pressure control into common interface tasks.

In this paper we present the design of PressureFish, a fish-eye discretization function (see FIG. 11) and compare it to a variety of discretization methods proposed in the literature. We carry out our investigation on a pressure augmented mouse [24]. Our results show that the fisheye function increases accuracy without compromising speed. For example, at 10 pressure-levels with a fisheye function, users are significantly more accurate with 78% accuracy compared to 54% for linear and require significantly less target crossings (i.e., overshooting the target before acquiring it) with an average of 0.4 crossings per trial compared to 0.7 for linear. Overall, by using the fisheye discretization function users are able to exhibit better control of pressure input.

Discretization Functions

The analog force exerted by the user on a pressure sensor is converted to a digital data stream through a manufacturer-specific AtoD converter. As a result, manufacturers provide 256, 512, or 1024 discrete integer pressure values. However, users cannot effectively control these large numbers of discrete values. Applications further discretize the raw integer values by grouping adjacent values into unique controllable pressure levels [24,29]. Here we describe the various discretization functions (henceforth referred to as 'function') we evaluated in this study.

In our descriptions we use the following variables: x—the raw pressure value from the sensor; I—the number of pressure levels the space is divided into; R—the total number of raw pressure values from the pressure sensor.

Linear Discretization: A linear function (L) partitions the entire pressure space into equal units. For instance, a pressure space of 600 units (R=600) divided into 10 levels (I=10) would produce levels consisting of 60 pressure units each. The linear function is given by (formula)

Numerous studies have reported using a linear function to control pressure input [23,24,26].

Clustered Discretization:

Some groups [24,29] have used functions that assign more pressure levels to the middle range of the pressure space by hand-picking various design parameters like the starting pressure unit for each level and the number of pressure units for each pressure level. Rather than handpick, we used a K-means clustering algorithm to discretize the space. Users were asked to select randomly highlighted pressure levels discretized using the linear function described above and a quadratic function described by Cechanowicz et al. [24]. We collected raw pressure values for 6 users (208 trials/user) and used the K-means clustering algorithm to design an overlapping discretization for each pressure level. Following a pilot study that showed no significant difference between the quadratic and linear functions, we decided to proceed with the linear function only, to allow us to compare and contrast linear (L) with K-mean clustered linear (KC).

PressureFish Discretization:

This fisheye function (FE) was inspired by the fisheye distortion functions introduced by Furnas [25] and applied to fisheye menus [22]. The idea of a fisheye function is to make the area near the point of interest highly visible. This results in a distortion with a variable amount of space reserved for the various elements in the pressure space. Items further away from the focal point occupy less space, while items closer to the focal point occupy more space, and the item of focus itself occupies the largest amount of space. While this distortion of the visual space offers enhanced visibility researchers have also reported targeting problems that arise from the constant change of control-to-display ratio [26].

However, the fisheye function could be particularly advantageous as a discretization function for three reasons. First, when the pressure cursor is at the level of interest, the fish-eye function automatically increases the amount of pressure values assigned to that pressure level. As a result, when the user presses the pressure sensor and fixes it to a particular level, the selected pressure value remains selected despite small variations in the applied pressure value. Second, finger-tips have a tendency to exert inadvertent forces. Such forces directly affect the movement of the pressure cursor, thereby reducing the level of user control. Since the fisheye function reserves sufficient space for the active pressure item, minor forces from the tips of the finger do not significantly impact pressure control. Finally, since the control space involves depressing a sensor rather than moving a mouse, users are less likely to have targeting problems.

We use the following fisheye function (r=fisheye radius) (formula)

To effectively control the fisheye selection, several design choices are possible. Each of the design parameters consist of modifying the values for r, R, and l given the equation above. In this study, we used values of R=600, l consisting of values 6, 8, 10, 12, and 16, and r was assigned a value of 120 pressure units. These values were selected based on a number of pilots we ran before starting the final study.

Visual Fisheye Discretization:

Visual feedback is an essential element in pressure-based interaction [24,27-29]. While the fisheye function divides the entire pressure space into non-uniform units, the visual fisheye (VF) function uses an underlying linear function but presents the visualization as a fisheye menu. As a result, the users are controlling the pressure cursor using a linear function but are being led into believing that the pressure is being controlled using a fish-eye technique. The motivation behind the design of VF is that if such a technique were to be successful then developers could simply enhance the visual presentation of pressure input. We were interested in identifying whether the visual effects were sufficient to improve control without changing the underlying discretization function (i.e. identify the degree of importance of visual feedback on pressure input).

Comparison of Discretization Functions

Our experimental goal was to examine differences in accuracy, speed and number of crossings using different functions. The experimental design we used was adapted from two other studies [24,29].

The experimental software recorded trial completion time (MT), errors (E), and number of crossings (NC) as dependent variables. MT is the total time taken for the user to apply the appropriate amount of pressure and select the target. NC is the number of times the cursor leaves a target after first entry for a particular trial. E is the number of times the participant selects a location which is not a target. The trial ended only when the user selected the right target, so multiple errors were possible for each trial. While MT gives us an overall success rate, E and NC provide information about the level of control achievable using each of the different pressure-control mechanisms.

We used an optical mouse with a pressure sensor mounted on the left side, where it is easy and comfortable to be accessed with the thumb (FIG. 11). The sensor (model #IESF-R-5L from CUI Inc.) could measure a maximum pressure value of 1.5N and provided 1024 pressure levels. However in our experiment we only used the range from 0 to 600, as earlier studies suggest that user fatigue is common at higher pressure ranges [24]. The software was implemented in C# and the sensor was controlled using the Phidgets library. The experiment was conducted on a 1024× 768 pixels screen with a P4 3.2 GHz, Windows XP.

Task and Stimuli

In the task, participants were asked to control a red cursor moving vertically in a gray rectangular menu. The cursor starts at the top of the gray menu when the pressure value is 0. The cursor moves down when participants press the pressure button and moves up when participants release the pressure button. The menu is divided into small units based on the selected function and the number of pressure levels. The system randomly highlights, in yellow, a menu item the user is required to select. In each trial, participants are required to move the red cursor into the yellow target area and select the target with a Dwell or Click selection mechanism, which have been shown to be the best selection mechanisms for a pressure mouse [24]. The trial ends when the participant selects the appropriate target. If the selected item is not the right target, then the item changes to a dark gray, and the trial continues until the participant selects the right target. To select using Dwell, users maintain the cursor within the target for 750 ms, whereas Click users click with the left mouse button.

The study used a 4×4×5×2 within-participants factorial design. The factors were:
Function: FE, VF, L, and KC.
Relative Pressure Distance: 128, 256, 384, and 512.
Pressure Level: 6, 8, 10, 12, and 16.
Selection Mechanism: Dwell and Click.

The order of presentation was first controlled for function type, and then for pressure level. Levels of the other two factors were presented randomly. After explaining the selection mechanisms, participants were given ample time to practice the techniques. The experiment consisted of three blocks with two repetitions per block, per condition.

With 14 participants (9 male, 5 female; average age=27 years), 4 functions, 4 distances, 5 pressure levels, 2 selection mechanisms, 3 blocks, and 2 trials, the system recorded a total of 13440 trials and the experiment took approximately 1 hour per user. None of the participants had any experience with pressure-based input.

Results

We used the univariate ANOVA and Tamhane post-hoc pair-wise comparisons (unequal variances) for our analyses.

Movement Time:

We found no significant difference between functions ($F(3,39)=1.898$, $p=0.15$). FE was the fastest followed by KC, L and VF (see FIG. 13($a$). As previously reported [23,28] we too found that Click was significantly faster than Dwell ($F(1,13)=19.105$, $p<0.001$).

Errors:

Overall, we found a significant difference in E between the functions ($F(3,39)=4.264$, $p<0.01$) and selection techniques ($F(1,13)=46.91$, $p<0.001$). Post-hoc pair-wise comparison of the functions showed that FE had significantly fewest errors followed by L, KC, and VF (no significant difference between L and KC). FIG. 13($b$) shows the average E for each function. There was a significant interaction between selection technique and function ($F(3,39)=7.654$, $p<0.001$). In the case of Click, the ranking of the functions was similar to that reported above, while for Dwell the order was L, KC, FE, and VF. However we could not find any significant difference between the functions for Dwell selection technique.

Number of Crossings:

We found a significant difference in NC between the functions ($F(3,39)=19.606$, $p<0.001$) and selection techniques ($F(1,13)=7.77$, $p<0.02$). Post-hoc comparison of the functions showed that FE had significantly fewer crossings than all other functions followed by KC, VF, and L (no significant difference between VF and L). FIG. 13($c$) shows the average NC for each function. We found no significant interaction between selection technique and function ($F(3,39)=2.86$, $p>0.05$).

Subjective Feedback:

FE was most preferred by nine users followed by L with three, KC with one and one with VF.

Discussion

The results of our experiment reveal that a fisheye function allows users to select pressure levels with greater accuracy and with lower numbers of crossings without losing out on performance time.

Fisheye Improves Pressure Control Across Levels

In line with our expectation, our results show that the method of discretizing the pressure space has a significant effect on the user's ability to control pressure. Additionally, users preferred this function over all the others. This effect is felt across all pressure levels (see FIG. 14). We found that the PressureFish function is effective as it primarily reduces the amount of inadvertent crossings and allows the user to "lock" into a specific pressure level.3

Results on speed, number of crossings, and accuracy, indicate that performance decreases gradually as the number of pressure levels increases beyond 6 (see FIG. 14, KC and VF always perform no different from L and have been removed from the figure to avoid visual clutter). However, beyond 12 pressure levels, we observe a very sudden drop in performance with all functions except the fisheye. In the case of the fisheye function, users can control up to 16 pressure levels almost as comfortably as 12.

Effect of Fisheye Control on Selection Techniques

As reported in previous studies [24,29] we too observed a larger number of errors with the Click selection technique in comparison to Dwell. One reason for this is that any force applied by one finger co-activates adjacent fingers simultaneously [30]. This effect is pronounced in the case of the Click selection technique as clicking the mouse button with the index finger activates muscles in the thumb, which in turn interferes with pressure control on the sensor. However, our results show that the fisheye function operates equally well with both selection techniques in terms of error rate, as well as the number of crossings. This suggests that fisheye functions can be universally applied across different selection mechanisms. Although untested, we believe this result is valid for a pressure sensitive stylus.

Effect of VF and KC on Pressure Control

Our results showed that users had difficulties controlling pressure in the VF condition. This result is consistent with other similar findings on desktop pointing and focus targeting with Fisheyes which suggest that distorting the control space results in better control [23] and distorting the visual space causes targeting problems if careful consideration is not given for the control space [26].

In all conditions, we found no significant difference in performance between KC and L. However, in most cases KC was marginally better than L. This can be attributed to the overlapping pressure units and the context-sensitive manner of deciding the pressure level. However, we believe that better segmentation of the pressure units could be achieved by careful analysis of the different types of errors (overshoot vs. undershoot) that users commit.

Recommendations to Designers

We provide the following recommendations:

Designers should consider using a fisheye function to improve pressure control.

A fisheye function will enable the use of a larger number of discrete pressure levels.

Visual feedback is an essential but not sufficient factor for the enhancement of pressure control.

In this paper we report on the design and effectiveness of PressureFish, a fisheye discretization function that allows users to control pressure input with fewer errors than previously reported discretization techniques, without time penalties and with higher user preference. We believe our results will facilitate integrating pressure-based input with other input mechanisms. In the future, we will investigate the possibility of designing pressure menus that behave similarly and that share the common advantages of marking-menus. We will also investigate other fisheye functions to improve accuracy and facilitate the design of novel and improved navigation techniques such as pressure-scrolling, panning and zooming. Effective control of pressure input can also lead to designs that allow users to manipulate the control-to-display ratio in instances such as cursor control in multi-display or large display environments.

Input devices such as the mouse have witnessed an impressive number of augmentations with additional input channels, including extra control buttons, the mouse wheel, and sensors. The augmentation of additional degrees-of-freedom is motivated by the need to enhance the interactivity of specific tasks at the interface: control buttons for gaming applications, the mouse wheel for scrolling and zooming, and sensors for switching between active screens.

In line with recent incarnations of the mouse, Cechanowicz et al [32] have augmented the mouse with additional pressure input channels, and called this augmentation the PressureMouse. The PressureMouse builds upon the recently published set of guidelines for pressure based interaction [40,44,46]. However, recent studies on pressure interactions primarily provide insight on the strengths and limitations of pressure-based input and offer guidelines for creating pressure augmented interactions. Very little is known on how to fluidly integrate pressure input channels with the basic operations of the input device to which it is being augmented.

A large number of pressure based interaction techniques proposed for the mouse are based on users manipulating the pressure channel independently of the movement degrees-of-freedom [40,44,46].

Related Work

We review the related research on pressure input and integral input channels.

Pressure Based Interaction

Numerous studies have proposed novel interaction techniques and have offered guidelines for working with pressure based input.

Ramos et al. [46] explored the design space of pressure-based interaction with styluses. They proposed a set of pressure widgets that operate based on the users' ability to effectively control a discrete set of pressure values. Ramos et al. [46] identified that adequate control of pressure values is tightly coupled to a fixed number of discrete pressure levels (six maximum levels), the type of selection mechanism and a high degree of visual feedback. However, their investigation does not explore the benefits of simultaneously integrating pressure control with stylus movement.

Mizobuchi at al. [40] conducted a study to investigate how accurately people control pressure exerted on a pen-based device. Their results show that continuous visual feedback is better than discrete visual feedback, users can better control forces that are smaller than 3N, and 5 to 7 levels of pressure are appropriate for accurate discrimination and control of input values. Their results apply to pen based pressure and they do not investigate multi-channel input.

Since controlling pressure input is challenging, Shi et al [47] recently proposed PressureFish, a technique to discretize the pressure space using fisheye functions. With PressureFish, users are capable of manipulating pressure input with a higher level of control and more efficiently than common discretization functions.

Researchers studied pressure input in the context of multi-level interaction. Zeleznik et al. [49] proposed an additional "pop-through" state to the mechanical operation of the mouse button. As a result, a number of techniques can take advantage of a soft-press and a hard-press on a pop-through button. Forlines et al. [33] proposed an intermediary "glimpse" state to facilitate various editing tasks. With glimpse users can preview the effects of their editing without executing any commands. Multi-level input can facilitate navigation, editing or selection tasks but utilize pressure input in a limited way. In particular, such techniques make it further challenging to fluidly control another input channel such as mouse movement.

Cechanowicz et al [32] investigated the possibility of facilitating pressure-based input by augmenting a mouse with either one or two pressure sensors. Such an augmentation allows users to control a large number of input modes with minimal displacements of the mouse. Cechanowicz et al [32] developed several pressure mode selection mechanisms and showed that with two pressure sensors users can control over 64 discrete pressure modes. Their results also show that activating pressure sensors that are located near the mouse buttons or located for thumb input are optimal placements for facilitating pressure input. However, Cechanowicz et al [32] did not investigate the possibility of fluidly integrating pressure input with other mouse based operations.

While previous studies have guided designers in building systems with pressure input, few results suggest how we can fully integrate pressure with the underlying input mechanisms of the device to which it is augmented. Ramos et al [44] proposed Zliding to control a scaling factor with pressure at the stylus' tip and manipulating a parameter with the stylus' x-y position. Similarly, with Pressure Marks [45] the user can invoke several states by steering the stylus and simultaneously applying a high or low pressure value. While both these studies highlight the possibility of integrating pressure input with the movement of the device, they have not explored the large design space that results when integrating both input channels. Furthermore, each technique falls short in inspecting the full range of the input channel: PressureMarks relies on a low or high pressure input (instead of the entire pressure range), and Zliding works within a limited displacement range. Furthermore, very little support was provided to users for facilitating simultaneous control more than one non-competing interactive tasks.

In general, very few of the reported results have explored the design space of fluidly integrating pressure input with the functional features of the device being integrated with. Furthermore, little is known about how pressure integrates with the very common task of moving a pointer. Based on this limited knowledge it is challenging to propose applications that can benefit from integrating pressure with multiple input channels.

We present PressureMove a pressure based interaction technique that enables simultaneous control of pressure input and mouse movement. Simultaneous control of pressure and mouse movement can support tasks that require control of multiple parameters, like rotation and translation of an object, or pan-and-zoom. We implemented four variations of PressureMove techniques for a 2D position and orientation matching task where pressure manipulations mapped to object orientation and mouse movement to object translation. The Naive technique mapped raw pressure-sensor values to the object rotation; the Rate-based technique mapped discrete pressure values to speed of rotation and Hierarchical and Hybrid techniques that use a two-step approach to control orientation using pressure. In user study that compared the four techniques with the default mouse-only technique we found that Rate-based Pressure-Move was the fastest technique with the least number of crossings and as preferred as the default mouse in terms of user-preference. We discuss the implications of our user study and present several design guidelines.

Pressure augmentation could potentially be designed such that the user can manipulate both pressure input and cursor movement, enabling users to synchronously perform actions that can otherwise only be accomplished sequentially. For example, a pressure augmented mouse could potentially enable users to rotate and translate an object synchronously, a task that is routinely carried out in drawing applications (FIG. 15).

Based on results of an early pilot study and prior work (Zliding[44] and PressureMarks[45]), we observed that users can simultaneously control pressure and movement, but not all users utilize the simultaneous control in fluid fashion. In this paper we investigate the design space and the resulting interaction techniques that allow simultaneous control of pressure and movement, referred to as Pressure-Alove. To demonstrate the effectiveness of PressureMove, we concentrated on the task of simultaneous rotation and object translation. We designed four PressureMove techniques that provide users the flexibility of using the input dimensions of pressure and movement simultaneously or sequentially. Pressure manipulations controlled object orientation and mouse movement controlled movement. The first a Naive technique mapped the raw pressure values from the sensor to the rotation of the object while mouse movement mapped to object translation. The second technique, referred to as PressureMove Rate-based, was inspired by tap-and-refine [32] and mapped the rate of pressure change to rotation angle. The third technique is an Hierarchical technique that uses discrete pressure levels for object rotation in two steps—a coarse grain and a fine grain step. Finally, we included a Hybrid technique that combined the simplicity of Native technique with the multi-step control of Hierarchical. In a 2D rotate and translate task, similar to the tetrahedral docking task in 3D [38,51], we examined the proposed designs for integrating mouse movement and pressure rotation. Our results show that the Rate-based integration offered best control and performance. The Rate-based technique was significantly faster than all other techniques including the traditional mouse. The Naive implementation was as fast as the conventional mouse in terms of trial completion times but was significantly slower than the traditional Mouse and Rate-based technique in terms of crossings.

The main contributions of this paper are to: 1) extend the design space of a pressure augmented device (the mouse) to include simultaneous control of pressure and movement; 2) design integral interaction techniques; 3) identify strengths of various strategies for controlling non-competing degrees-of-freedom; and 4) outline design implications that emerge from our systems.

Fluidly Controlling Multiple Input Channels

There has been a long standing interest in identifying how to integrate and facilitate control of simultaneous input channels. Jacob et al [43] proposed a framework that can facilitate the understanding and categorization of integrality and separability of input devices and interactions afforded by these. Two input dimensions are considered integral if they are perceived as a single dimension or separable if the dimensions seem unrelated [43]. In their study, performance was better when the device matched the tasks in integrality/separability dimensions. In light of their findings, coordinating multiple channels may suggest whether the input device is operating in the same dimension space as the task, i.e. good coordination and performance suggests that the device and perceptual structure of the task are in the same space. Integrality can be considered to some extent as a coordination measure.

Balakrishnan et al [31] used integrality to demonstrate that subjects could control three degrees of freedom simultaneously with the Rockin'Mouse, a X-Y translational and one Z-rotational DOF. Similarly, MacKenzie et al. [37] investigated the possibility of integrating rotation on the mouse, a device designed primarily for translation and selecting objects. The TwoBall mouse facilitates a number of common tasks, and makes certain application features, such as the rotate tool, redundant.

Studies have also investigated the benefits and possibility of integrating several tasks into one coherent and fluid action. Kruger et al. [35] designed a technique, RNT (Rotate'N Translate), to fluidly integrate rotation and translation. The motivation behind RNT was to provide in one seamless action the ability to rotate and translate an object in a collaborative environment. The behavior of RNT simulates the physical behavior of dragging a sheet of paper on a table.

Results of their study show that RNT is more efficient than separately controlling translation and rotation. RNT further enhances a number of collaborative tasks, including coordination and communication with respect to user orientation.

Fluid integration of multiple input channels was examined in the context controlling an input device with the fingers instead of using the entire arm. In an empirical study, Zhai et al [51] investigated the effectiveness of finger muscle groups in controlling multiple degrees-of-input. Zhai et al [51] gave users two alternative 6DOF input devices, one that controlled a cursor with the movement of the entire arm (glove) and the other with the fingers of a hand (FingerBall [X]). The objective of the study was to assess whether finger control was more effective than arm control in finely rotating and positioning an object in 3D. The task consisted of docking a cursor with the target, both of which were equal size tetrahedral. They found that the finger-based device facilitated better control and afforded simultaneous translation and rotation actions.

In developing a metric for measuring the allocation of control in a 6 degree-of-freedom rotation and translation task, Masliah and Milgram [38] studied the interdependence and overlapping actions of the two tasks. They used a 3D virtual docking task, similar to that of Zhai [50] in which subjects were asked to align a tetrahedral shaped cursor onto an identically shaped target. Interestingly, their results showed that users would rarely control all 6 DOFs simultaneously. Instead, users would allocate their control to the rotational and translational DOFs separately. However, with practice they found that allocation of control within the translational and rotational components of the task increased.

Wang et al [48] carried out a study to investigate the relationship between object transportation and object orientation by the human hand. In their experiment, subjects were asked to align a small wooden block with a graphical target cube. Manipulation tasks were designed that required both object translation and orientation, under different visual feedback conditions. Their results demonstrate the existence of a parallel and independent structure for object translation and orientation which is persistent over different visual feedback conditions. Their results suggest that object translation and orientation seem to share characteristics of an integral structure according to the notion by Jacob et al [43].

PressureMove

We propose PressureMove, a pressure based technique that facilitates simultaneous control of mouse movement and pressure input. PressureMove maps mouse displacement onto object movement and pressure input onto object rotation. In designing PressureMove we needed to consider two primary dimensions: controlling pressure input, and visual feedback.

Controlling Pressure

Sensors typically report pressure values between 0 to 1024 levels. Previous studies have suggested that users are not capable of distinguishing the granularity and controlling this range of pressure values [32,40,46]. This has led most investigations to discretizing the pressure space into controllable and haptically perceivable units. Ramos et al. [44,46] revealed that adequate control of pressure values is tightly coupled to a fixed number of discrete pressure levels (maximum of six levels). Cechanowicz et al. [32] suggested that pressure discretization can include 8 to 10 discrete levels, when controlled by the thumb or index finger, on a mouse.

Furthermore there are no standard mechanisms to discretize the number of pressure levels obtained from the sensors. There are many methods and mappings for discretizing the number of controllable levels using a pressure-based device. These include: a linear discretization function [40,46]; a parabolic-sigmoid discretization function that results in a slow response at low pressure levels, linear behaviour in the middle levels, and a slow response at the high levels of the pressure range [44]; a quadratic discretization function [32] that allocates larger pressure ranges at the lower levels and smaller pressure ranges at higher levels; a fisheye function that provides a larger space around the position of interest in the pressure space [47].

An alternative to discretizing pressure input is to map the raw pressure space (non-discretized—referring to the fact that the discrete pressure values reported by the sensor are not further discretized) onto the task parameters. Each unit of pressure in the raw pressure space controls an input parameter, whether it be angular rotation, scalar, or other factor. Raw pressure input is not easily controlled, however facilitates a larger number of mappings.

We can also define a hybrid pressure space that is composed of continuous and discrete pressure values. With hybrid control, continuous pressure input can provide the user with rapid access to a region of interest within the pressure space while switching to discrete control allows finer granularity and control over parameter values.

The design of PressureMove includes discrete, raw, and hybrid pressure control techniques.

Visual Feedback

Kinesthetic feedback alone is insufficient for adequately controlling pressure. Visual feedback is a dominant characteristic of most closed-loop pressure based interactions [32,40,44,46]. Different forms of Visual feedback for pressure based input have been explored in PressureWidgets [46]. However, the Visual feedback in PressureMove is inspired by the visual feedback mechanism used by Kittenakare et al [34] and Ramos et al [46]. Since the design of the visual feedback is intricately tied to the task, we de-scribe the feedback designed for the task of simultaneously positioning and orienting an object. We expect that a similar form of visual feedback can be easily adapted for other simultaneous control tasks.

A pressure cursor is used to provide appropriate visual feedback. The default cursor is a solid triangular shaped object (see FIG. 16(a)). When the user applies pressure a proportion of this cursor gets highlighted relative to the amount of pressure being applied as in FIGS. 16(b) and 16(c). Visual feedback is always continuous, as this form of feedback has shown to enhance performance over non-continuous visual feedback. Additionally, we redundantly encode pressure amount to the aperture of the pressure cursor, i.e. the higher the pressure value, the large the aperture of the cursor (as is seen in the difference in size of the cursor in FIGS. 16(a) and 16(b)).

In the case where we used a hybrid pressure space we used a two-step cursor as shown in FIGS. 16(d) and 16(e). The head-triangle (the triangle that represents the head of the cursor) represents the first pressure space the user can use while the second triangle corresponds to the second pressure space. In FIG. 16(d) the user is currently controlling the first pressure space while in FIG. 16(e) the user is operating with the second pressure space. In cases where multiple pressure spaces are composed to form the technique, multiple triangles can be concatenated. However, in our design we only used up to two pressure spaces composed to form a single technique.

PressureMove Techniques

We describe four variations of PressureMove techniques that can be created to manipulate mouse movement and pressure input simultaneously. All pressure interaction techniques used the thumb sensor to manipulate the parameter in one direction and the middle finger sensor to manipulate the parameter in the reverse direction.

PressureMove-Naive

Figure 17:
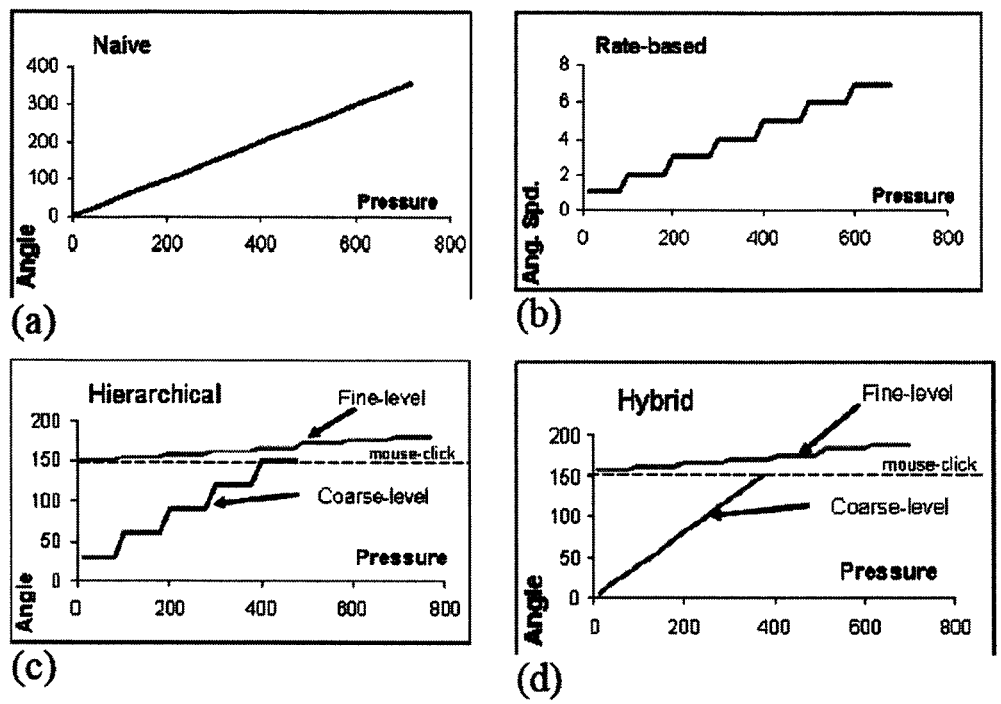
FIG. 17 illustrates the pressure mapping functions for each of the PressureMove techniques comprising: (a) Naive implementation; (b) Rate-based technique; (c) Hierarchical technique; and (d) Hybrid technique. The dotted horizontal line in FIGS. 17 (c) and (d) at Angle=150 indicates a left-click action.

As the name suggests this is a naive implementation of a simultaneous control technique. In this technique the raw pressure values reported by the pressure sensor are mapped to the object parameter controlled by pressure. FIG. 17(a) shows the mapping function—the pressure range is mapped to the complete range of the rotation parameter, i.e. 360° angle. When the user increases pressure the object orientation increases and when they release pressure the orientation reverses i.e., if the initial direction of rotation is clockwise then on releasing pressure the object change orientation in the counter-clockwise direction. When the user releases the pressure sensor the parameter value returns to the starting position. To fix the value the user can left-click before releasing pressure. When the user presses the thumb sensor the object rotates clock-wise and the visual feedback is as shown in FIG. 16(b). When the user switches to the sensor located on the middle finger the object rotates counter-clockwise.

PressureMove—Rate-Based

In this technique each level of the discrete pressure space maps to the speed of rotation of the object as shown in FIG. 17(b). When the user maintains pressure at discrete level 1 the object rotates by 1° at each timer event. To move the object faster the user moves higher up within the pressure levels. At level n the object rotates at n degrees per timer event. This mechanism provides the additional benefit of maintaining a given orientation when the user releases the pressure sensor, thus incorporating a clutching mechanism that is not available with the naive technique. At discrete level 0 the user can tap the pressure sensor to nudge the object by 1° per tap. This gives the user additional fine control when honing in on the target. This tapping was inspired from the Tap-and-Refine technique in [32]. The visual feedback used was the same as for the Naive implementation.

PressureMove—Hierarchical

PressureMove-Hierarchical allows users to control rotation in two steps—a coarse-step and a fine-step. The coarse and fine movement is controlled by a discrete pressure map-ping. In the coarse-step moving to a pressure level 1 results in rotating the object by 24° (one step is 360°/15 levels=24°) and moving up successive levels rotated the object by 24° per level n (n C [0,15], n is the coarse-step pressure level). Thus at any pressure level the object is rotated by n*24°; while in the fine-step moving up each pressure level rotates the object by 1° starting from n. The object rotates from n to n*24−15 using one sensor and from n up to n*24+15 using the other sensor where n is the point in the coarse-control when the user switches to fine-control. The user can toggle between coarse- and fine-step by using the left click button. FIG. 17(c) shows the pressure vs angle profile for this technique. The dotted line at about 150° indicates the moment at which the user moved from coarse to fine control using left-click. FIGS. 16(d) and 2(e) show the visual feedback that was provided to the user when using the thumb sensor (so object rotates clockwise). The top triangle of the cursor changes with pressure when the user is performing a coarse-level action (as in FIG. 16(d)) and the bottom triangle changes with pressure when the user if performing a fine-level action (as in FIG. 16(e)).

PressureMove—Hybrid

Hybrid combines the simplicity available with Naive with the fine control provided by Hierarchical. The coarse-step of Hierarchical is replaced by the continuous rotation control used in Naive (see the bottom left part of FIG. 17(d)). This enables the user to quickly rotate the object to approximately the desired orientation and then use finer step control to perform a more precise orientation. The fine-control step and the visual feedback (b) mechanism worked exactly as in Hierarchical.

Experiment

The goal of this experiment was to evaluate Pressure-Move as a viable concept for simultaneous control of pressure input and mouse movement. We specifically evaluated the four PressureMove techniques, to assess their strengths and weaknesses, with a canonical task.

Task and Stimuli

Figure 18:
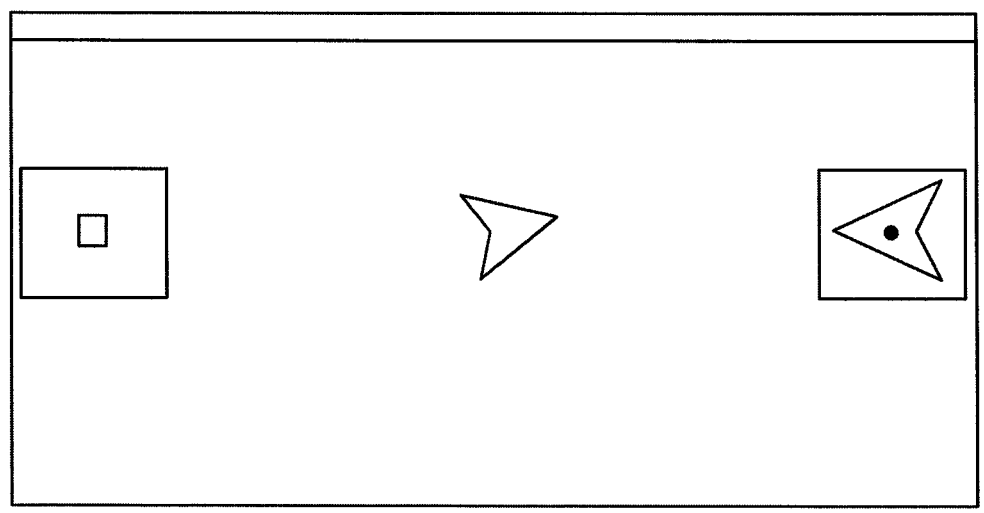
FIG. 18 is schematic representation of an experimental task consisting of docking a triangular shaped object over a target in which rotation can be controlled using pressure, and displacement can be controlled with mouse movement.

The task, shown in FIG. 18, required the user to reposition and reorient to a target location and orientation a small object (100×100 pixels) which initially appeared upright and in the left end of the screen. The target, of a slightly larger size than the object appeared to the right of the object. The size, the distance to the object and the orientation of the target were changed as part of the experimental design.

Users could see the object and the target before the beginning of each trial. The trial began when the user moved the cursor onto the object and pressed the left mouse-click. The user repositioned and reoriented the object to the target location using the different interaction techniques. When the object position and orientation matched the target position and orientation, the target bounding rectangle changed to a green color. The user then had to maintain the matching position and orientation for 1 second before the trial was completed. We did this to prevent users from accidentally matching the position and orientation. If the user moved the object away from the matched position, the 1 second timer was reset. The object position and orientation were considered to match those of the target if the difference in pixels and orientation was within the target-fit parameter controlled as factor of the experiment. When the trial is completed the target bounding rectangle briefly turns red and the next trial loads.

Hardware Configuration and Techniques

Our study used an optical mouse with pressure sensors mounted on its rim (FIG. 15). The sensors (model #IESFR-5L from CUI Inc.) could measure a maximum pressure value of 1.5 Ns. Each sensor provided 1024 pressure levels. The application was developed in C# and the sensor was controlled using the Phidgets library [41]. The experiments were conducted in full-screen mode at 1280×800 pixels on a Intel T5600 1.83 GHz, Windows Vista OS. Two sensors were mounted on the mouse such that they could be easily accessed by the thumb or the middle finger (as shown in FIG. 15). All pressure interaction techniques used the thumb sensor to rotate the object clockwise and the middle finger sensor to rotate the object counter clockwise.

For all the discrete pressure based techniques we used the PressureFish discretization function [X] with 15 pressure levels. For the continuous pressure cases we only used pressure values between 0 and 720 as previous research has shown that users find it difficult to maintain pressures at higher values.

Procedure and Design (115 Page)

The study used a 5×2×3×2 within-participants factorial design. The factors were:

Technique: Naive, Rate-based, Hierarchical, Hybrid, Mouse-only.
Distance: 500 pixels, 1100 pixels.
Orientation: 60, 135, 270.
Target Fit: tight, loose.

The order of presentation first controlled for technique and then for distance followed by orientation and target-fit. A tight target-fit meant that the users had to position the center of the object within ±4 pixels of the target center and the object orientation has to be within ±5 degrees of the target orientation. In the case of loose target-fit these figures were ±12 pixels and ±8 degrees respectively. We explained the techniques and participants were given ample time to practice the techniques at the beginning of the experiment. The experiment consisted of three blocks with each block comprising of two repetitions for each condition. With 5 techniques, 2 distances, 3 orientations, 2 target-fits, 3 blocks, and 2 trials, the system recorded a total of (5×2×3×2×3×2) 360 trials per participant. The experiment took approximately 60 minutes per participant.

Performance Measure and Participants

The experimental software recorded trial completion time, and number of crossings as dependent variables. Trial completion time (MT) is defined as the total time taken for the user to position and orient the object within the target. The number of crossings (NC) is defined as the number of times the object enters and leaves the target position or orientation for a particular trial. Users were not able to proceed to the next trial without successfully completing the task and so there were no errors for the software to record. While MT gives us an overall success rate, NC provides information about the level of control achievable using each of the different pressure control mechanisms. Participants were also asked in an exit questionnaire to rank the different pressure control techniques in terms of mental demand, physical demand, effort, overall performance and frustration.

Thirteen participants (11 males and 2 females) between the ages of 19 and 40 were recruited from a local university. All participants had previous experience with graphical interfaces and used the mouse in their right hand. However, none of the participants had worked with a pressure based input device before.

Results

We used the univariate ANOVA test with participant number as a random factor and Tamhane post-hoc pair-wise tests (unequal variances) for all our analyses.

Completion Time

Figure 19:
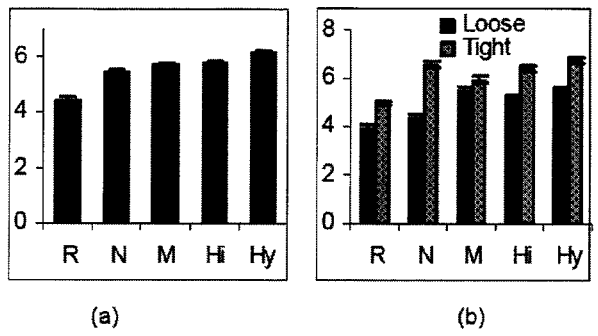
FIG. 19 is a graphic representation of a mean trial completion time (along the Y-axis in seconds) with standard error bars (a) for each technique and (b) for each technique and target-fit.

The average trial completion time was 6.1 s with a standard deviation of 4.9 s. Out of a total of 4680 trials 73 outliers (more than 3.5 standard deviations from the group mean) were excluded from further analysis. There was a significant effect of interaction technique ($F(4,48)=11.15$, $p<0.001$), target-fit ($F(1,m=102.9, p<0.001$), distance ($F(1,12)=7.5$, $p<0.02$), Orientation ($F(2,24)=15.9$, $p<0.001$) and block-number ($F(2,24)=43.4$, $p<0.001$) on MT. FIG. 19 shows the mean trial completion time for each technique and target-fit. Overall, Rate-based was the fastest technique followed by Naive, Mouse, Hierarchical, and Hybrid.

Post-hoc analysis showed that all pairs were significantly different except (Naive, Mouse), and (Mouse, Hierarchical). Block 3 was significantly faster than Block 2 which was significantly faster than Block 1. Users were significantly slower in completing the trials when the target-fit was tight (as opposed to loose); when targets were farther (1100 pixels followed by 500) and when the orientation of target was greater (all combinations significantly different with 270 deg>135 deg>60 deg).

Crossings

Figure 20:
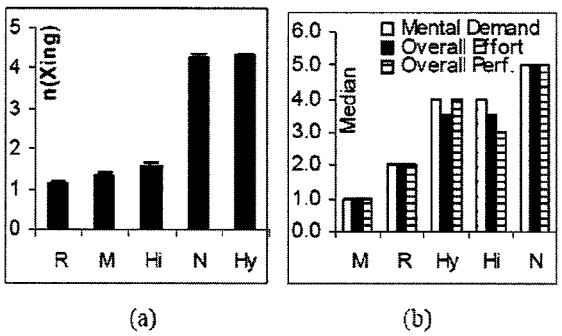
FIG. 20 is a graphic representation of (a) Mean scores for different techniques and (b) Median user-ranking of different techniques in terms of Mental Demand, Overall Effort and Performance.

The average number of crossings per trial across all conditions was 2.5 (standard error=0.048). There was a significant effect of interaction technique ($F(4,48)=55.15$, $p<0.041$), target-fit $W(1,12)=68.1$, $p<0.001$), distance ($F(1,121=7.5$, $p<0.02$), Orientation ($F(2,24)=19.8$, $p<0.001$) and block-number ($F(2,24)=13.7$, $p<0.001$) on MT. We found no effect of target distance on number of crossings. FIG. 20(*a*) shows the mean crossings for each technique. Overall Rate-based had the least number of crossings, followed by Mouse, Hierarchical, Naive and Hybrid.

Post-hoc comparisons showed that there was a significant difference between all pairs except the (Rate-based, Mouse), (Mouse, Hierarchical) and (Naive, Hybrid). Block 3 had significantly fewer crossings (mean 2.1) than Block2 (mean 2.4) which in turn had M R Hy Hi N significantly fewer crossings than Block! (mean 2.9). Users had significantly fewer crossings in the loose target-fit condition (mean 2.1) than in the tight target-fit condition (mean 2.9). Users had significantly fewer crossings when the target orientation was 270 deg (mean=2) when compared to 60 deg (mean=2.7) or 135 deg (mean=2.9). We found no statistical difference in number of crossings between 60 and 135 deg.

Subjective Ranking

In terms of overall performance users ranked the Mouse as the best technique followed by Rate-based, Hybrid, Hierarchical and Naive. Anova test on the overall performance revealed a significant difference in terms of user ranking between the different techniques ($F(4,64)=16.6$, $p<0.001$). Post-hoc analysis did not reveal any significant differences between (Mouse, Rate-based) and (Hierarchical, Hybrid) pairs. But all other pairs were significantly different.

We found similar rank-ordering of the techniques in terms of Overall Effort, Mental Demand, Physical Demand, and Frustration (see FIG. 20(*b*)). In all cases Mouse was the most preferred technique (least demanding and frustrating) closely followed by Rate-based. The least-preferred technique was the Naive implementation. In all cases, Anova showed significant difference in user ranking and post-hoc analysis revealed no significant difference between the (Mouse, Rate-based) pair and (Hierarchical, Hybrid) pairs but all other pairs were significantly different.

Discussion

Performance Improved Over Blocks

Figure 21:
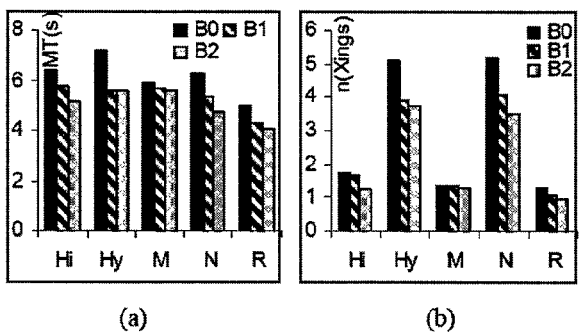
FIG. 21 is a graphic representation of comparison of the techniques over each block for (a) MT; and (b) Crossing.

As can be seen in FIG. 21, users were constantly improving their performance over the three blocks for both trial completion times (FIG. 21(*a*)) and number of crossings (FIG. 21(*b*)). The average MT in Block 3 was 5.0 s compared to 5.3 s for Block 2 and 6.1 s for Block 1. However, the univeriate analysis we used in the previous section did not reveal any significant interaction between technique and block number for both MT and Crossings. Thus while users continued to improve their performance over each block the overall order of the different techniques did not change. Observing improvement over blocks is in line with prior work that suggests that with practice users are able to allocate better control to the simultaneous operation of different input dimensions of the task [38].

Effect of Orientation

Figure 22:
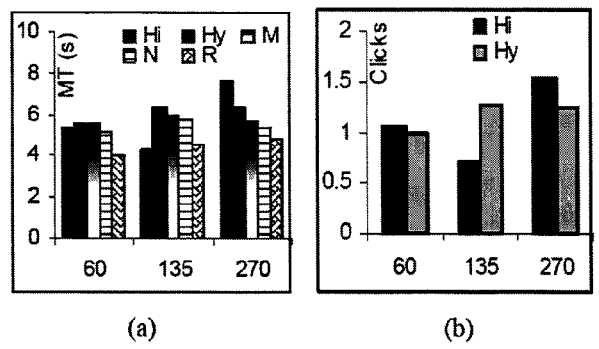
FIG. 22 is a graphic representation of (a) Mean MT for each technique and orientation; and (b) Mean number of clicks of Hierarchical and Hybrid techniques for each orientation.

The Hierarchical technique was more markedly affected by the target orientation than the other techniques. Especially when the target orientation was 270 deg, the average MT for Hierarchical was about 7.2 s compared to 5 s for the other two orientations (see FIG. 22(a)). To select the target at 270 deg orientation users often used the thumb sensor that rotated the object clockwise. This meant that the user had to maintain pressure at level 11 while selecting the left-click to go to the fine level of control. As users found it difficult to maintain pressure steadily at this level, they often lost the level while trying to click requiring them to click again to comeback to the coarse-level. This resulted in a large increase in the number of clicks when the target orientation was 270 deg (see FIG. 22(b)).

However, when the target orientation was 135 deg, users had to maintain pressure at level 5 which was in the middle region of the entire pressure range making it easy for users to maintain pressure at this level, resulting in markedly smaller number of clicks and consequently faster trial completion times. From FIG. 22(a) one can see that for the target orientation of 135 deg Hierarchical was the fastest technique with an average MT of 4.3 s compared to 4.5 s from the next fastest technique—Rate-based.

Overall, while we believe we can explain users' performance with the hierarchical technique, we are not sure why users did not use the second sensor to rotate the object counter-clockwise. Users were made aware of this option during training and they often used the second sensor (without hesitation) in the Rate-based and Naive techniques.

Simultaneous Control

Figure 23:
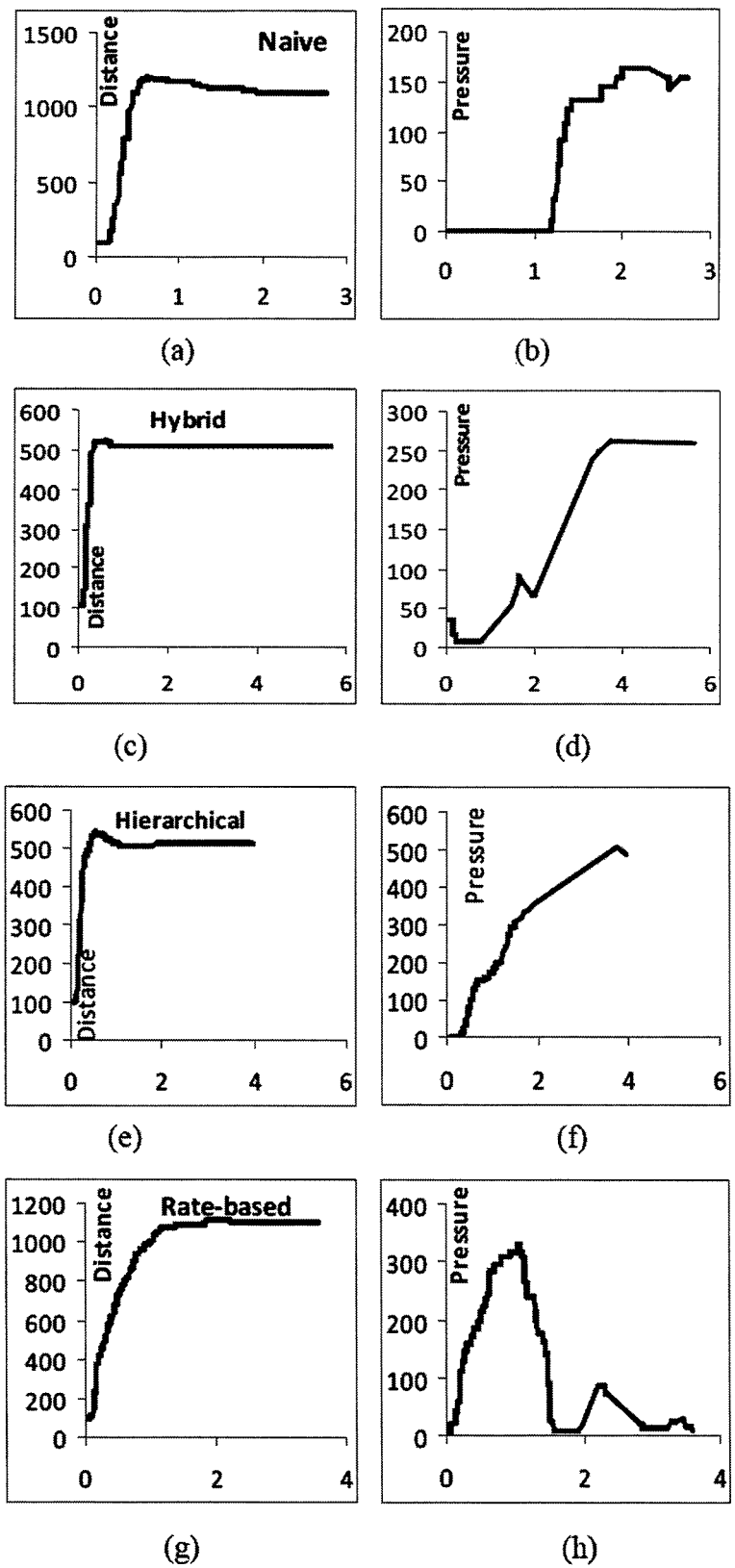
FIG. 23 is a graphic representation of traces of a typical user control when using the four PressureMove techniques in which the patterns reveal the degree of simultaneity employed in each of the techniques, ranging from low simultaneity with the Naive technique to high simultaneity with Rate-based.

As part of the experimental log we collected continuous data of mouse movement and pressure values for each trial. FIG. 23 shows typical movement and pressure profiles for the four pressure-based techniques. Each left-right pair is distance and pressure profile for the same trial of a user. However, each technique is from a different user, selected randomly to highlight that the movement profiles shown in the figures are stereotypical. In the left images when the distance is not changing the user has positioned the object near the target whereas the same interpretation is not true for all pressure based techniques. The Rate-based technique being a relative input technique, users don't need to maintain constant pressure to complete the task We can see from the figure (FIGS. 23(a) and 23(b)) that the Naive implementation does not really encourage simultaneous control of pressure and movement. Users use the first second to complete positioning the object before applying pressure to change orientation. We observe a similar trend with the Hybrid technique.

In the case of the Hierarchical technique, users start applying pressure about the same time that they start moving (see FIGS. 23(e) and 23(f). But in the first part of their motion (between 0 and 2 s) they mostly focus on moving the object to the right location and then switch attention to orienting (between 2 and 4 s) the object.

But in the case of Rate-based technique, users start applying pressure to change orientation at the same time as they are moving the object to position it. In FIGS. 23(g) and 23(h) we see that in the first 2 s the user is both positioning the object while at the same time as applying pressure. However, unlike the Hierarchical technique, they have completed most of the positioning and orienting within the first 2 s and between 2 and 4 s they are merely fine-tuning the object. We believe that the open-loop motion for both positioning and orienting coincide making rate-based technique a powerful PressureMove technique. However, we did not test this hypothesis with our data.

We observed similar profiles across all users and believe that PresssureMove technique that's based on a rate-based mapping encourages users to simultaneously control both movement and pressure.

PressureMove—Rate-Based

Our results, across all conditions show that PressureMove—Rate-based outperforms all other PressureMove designs. Several unique properties of the rate-based technique con-tribute to its superior performance.

First, this technique is based on discrete pressure control. Since each level of the discrete pressure space maps onto the angular speed parameter, a high degree of control is required to hold and maintain the pressure at given discrete levels. This is facilitated by a small number of discrete pressure levels and by the use of discrete fisheye function.

Additionally, since each pressure level is assigned an angular velocity, pressure level 0 brings the rotating object to a halt, at the last applied orientation. The implicit clutching mechanism in the rate-based technique allows smaller close-loop movements than the other techniques. Finally, the technique allows fine adjustments at level 0, by nudging the object by 1° every tap. The fine grain control over angular displacement and the fluidity of this technique facilitates a higher degree of simultaneous control than any of the other systems.

Results similar to ours which show that rate-based technique improves performance in certain types of input devices, have been observed in 3D positioning tasks. Zhai [50] points out that using isometric devices (such as a joy-stick that self-centers) to operate in a position control mode (or zero-order) results in poorer performance than when operating the device in a rate-based controller (or a first-order) mode.

Applications

PressureMove can enhance the interactive performance in a number of different applications. In all of the following applications, the simultaneous control of more than one input parameter would ease the task of the operator. While we have not evaluated each of the PressureMove techniques for these applications, we believe the Rate-based implementation of PressureMove would offer improved performance.

Zoomable User Interfaces

Zoomable user interfaces can largely benefit from the simultaneous control of several parameters. In Zliding, the user was given the ability to control scale and the resolution of the scale. In a similar manner PressureMove can control various parameters by applying pressure to a scalar value and movement to direction of the zooming operation. For instance moving the mouse left or right could zoom in or out respectively, while pressure would control the resolution factor of the zooming operation. In terms of implementation, the rate-based technique would change the resolution of the zoom operation by one step at each level of angular velocity. Similarly, a combined Pan+Zoom interface could be easily implemented using PressureMove. For example on a map, the mouse movement would pan the document while pressure input zooms in or out. Seamless and integrated panning and zooming has shown to improve performance over manipulating each dimension separately. Finally, in most ZUI implementations the center point of reference in the zoom interface is defined by the position of the cursor or crosshair before transitioning into the zoom. However with PressureMove, the position of the cursor can be updated dynamically during zoom transitions, thereby facilitating a larger degree of freedom in moving around a workspace while zooming. In all these applications undoing or returning to a previous state is easily achieved by using the additional pressure sensor.

Drawing Applications

Drawing applications facilitate a large number of object positioning tasks with operations that involve rotating elements, scaling and/or skewing. In these applications, operations requiring coarse or approximate movements (such as scaling or skewing an object) could be relegated to the pressure input and precise positioning could be assigned to the mouse movement. Two pressure sensors would be required to undo operations, a feature that is currently part of PressureMove. Furthermore, we PressureMove can be adapted for object manipulation and positioning in 3D. CAD systems could utilize the pressure input dimension to rapidly rotate the entire scene, thereby making accessible a different aspect of the 3D drawing.

Pressure Menus

While in systems such as PressureMark where users controlled a high or low pressure value, our results demonstrate that with PressureMove users can control several intermediary pressure levels during movement. This can be particularly useful for designing (as was done with Pressure-Marks) an interactive menu in which different menu items are triggered based on the pressure level invoked during movement. Thus PressureMove could integrate fluid menu invocation with object selection as is done with techniques such as zone and polygon[52] or marking[G] menus or others similar techniques developed for styluses.

Dynamic Control-Gain

PressureMove could be utilized to dynamically manipulate control gain ratios. Such manipulation is particularly useful on high resolution, large display interactions on which users operate with fine and coarse resolution. While the applications suggested earlier utilize pressure input for a task independent of cursor movement, in this application users would be controlling one task dimension with two input channels. We believe that novel design spaces and solutions can result from investigating the use of Pressure-Move in such environments.

Design Recommendations

There are several lessons that designers can take from our investigation: Pressure input can be appropriately integrated with mouse movement, such that both dimensions are operated simultaneously. This should result in higher performance gains than operating with either channel separately.

PressureMove—Rate-based should be the first and preferred implementation of any PressureMove application. The discrete pressure control, fine grain pressure mapping and inherent clutching mechanisms in the rate-based techniques are favorable properties that could be borrowed to implement other variations of PressureMove for simultaneous pressure and movement control.

Allowing users to gain experience with PressureMove is important and may be necessary in some cases, i.e. any new implementation of a PressureMove technique should not be discarded without first giving consideration to proper training.

PressureMove is a novel technique that facilitates the simultaneous control of various input parameters. We designed PressureMove to specifically facilitate object rotation with pressure input and object movement with the mouse displacement. We designed and implemented four PressureMove techniques, based on existing pressure-based interactions [32,44]. Our PressureMove techniques cover the wide spectrum of possibilities with pressure control and mouse displacement mappings. In a study, the Rate-based PressureMove technique, which maps pressure input to angular velocity allowed the maximum amount of simultaneous control of pressure with mouse movement. Users were able to perform a docking task more efficiently and with fewer crossing with the rate-based implementation. We have demonstrated the possibility of simultaneous control of pressure input and mouse movement. We believe other similar interactions involving simultaneous pressure and movement are possible and will enhance the interactive performance on tasks with multiple input dimensions.

Pressure input has become a topic of significant interest within the HCI community as researchers slowly gain insight on how to harness the potential of pressure based interaction. Researchers are devising new pressure-based input devices [56,79], integrating pressure input into existing devices [59,61] or are exploring the limitations to pressure input [70,73,76-78]. To make this form of technology more widespread and applicable in common interactive tasks, researchers are producing a fair amount of knowledge on some of the key aspects of pressure based input such as identifying the number of pressure levels that are easily controllable, the necessity for visual or haptic feed-back, or the limitations to controlling pressure in a bidirectional manner. Despite the significant progress in this area over the past few years, a question that lingers concerns how to bring these pressure sensing interactions closer to the average user's daily interactive activities.

Commercially, several input devices facilitate pressure based interactions, such as with a stylus on a tablet PC. However, pressure sensing interactions are not limited to pen-based systems. Recently, Apple introduced the Mighty-Mouse™ [72] that is equipped with two pressure sensing buttons attached to the opposite sides of the outer rim of the mouse. Integrating pressure buttons on a mouse as that employed by the MightyMouse™ is analogous to adding additional buttons to mice for managing multiple windows, for scrolling documents or for enhancing gaming activities. However, such enhancements can provide very limited interaction bandwidths as it can be difficult for a user to benefit from the different buttons due to the ergonomics, the physical space limitations of the mouse and the potential conflict that may arise from placing the buttons in inappropriate locations on the mouse.

Ideally, it has been suggested that pressure sensing capabilities should be added to a device without significantly changing a device's form factor [79]. A potentially compelling design that can seamlessly integrate pressure interaction onto the mouse would consist of substituting or augmenting the current primary left and right mouse buttons with pressure buttons as in FIG. 24. If such a design were to be successful, mouse designers could give users the freedom to select (click) and trigger actions (double-click) as is currently carried out with mouse buttons in addition to facilitating continuous pressure control at the interface. This approach is similar to that proposed by Zeleznik et al [83] in the pop-through mouse. However the pop-through mouse only facilitates interaction with three discrete states (soft click, hard click, release) and as a result constitutes a limited form of pressure-based input.

To facilitate an interchangeability of pressure sensors with mouse buttons, at a minimum two primary and fundamental features of a regular mouse button would need to be replicated: selection and action invocation. Selection is commonly performed by clicking while triggering an action (such as opening a file or application) is handled by double-clicking on the mouse button.

RELATED LITERATURE

We review the literature in three related areas: pressure-based interaction, input selection techniques and pressure-based selection techniques.

Pressure Based Interaction

Numerous studies have demonstrated the effectiveness of, and have offered guidelines for working with pressure based input.

A number of studies have investigated the design space resulting from pressure based interaction with styluses [70, 76,78]. Pressure input with a stylus is captured by directly applying a force on the tip of the stylus and orthogonal to the surface of a screen. In one study, Ramos et al. [76] approached the design space by identifying the con-fines of interacting with pressure widgets. Mizobuchi et al. [73] were interested in studying the degree of accuracy that is achievable by controlling pressure with a pen-based device. The results of these investigations shows that pressure control is most effective when the pressure space is divided into approximately 6±1 discrete pressure levels, when pressure control is kept under 3N and when a high degree of visual feedback accompanies pressure based input [70,73,78,82]. Their results are primarily applicable to the use of pressure based interaction with a stylus and they did not investigate the implications of interchanging primary selection mechanisms on a stylus with pressure sensors.

In a recent study Ramos et al [77] designed pressure marks, a fluid pressure-based input with pen strokes to combine selections and actions at the interface. Pressure marks are designed in such a manner that users can make a stroke with varying levels of pressure to trigger an action. In a study, pressure marks which allow users to specify selection and action concurrently outperformed existing techniques that require these operations to be performed in a sequential manner.

For over a decade, isometric devices have used pressure input as a method of controlling the user's mouse cursor. In such systems users decrease or increase the amount of force on an isometric pointing nub to control the velocity of the cursor. The PalmMouse™ [74] integrates isometric control into a mouse by allowing users to control cursor speed by applying a slight amount of pressure to a navigation dome which is placed on the top of the mouse. Isometric devices map pressure input to the speed of the cursor and have not been designed for substituting the selection mechanisms of buttons on a mouse.

Touchpads that sense pressure are widespread input devices in notebooks or portable music players. Researchers have successfully integrated discrete mechanisms of selection and action with continuous pressure based input with touchpads [79]. On a touchpad, users can perform a single tap or double tap to trigger a selection or an action, respectively. Additionally, with a touchpad, continuous pressure input is used to for mapping various functions, such as scrolling. Pressure sensing is utilized in a limited manner on touchpad based input through which a user can control the document scrolling rate by pressing onto the edge of the touchpad.

One recent development that has largely motivated the research presented in this paper was the development of a pressure augment mouse [59]. Cechanowicz et al [59] investigated the possibility of facilitating pressure-based input by augmenting a mouse with either one or two pressure sensors. Such an augmentation allows users to control a large number of input modes with minimal displacements of the mouse. Cechanowicz et al [59] developed several pressure mode selection mechanisms and showed that with two pressure sensors users can control over 64 discrete pressure modes. Their results also show that activating pressure sensors that are located near the mouse buttons or located for thumb input are optimal placements for facilitating pressure input.

However, Cechanowicz et al did not investigate the possibility of facilitating all selection-based operations on pressure-augmented mouse such as the mouse click and double-click.

Several other researchers have shown the potential of extending the pressure sensing capabilities of touchpads to provide for a richer set of interactive capabilities. Blasko and Feiner [56] proposed multiple pressure-sensitive strips by segmenting a touchpad into different regions. They show that pressure-sensitive strips do not require visual feedback and users can control a large number of widgets using their fingers. Rekimoto and Schwesig [79] propose a touchpad-based pressure sensing device called PreSenseII that recognizes position, contact area and pressure of a user's finger. PreSenseII eliminates the need for visual feedback by providing an amount of tactile feedback proportional to the amount of pressure being applied onto the touchpad.

The left mouse button serves a vital purpose in a GUI as it enables users to select an object through a single or a double-click. To invoke a basic button click the user applies sufficient pressure on the button beyond a fixed threshold. Users get both aural and haptic feedback during the clicking process. However with a mouse button user input is restricted to a single or double-click. Here we investigate the benefits and trade-offs of using pressure sensors for a mouse left-button. While sensors lack any form of haptic or aural feedback mechanism, they are effective in allowing users to control a continuous range of pressure values thereby facilitating a wide range of input. In a first study we compared the time it takes the user to click with a pressure sensor in comparison to the mouse button. Our results show that users can click as effectively with a pressure button as with a regular mouse button. In a follow-up study we compared two pressure sensor based double-click strategies to the traditional button double-click. We found that pressing on pressure sensors is an excellent substitute to mouse double clicks. Overall, our results suggest that buttons can be effectively replaced by pressure sensors for actions that involve clicking and double clicking.

In this paper we introduce and evaluate several potential designs for a mouse click with pressure sensors. Results of the first study show that a single click can be effectively replaced by a pressure click. Based on the results of the first study we design several other pressure clicking mechanisms to replace the mouse double-click. The results of a second study show that a hard press with a pressure sensor is more effective than a double click. The results overall open up the potential of enhancing mouse buttons with pressure sensors so that a wider range of input modes can be accessed with one of the most commonly used input devices.

The main contributions of this paper are to: 1) extend the potential of a mouse with pressure sensing input; 2) identify strategies for invoking mouse clicks with pressure sensors; 3) identify possible design elements for replacing current clicking mechanisms.

The idea of interacting using either continuous pressure modes or discrete selection action modes with one pressure sensing input mechanism, similar to that on touchpads has inspired to a certain extent the development of the systems presented here.

Input Selection Techniques

Pointing and selecting objects is considered to be a primary and necessary operation for most common forms of interactions. If we consider pointing and selecting as two separate processes, we can refer to pointing as the movement of a cursor starting at some initial position and ending on the target, and selection as the initiation of a button click and release. Some evidence suggests that selection alone (i.e. button clicking) without pointing can consume a significant amount of the total target selection time [57,68]. As a result, enhancing the selection mechanisms on an input device can lead to more efficient interactions. Most commonly available input devices such as the mouse, the stylus or touch-screens have witnessed several enhancements for replacing or improving selection.

On a mouse, selection is achieved by clicking on one of two or three primary buttons. Designers have proposed several alternatives to button-clicking. Bohan and Chaparro [57] compared a mouse-click to a dwell-to-click, or hover. In their study Bohan and Chaparro found that a hover of 200 ms provided a gain as high as 25% for task completion times in comparison to a mouse button press and release [57]. The GentleMouse™ [64] is a commercial product designed to eliminate button clicks. With the GentleMouse™ users pause (with a configurable time delay) the mouse cursor to initiate a click. The delayed pause briefly displays a small, see-through window or trigger window. By moving and pausing once again the mouse cursor into the trigger window the user can simulate a button click. The GentleMouse™ is being primarily targeted to users with repetitive strain injuries given that mouse-clicking has been found to accentuate disorders such as carpal tunnel syndrome [62].

Touchpads are very common input devices on notebooks and provide an alternative to mice when working in constrained spaces. Touchpad implement the selection with either a physical button or using a lift-and-tap technique. MacKenzie and Oniszczak [71] devised a finger-pressing technique with tactile feedback as an alternative to click and lift-and-tap on a touch pad. In one study, MacKenzie and Oniszczak [71] found that with the tactile selection users were 46% faster than with a button click, and 20% compared to the lift-and-tap.

On a stylus, users commonly invoke a selection by directly tapping and then releasing the stylus over an object. Since tapping does not reflect how people naturally use notepads, where writing and making checkmarks is common, designers have developed an alternative referred to as touching [80]. Unlike tapping which requires that a pen touch a screen and be lifted directly over the target to select it, touch interactions only require that the target be touched at some point. As a result, touching supports selecting targets by crossing them, making checkmarks and even tapping. Results show [68,80] that touching is a viable alternative to tapping for completing selection, even for the elderly [HB]. Other pen-based systems have shown that crossing targets can be more effective than point and click selections [66]. With CrossY [66] the pointing is eliminated and instead selection happens in one fluid motion by crossing an object.

Touch screens are also very common and facilitate one of the most natural forms of pointing and selecting, by allowing users to select objects with a finger. Potter et al [75] compared three selection mechanisms, take-off, first contact and land-on. Take-off, allows the user to drag a cursor that appears above the user's finger tip and select an object by taking off the finger from the touchscreen as the cursor appears in a target. In first-contact the user can drag their finger across an empty area of the touchscreen and selects an object by making contact with it. Land-on triggers selection the first time the finger lands on the screen. Their results show that users perform better with take-off than with first-contact or land-on [75]. Albins son and Zhai [54] extended the work of [75] to design more accurate selection mechanisms on touchscreens. However their research primarily focused on reducing pointing errors on touchscreens instead of final selection mechanism.

Pressure-Based Selection Mechanisms

Researchers have proposed using pressure based selection [55,61,71] as an alternative to button-clicking, which we refer to as pressure-clicking. Pressure-clicking has been proposed for the mouse [59,83], for touchpads [71], for text-entry [61] and for multi-touch screens [55].

Several studies discuss the integration of a multi-state pressure button to the mouse. Zeleznik et al. [83] proposed an additional "pop-through" state to the mechanical operation of the mouse button. As a result, users can move beyond a simple click or double click by using a number of techniques that take advantage of a soft-press and a hard-press with a pop-through button, such as shortening/lengthening adaptive menus, character instead of word selection with text, or moving a scroll bar with finer instead of coarser control. Forlines et al. [63] proposed an intermediary "glimpse" state on a mouse-click to facilitate various editing tasks. Glimpse can be activated using pressure-based selection. With glimpse users can preview the effects of their editing without executing any commands. Multi-level input can facilitate navigation, editing or selection tasks but utilizes pressure input in a limited way.

On a Synaptics™ touchpad, MacKenzie and Oniszczak [71] facilitate pressure-clicking by giving users aural and haptic feedback on the touchpad when it is pressed and released. To prevent spurious clicks, the transitions from clicking to releasing (and vice-versa) include hysteresis, i.e. the pressure level that maps to the button-down action is higher than the pressure-level that maps to, the button-up action. However the authors in [71] do not provide the most appropriate pressure levels to simulate the button clicks and instead suggest that the correct thresholds must be determined empirically.

Pressure-clicking has also been employed as an alternative to multi-tapping buttons on a cell-phone for text-entry [61]. In such systems, only a limited number of pressure levels (between 3 to 4) are necessary to enter text with each key [61]. The authors in [61] present the possibility of concurrently combining discrete and continuous pressure input to perform such tasks as zooming or scrolling with large workspaces.

Recently, a pseudo pressure-clicking technique, SimPress, was implemented for facilitating precise selection techniques for a multi-touch screen [55]. In a non-pressure based input system, Benko et al [55] map changes in the finger's contact area to the changes in pressure. SimPress requires users to perform a small rocking movement with their finger from the point of contact to the wrist to simulate a click. With such a mechanism, Benko et al [55] were able to get fairly accurate selection rates on a touch-screen.

We designed PButtons to effectively simulate the primary operation of selection and action invocation. Based on the design framework suggested by [59] in designing a pressure augmented mouse, the design necessitates careful consideration to the placement of the sensors, the selection mechanisms, and the visual feedback In our design we also wanted PButtons to provide a fluid transition from clicking to continuous pressure control.

Selection Techniques with Pressure Buttons

We designed four pressure clicking techniques to operate with pressure sensors: pressure click, pressure click audio, pressure tap, pressure tap audio.

Pressure Click: This selection technique is designed to replicate the operation of a mouse button click. Applying a pressure Pdown the system invoked a mouse down event.

Releasing the pressure sensor after triggering a mouse down invoked a mouse up when the pressure level attained a level less than Pup. A pressure-timing graph in FIG. 25 depicts the invocation of a mouse down and mouse up with a pressure sensor and a button.

Pressure Click Audio: MacKenzie and Oniszczak [53,71] suggest that aural feedback is essential to the closed-loop feedback of clicking on a mouse button. In this selection mode, the system would produce a 'click' sound when the pressure threshold reached the mouse down and mouse up.

Pressure Tap: In this selection mode a click is registered if the user applies and releases pressure within a time interval of T. Anything slower is not registered as a click. Pressure tap was inspired from the continuous pressure selection technique referred to as tap-to-switch in [59]. FIG. 26 shows the invocation of a mouse click and release with pressure tap. The entire click-and-release operation is considered as one atomic unit. The click is triggered when the user is capable of applying and then releasing a pressure of 2 units within 150 ms. If the user is not able to apply and release the required pressure within the specified time interval then the system does not register a click.

Pressure Tap Audio: Pressure tap is missing tactile and aural feedback and this led to the design of pressure tap audio. mode, which plays a mouse down sound when pressure is applied and a mouse up sound if a click is successfully registered.

Visual Feedback

Based on guidelines from [70,73,78], feedback is a necessary component for the proper functioning of pressure input. Unlike mouse buttons, pressure sensors do not provide any aural or tactile feedback upon being pressed or released. This could adversely affect performance with pressure buttons.

Similar to many other studies, we provide visual feedback with pressure buttons when the user has invoked a mouse down and mouse up event. However, unlike the outcome of previous results that suggest using continuous visual feedback (i.e. showing how the user gradually makes it through the pressure space), pressure clicking relies on rapid actions. As a result, PButtons cannot harness any additional benefits from continuous visual feedback. PButtons simply highlights the cursor in orange when the sensor is pressed down and in green when released.

Action Techniques with Pressure Buttons

Figure 27:
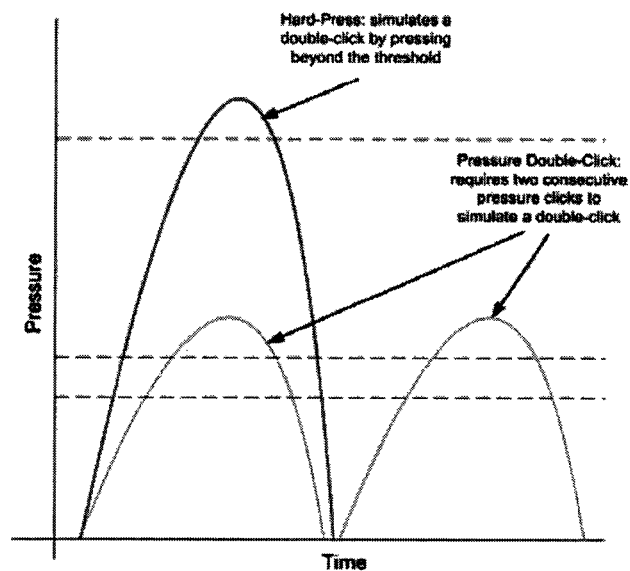
FIG. 27 is a graphic representation of a HardPress which triggers a double-click when the user presses beyond a threshold which is significantly higher than that required to do a single pressure click and for a Pressure Click in which a double-click is invoked by two consecutive pressure clicks.

While selection is a necessary and primary function of mouse buttons, users can also invoke actions such as opening a file or maximizing a window by double-clicking on a mouse button. Based on the results of the first study, PButtons implemented a double-click action registration mechanism. We designed three action invocation techniques, pressure double-click, pressure double-tap and pressure hardpress. Pressure double-click triggered a double-click by implementing two pressure clicks followed closely by one another. The time delay between the two pressure clicks is similar to the delay required to register a double-click using a mouse button. In most systems this delay is configurable to match the users motor capacities. Pressure double-tap triggered a double-click by implementing two pressure taps followed closely by one another. The time delay in between the two pressure taps is equivalent to the delay assigned to the two pressure clicks in the pressure double-click mechanism. However, to register each pressure tap the user needs to perform the complete press and release action within 150 ms. FIG. 27 depicts the hard-press and sensor double-click in a pressure-time graph. Additional specific details on the double-click mechanisms are provided in the section on double-click mechanisms below in the paper.

Study of Single-Click Mechanisms

In order to examine the value of pressure sensors in aiding selection we carried out a study to compare the various techniques for single-click. The main goal of this study was to two-fold, first to see if users can control pressure sensors as buttons without audio feedback and if pressure-sensor based selection techniques are at least as effective as physical button-click technique.

Apparatus and Method

Our study used an optical mouse with the pressure sensor mounted onto the surface of the mouse button (FIG. 24). The sensor (model #IESF-R-5L from CUI Inc.) could measure a maximum pressure value of 1.5 Ns. Each sensor provided 1024 pressure levels. Pressure sensors are mounted on the top of each of the two primary mouse buttons. Users could then click with the left or right finger to perform a selection. Depending on the input mode the primary mouse buttons were taped so that they could no longer be activated by pressing on the sensors. In the condition when pressure sensors were not tested they were removed from the mouse.

A known limitation of our study is that in comparison to the regular mouse buttons, the pressure buttons covered a very minimal area or footprint (see FIG. 24). This means that users might make contact with the pressure sensor with the side of their index or ring finger, which could affect the registered system pressure resulting in an error. As a result users could take longer to potentially trigger a selection with pressure buttons. This we believe is an artifact of our design and professionally constructed pressure buttons could alleviate this impediment.

The application was developed in C# and the sensor was controlled using the Phidgets library [65]. The experiment was conducted in full-screen mode at 1024×768 pixels on a P4 3.0 GHz Windows XP OS.

We used a selection task in which the participants were asked to perform a single-click action when a rectangular square turned green. At the beginning of each trial a timer counts-down to zero, when the square changes color from White to Green the user is required to perform the single-click action. We provide a 3-second count-down timer to cue the user so that they are prepared to do the action as quickly as possible when the timer reaches zero. Since we are primarily interested in recording motor-response times we felt this was an effective way to minimize errors.

The user did not have to move the cursor to perform their task and they were instructed to avoid moving the cursor. However cursor movement was not disabled to maintain a task that would be more ecologically valid. During each trial the user performed the selection action using the different selection mechanisms according to the pre-defined order of presentation.

Performance Measures

The experimental software recorded trial completion time, and errors as dependent variables. Trial completion time (MT) is defined as the total time taken for the user to perform the selection action from the time the square turned green. The software records an error (E) when the participant performed an action but did not complete the selection action. For example, in the Pressure-Click mechanism this could occur when the user does not press the pressure sensor hard enough for the system to register a click. The trial ended only when the user completed the selection action, so multiple errors were possible for each trial. Participants were also asked in an exit questionnaire to rank the different selection techniques.

Procedure and Design

The study used a 2×5 within-participants factorial design. The factors were:

Input Device Location: Left side (Index Finger), Right side (Middle Finger). For the purposes of our study, we are testing the location of the primary mouse button, usually controlled with the index finger, and the location of the secondary mouse button, usually controlled with the middle finger. These locations are important because they are the locations of the majority of mouse clicking and mouse button usage.

Input Mode: Button Click, Pressure Click, Pressure-Click with Audio Feedback, Pressure-Tap, Pressure-Tap with Audio Feedback.

Button click consisted of a single click with the mouse button. In Pressure Click (with and without Audio) we use a Pdown of 4 units (sensors collected a range of 1024 discrete pressure units) and a Pup or 2 pressure units. In the audio feedback condition, users heard a 'click' sound when both the Pdown and Pup levels were crossed. For Pressure Tap (with and without Audio) we use a time interval T of 150 ms and the same pressure levels as those used for the pressure click condition. The major difference is that users are required to cross both pressure thresholds within the time limit of 150 ms.

The order of presentation was first controlled for input device location and then for input mode. We explained the input modes and participants were given ample time to practice the tasks with the various conditions at the beginning of the experiment. The experiment consisted of three blocks with each block consisting of twenty repetitions for each condition.

Ten participants (4 males and 6 females) between the ages of 19 and 25 were recruited from a local university. All subjects had previous experience with graphical interfaces and used the mouse in their right hand.

With 10 participants, 2 device locations, 5 input modes, 1 task, 3 blocks, and 20 trials, the system recorded a total of (10×2×5×1×3×20) 6000 trials. The experiment took approximately 40 minutes per participant.

Results Completion Time

Figure 28A:
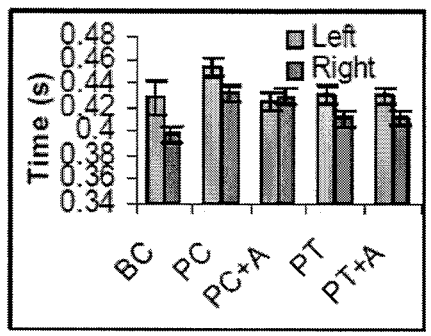
FIG. 28 (a) illustrates mean completion time with standard error.
Figure 28B:
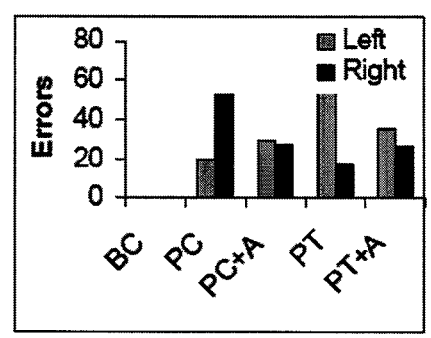

We used the univariate ANOVA test for our analyses. To make the data conform to the homogeneity requirements for ANOVA we used a natural log transform on the completion time and only included in our analysis trials that were successfully completed. However, all the results are presented on the original untransformed data. Results showed no main effect of Input Mode and Location on trial completion time with $F_{4,26}=2.551$ and $F_{1,6}=1.198$ ($p>0.05$) respectively. Users were on average faster when selecting with the right location. Users were fastest with button-click followed by pressure-tap, pressure-tap with audio, pressure-click with audio and pressure-click. FIG. 28 (left) shows the mean completion time for each mode grouped by location.

Errors and Subjective Feedback

Across all conditions there were a total of 272 errors. The distribution of errors is as shown in FIG. 28 (right). There were no errors with the button-click technique. Seven of the ten subjects preferred button click while three preferred pressure click with audio.

Discussion

Figure 29:
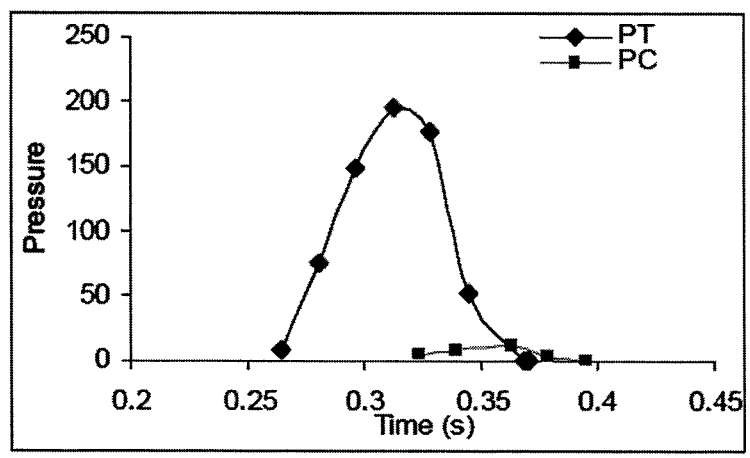
FIG. 29 is a graphic representation of a Time vs. Pressure plot for typical single click actions with Pressure Tap and Pressure Click.

We could not detect any difference in completion time between the interaction modes. Our results show that even though Button-click was the fastest selection technique, the difference in selection time with Pressure tap was less than 80 ms. As shown in FIG. 29, even though users press hard with Pressure Tap (peak pressure value ranged from 100 to 300 units) users could in one quick action engage and disengage interaction with the pressure sensor.

As mentioned earlier the footprint of the pressure interaction techniques was smaller than the footprint of the mouse buttons. This difference did not affect completion times. During the trials users often rested their finger on the sensor or the button to reduce device acquisition times. But to execute the selection action they had to lift their finger and reacquire the sensor. This sometimes resulted in errors as users sometimes applied pressure at an angle using the side of their finger. Where possible the experimenter noted these errors manually and found that they accounted for 78 of the total number of errors reported in FIG. 28 (right). If the PButtons are professionally designed we believe this error-rate would be much lower and could also increase the user's preference for this style of selection.

Based on our results, we believe that pressure sensors can effectively replace mouse buttons for selection actions.

Study of Double-Click Mechanisms

The results of the first study show that pressure clicking is a viable alternative to mouse clicks. However, the main goal of this study was to see if users can use pressure-sensors for double-click actions. The experimental apparatus and task were similar to those used in the previous study. The only change is the users is required to perform a double-click action instead of a single-click action.

The study used a within-participants factorial design with the Double-click mechanism as the independent variable.

Input Mechanism: Button Click, Pressure Click, Pressure Tap, HardPress and HardPress with audio Feedback. Button click simply consisted of the conventional double-click with the mouse button. Pressure click consisted of two consecutive clicks with the pressure sensor. No time-out delay was used between the two clicks. The pressure value for a down click (Pdown) was 4 units and for a release (Pup) was 2 units. Pressure tap required users to only apply a pressure of $P=2$ units and release within 150 ms, rather than at $P=4$ units. The HardPress required that each user press beyond a certain activation level, but only once. The major difference between HardPress and the other clicking techniques was that the user only needed to press once instead of twice. Since we did not find any significant difference between the conditions with and without audio for Pressure click and Tap in the single-click condition we did not include audio-feedback enhanced versions of these techniques in this study. This also helped us keep the study to a more manageable number of independent factors.

Ten participants (5 males and 5 females) between the ages of 19 and 25 were recruited from a local university. All subjects had previous experience with graphical interfaces and used the mouse in their right hand. The order of presentation was controlled for input mechanism.

With 10 participants, 5 input modes, 1 task, 3 blocks, and 20 trials, the system recorded a total of (10×5×1×3×20) 3000 trials. The experiment took approximately 20 minutes per participant.

As with the previous study, the experimental software re-corded trial completion time, and errors as dependent variables. Participants were also asked in an exit questionnaire to rank the different selection techniques.

Results

Completion Time and Errors

We used the univariate ANOVA test and Tamhane post-hoc pair-wise tests (unequal variances) for all our analyses.

Figure 30:
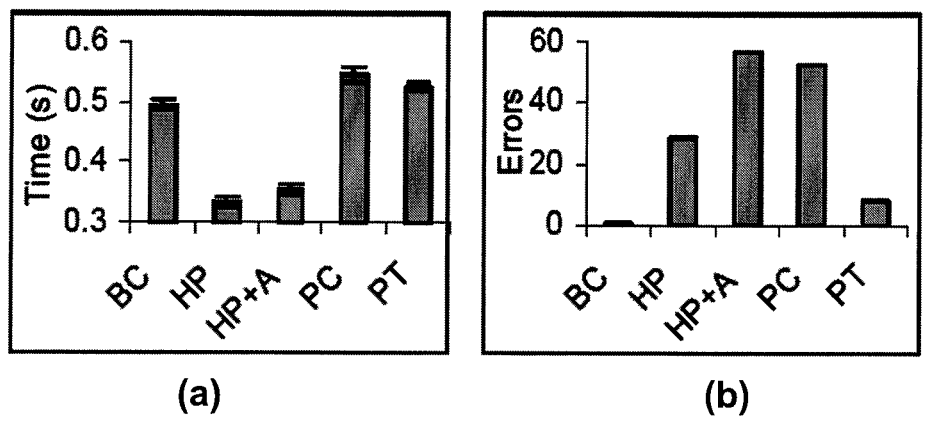
FIG. 30 is a graphic representation of mean completion time: (a) with standard error; and (b) with total errors for each interaction modes.

To make the data conform to the homogeneity requirements for ANOVA we used a natural-log transform on the completion time. Results showed main effect of mode ($p<0.01$) on trial completion time with $F_{4,29}=40.19$. Post-hoc pair-wise comparisons of Input mode yielded significant differences (all $p<0.01$) in trial completion times for all pairs except HardPress, HardPress with Audio and Pressure Click and Pressure Tap. Users were fastest with HardPress followed by HardPress with Audio, Button Press, Pressure Tap and Pressure Click. FIG. 30 (left) shows the mean completion time for each mode. There were in total 147 errors across all conditions for all trials. The distribution of errors is as shown in FIG. 30 (right). As with the previous study, a large number of the errors in the second study resulted from the form factor and foot-print of the pressure sensors.

Subjective Feedback

Figure 31:
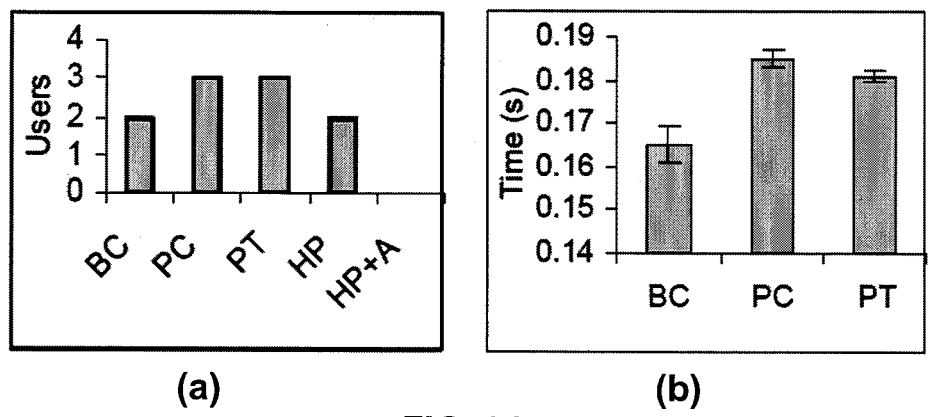
FIG. 31 is a graphic representation of: (a) an overall user ranking of double-click techniques, and (b) double-click timeouts for each interaction mode.

In terms of overall preference users were split between the techniques as shown in FIG. 31 (left) and there was no clear trend. However, approximately 80% of the users preferred some form of pressure clicking mechanism over button click. Surprisingly, none of the subjects preferred HardPress with Audio.

Discussion

We carried out two independent experiments; one for single-click and the other for double-click. Despite some of the hardware limitations of PButtons, the results of the first study shows that Pressure click and Pressure tap are as good as physical buttons for basic interactions such as clicking. In the second study we found that users were significantly faster when using HardPress for double-click and we found no difference between any of the single pressure clicking techniques. Overall the results of both studies show that PButtons is a potential alternative to mouse clicking and double-clicking. In this section we further discuss our observations from the studies. We also present several natural extensions that can be implemented to make PButtons an accessible tool for general users and present a brief list of design recommendations to designers.

Observations on Design of PButtons

Several design elements of PButtons have shown to cause a direct effect on the effectiveness of replacing mouse buttons with pressure sensing input.

Lack of Continuous Feedback

The feedback component of any closed-loop interaction is crucial to the proper functioning of an interactive system. In the case of button clicking, users are given auditory and haptic feedback. Surprisingly, our results did not show any benefits to effects of auditory feedback. This is particularly interesting given that pressure sensing hardware does not provide any accurate form of feedback on its own. Studies have suggested that at a minimum continuous visual feedback is necessary for the successfully operation of pressure based input. However, given the small reaction times that were observed, PButtons cannot take full advantage of continuous visual feedback to indicate whether the interaction has arrived at the adequate threshold for triggering a pressure click or HardPress. One possible alternative would be to include some form of feedback onto the mouse cursor to suggest then adequate thresholds have been attained.

Double-Click Timeouts

An influencing factor in double click performance is the double-click timeout. The timeout that is inherent in double-clicking is important for distinguishing a double click from two independent single clicks. In the traditional mouse button users can customize and calibrate the timeout value to optimize their method of operating a double-click. In the case of PButtons, Pressure click and Pressure tap techniques also rely on this timeout to distinguish a double-click from independent single-clicks. However, in our second study we deliberately did not impose any double-click timeouts for any of the interaction techniques. We had an infinite timeout so that we could gauge the average time-outs for different interaction techniques. FIG. 31 (right) shows the average delays for Button click, Pressure Click and Pressure Tap.

Hardpress does not rely on this timeout to distinguish the two. In Hardpress, users only need to cross a pressure level to activate double-click. However, we noticed that the threshold value for a pressure-level varied across users. In our experiments users performed about 10 practice trials before starting the experimental trails. We used the values from the practice trials to determine the adequate pressure units that would be necessary to activate a HardPress. In our study users were initiating a HardPress within a threshold that ranged from 65 to 185 pressure units. We envision that in an actual implementation of PButtons, users will be able to set the HardPressure threshold in a manner similar to double-click timeouts as is currently performed in the Window™ operating system.

PButtons Footprint

Observing users operate with pressure sensors we noticed that a large number of errors resulted from improperly positioning the finger on the pressure button. This adversely had an impact on performance as users would 'miss' the ideal pressure spot on the sensor. To alleviate this problem, a newer design that considers providing an equal amount of 'footprint' as that used for regular mouse buttons would improve pressure selection efficiency. This design alternative could also facilitate a feedback mechanism similar to mouse buttons.

Natural Extensions to PButtons

The design of PButtons proposed in this paper presents the possibility of performing a diverse range of operations with a mouse. In this section we briefly discuss three out of several possible natural extensions to PButtons that would make this concept a viable alternative to current methods of selection: pop-through pressure buttons, contextual interaction, and coverage of other basic transactions according to Buxton's three-state model [58]

Pop-Through Pressure Button

The limitations identified by observing the small footprint of the pressure button, led to the idea of possibly installing a sensor under the mouse button. This variation is very similar to the pop-through mouse that allows three states [83] but with the additional benefit of being able to access a larger number of modes or pressure values. The new pop-through pressure button design would facilitate single clicks with the mouse button. Users can then simulate a double-click using a HardPress mechanism by further applying pressure onto the pop-through pressure mouse. This pop-through setup would give users the flexibility to choose pressure interaction or button-based interaction. By pressing further onto the mouse, beyond the double-click activation level, the user can control a large amount of modes in the pressure space. We inferred that if a pop-through pressure button design is possible, then a large number of interactive features can be associated with a single pressure sensor.

To identify whether such a concept is even possible in the first place, we tested the pop-through pressure button concept by delegating the single click to the mouse button and the double click to the hard press. This assignment of functions (i.e. single click with a mouse button, and double click with pressure button) would lead naturally into the possibility of opening or accessing contextual menus beyond the HardPress activation levels. We were also interested in identifying whether performance values with a pop-through setup would be as good as those obtained in study 1 and study 2. Neither of the two studies investigated the mechanism of moving seamlessly from a discrete to a more continuous mode of selection. We carried out a pilot study to examine the possibility of going between through multiple forms of selection.

Results from this initial pilot are positive in suggesting that a pop-through pressure button is possible and can facilitate seamless movement between different modes of interaction. The mean time for HardPress was approximately 150 ms more than for a button single click however the mean time for a button double click was about 250 ms more than for button single click. These times are comparable to the averages reported for study 1 and 2 and we believe it is possible to incorporate the pressure sensors under the button to facilitate natural progressing from discrete to continuous selection and without affecting performance.

From Clicking to Invoking Contextual Pressure Menus

In the second study we did not use an upper pressure threshold for HardPress. Therefore, regardless of how hard users press the sensor, as long as they crossed the Hard-Press threshold the system activated a double click. This is useful in many current applications where users only use the left mouse button for single or double click actions. However, with pressure sensors users can also activate context menus in other applications like Paint or Word.

For HardPress to serve as a traditional button and to sup-port context sensitive pressure menus or other similar continuous pressure interactions HardPress should include an upper pressure threshold. When the user applies a pressure that is beyond a certain pressure value the system can then enter into a continuous pressure interaction mode. This would surmount to making the first pressure level correspond to a double click in a multi-level pressure interaction space. In [59] the authors several present techniques that could be adapted to make HardPress effectively control up to 64 pressure levels. HardPress proposed in this paper would work in conjunction with the techniques proposed in [59] since the pressure values used in HardPress appear in the lower pressure range (65-185). This allows designers to user the upper range of pressure values (>185 pressure units) for continuous pressure-based interaction. According to [59] this upper range is sufficient to control a large number of pressure levels.

Extending PButtons to Facilitate Basic Interactions

Figure 32:
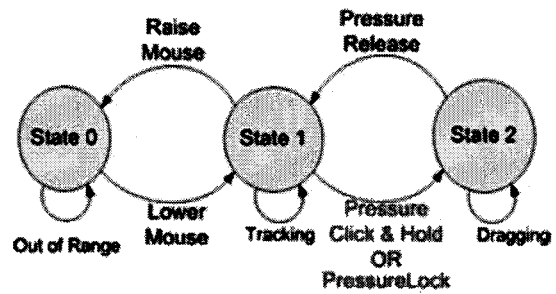
FIG. 32 is a representation of (a) state transitions for common operations with a mouse; and (b) a variation of Buxton's three-state model for facilitating the task of dragging with PButtons.

According to Buxton's three state model interactions with input devices can be modeled by three basic states: out-of-range (state 1), tracking (state 2) and dragging (state 3). When we consider the state transitions for positioning, single click, double click, dragging and clutching, we observe that, with the exception of dragging, all the other operations start at state 1 and return to state 1 (FIG. 32). These can all be handled with the current selection mechanisms. However, dragging necessitates remaining in state 2 and then returning to state 1 only when the drag operation is completed and the mouse button is released.

To model dragging with pressure sensors, PButtons would need to devise mechanisms to maintain the device in state 2. Although many designs are possible and would need to be investigated, we propose two alternatives: 1) Pressure Click&Hold; and 2) PressureLock. With Pressure Click&Hold the user would apply pressure beyond the current activation levels required for a HardPress. This would result in a switch to state 2 which could be maintained for as long as the user maintains pressure on the sensor. However, fine control over pressure levels can be challenging and PressureLock might be an easier alternative. Pressure-Lock would work similar to ClickLock that is available on most Windows XP™ based mice. Similar to ClickLock (which can be configured in the Control Panel in MSWindows™), PressureLock would allow users to drag and drop items without having to keep the pressure sensor held down while moving the mouse. Once turned on, the user has to dwell on the pressure sensor for a brief period when selecting an item to move. Afterwards, the user can release the mouse and drag the item. By tapping on the sensor the item would drop to its destination.

Design Recommendations

There are several lessons that designers can take from our experiments:

Pressure buttons can be used as a replacement to mouse buttons to facilitate discrete and continuous selection mechanisms;

Pressure values in the lower range of the pressure space are adequate for simulating single or double mouse click functions;

To improve accuracy, the footprint of the pressure buttons needs to be equivalent to that of mouse buttons;

A technique based on the principles of the HardPress should be used to simulate a double-click mechanism;

Seamless progressing from click, to double-click to controlling a wide range of pressure values is possible with a design similar to the pop-through pressure button.

We investigated the design and evaluation of pressure based interaction techniques for selection and action invocation. Pressure sensors can potentially be used instead of the left- and right-click buttons to perform basic single and double-click operations while at the same time allowing continuous pressure input for more complex applications. We overcame some of the limitations in pressure sensors associated with the lack of haptic and aural feedback to design a suite of techniques like Pressure Click, Pressure Tap and HardPress which we collectively call PButtons. In two user studies that compare PButtons with traditional mouse buttons we show that PButtons are as good as traditional buttons for single click and HardPress is significantly faster than traditional button for double-click.

In this study we only explored the performance of PButtons in terms of time and accuracy. In future we plan to evaluate the affect sensitivity of PButtons using the Self-Assessment Manikin. We also intend to carefully examine the design of PButtons that support a more seamless transition from clicks to continuous pressure interaction. To do this we would need to design compelling applications that can leverage all these features. Some examples of such applications have already been proposed by others [61,78].

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

REFERENCES

The following references are incorporated herein by reference:

1. Akamatsu, M., MacKenzie, I. S., & Hasbrouq, T. (1995). A comparison of tactile, auditory, and visual feedback in a pointing task using a mouse-type device. Ergonomics, 38, 816-827.

2. Balakrishnan, R., Baudel, T., Kurtenbach, G., and Fitzmaurice, G., The Rockin'Mouse: integral 3D manipulation on a plane. *Proc. CHI* 1997, 311-318.
3. Blasko, G. and Feiner, S., Single-handed interaction techniques for multiple pressure-sensitive strips. *Proc. CHI* 2004 *Extended Abstracts*, 1461-1464.
4. Forlines, C., Shen, C., and Buxton, B., Glimpse: a novel input model for mufti-level devices. *Proc. CHI* 2005 *Extended Abstracts*, 1375-1378.
5. Hinckley, K., Cutrell, E., Bathiche, S., and Muss, T., Quantitative analysis of scrolling techniques. *Proc. CHI* 2002, 65-72.
6. Hinckley, K., Sinclair, M., Hanson, E., Szeliski, R., and Conway, M., The VideoMouse: a camera-based multidegree-of-freedom input device. *Proc. UIST* 1999, 103112.
7. Kurtenbach, G., Buxton, W. User learning and performance with marking menus. *Proc. CHI* 1994, 258-264.
8. Li, Y., Hinckley, K., Guan, Z., and Landay, J. A., Experimental analysis of mode switching techniques in pen-based user interfaces. *Proc. CHI* 2005, 461-470.
9. MacKenzie, I. S., Soukoreff, R. W., and Pal, C., A twoball mouse affords three degrees of freedom. *Proc. CHI* 1997 *Extended Abstracts*, 303-304.
10. MightyMouse™ http://www.apple.com/mightymouse/
11. Mizobuchi, S., Terasaki, S., Keski-Jaskari, T., Nousiainen, J., Ryynanen, M., and Silfverberg, M., Making an impression: force-controlled pen input for handheld devices. *Proc. CHI* 2005 *Extended Abstracts*, 1661-1664.
12. Palm Mouse™, http://www.infogrip.com/
13. Greenberg, S. and Fitchett, C., Phidgets: easy development of physical interfaces through physical widgets. *Proc. UIST* 2001, 209-218.
14. Ramos, G. and Balakrishnan, R., Zliding: fluid zooming and sliding for high precision parameter manipulation. *Proc. UIST* 2005, 143-152.
15. Ramos, G., Boulos, M., and Balakrishnan, R., Pressure widgets. *Proc. CHI* 2004, 487-494.
16. Rekimoto, J. and Schwesig, C., PreSenseII: bidirectional touch and pressure sensing interactions with tactile feedback. *Proc. CHI* 2006 *Extended Abstracts*, 1253-1258.
17. Siio, L, Masui, T., and Fukuchi, K., Real-world interaction using the FieldMouse. *Proc. UIST* 1999, 113-119.
18. Srinivasan, M. A and Chen, J. S, Human performance in controlling normal forces of contact with rigid objects. *Winter Annual Meeting of the American Society of Mechanical Engineers* 1993, Vol. 49, 119-125.
19. Zeleznik, R., Miller, T., and Forsberg, A., Pop through mouse button interactions. *Proc. UIST* 2001, 195-196.
20. Zhai, S., Smith, B., and Selker, T., Improving Browsing Performance: a study of four input devices for scrolling and pointing tasks. *Proc. IFIP HCI* 1997, 286-293.
21. Zhao, S., Agrawala, M., and Hinckley, K., Zone and polygon menus: using relative position to increase the breadth of mufti-stroke marking menus. *Proc. CHI* 2006, 1077-1086.
22. Bederson, B. B., Fisheye mnus. *Proc. UIST* 2000, 217-226.
23. Blanch, R., Guiard, Y., and Beaudouin-Lafon, M. Semantic pointing: Improving target acquisition with control-display ratio adaptation. Proc CHI 2004, 519-526.
24. Cechanowicz, J., Irani, P., and Subramanian, S., Augmenting the mouse with pressure sensitive input. Proc. CHI 2007, 1385-1394.
25. Furnas, G. W., Generalized fisheye views. Proc. CHI 1986, 16-23.
26. Gutwin, C. Improving focus targeting in interactive fisheye views. Proc. CHI 2002, 267-274.
27. Mizobuchi, S., Terasaki, S., Keski-Jaskari, T., Nousiainen, J., Ryynanen, M., and Silfverberg, M., Making an impression: Force-controlled pen input for handheld devices. Proc. CHI 2005 Extended Abstracts, 1661-1664.
28. Ramos, G. and Balakrishnan, R., Zliding: Fluid zooming and sliding for high precision parameter manipulation. Proc. UIST 2005, 143-1 52.
29. Ramos, G., Boulos, M., and Balakrishnan, R., Pressure widgets. Proc. CHI 2004, 487-494.
30. Schieber, M. H., and Santello, M., Hand function: Peripheral and central constraints on performance, J. of App. Phys., 96 (2004) 2293-230.
31. Balakrishnan, R., Baudel, T., Kurtenbach, G., and Fitzmaurice, G., The Rockin'Mouse: integral 3D manipulation on a plane. Proc. CHI 1997, 311-318.
32. Cechanowicz, J., Irani, P., and Subramanian, S. Augmenting the mouse with pressure sensitive input. Proc. CHI2007, 1385-1394.
33. Forlines, C., Shen, C., and Buxton, B., Glimpse: a novel input model for multi-level devices. Proc. CHI2005 Extended Abstracts, 1375-1378.
34. Kattinakere, R. S., Grossman, T., and Subramanian, S. 2007. Modeling steering within above-the-surface interaction layers. Proc. CHI2007, 317-326.
35. Kruger, R., Carpendale, S., Scott, S. D., and Tang, A. Fluid integration of rotation and translation. Proc. CHI 2005, 601-610.
36. Kurtenbach, G., Buxton, W. User learning and performance with marking menus. Proc. CHI 1994, 258-264.
37. MacKenzie, I. S., Soukoreff, R. W., and Pal, C., A two-ball mouse affords three degrees of freedom. Proc. CHI 1997 Extended Abstracts, 303-304.
38. Masliah, M. R. and Milgram, P. Measuring the allocation of control in a 6 degree-of-freedom docking experiment. Proc. CHI2000, 25-32.
39. MightyMouse™ http:||www.apple.com|mightymouse|
40. Mizobuchi, S., Terasaki, S., Keski-Jaskari, T., Nousiainen, J., Ryynanen, M., and Silfverberg, M., Making an impression: force-controlled pen input for handheld devices. Proc. CHI2005 Extended Abstracts, 1661-1664.
41. Greenberg, S. and Fitchett, C., Phidgets: easy development of physical interfaces through physical widgets. Proc. UIST 2001, 209-218.
42. Jacob, R. J. and Sibert, L. E. The perceptual structure of multidimensional input device selection. Proc. CHI 1992, 211-218.
43. Jacob, R. J., Sibert, L. E., McFarlane, D. C., and Mullen, M. P. 1994. Integrality and separability of input devices. ACM Trans. Comput.-Hurn. Interact. 1(1), 3-26.
44. Ramos, G. and Balakrishnan, R., Zliding: fluid zooming and sliding for high precision parameter manipulation. Proc. UIST 2005, 143-152.
45. Ramos, G. A. and Balakrishnan, R. Pressure marks. Proc. CHI 2007. 1375-1384.
46. Ramos, G., Boulos, M., and Balalcrishnan, R., Pressure widgets. Proc. CHI2004, 487-494.
47. Shi, K., Subramanian, S., Irani, PressureFish: A Method to Ithprove Control of Discrete Pressure-based Input, Proc. CHI 2008, to appear.
48. Wang, Y., MacKenzie, C. L., Summers, V. A., and Booth, K. S. The structure of object transportation and orientation in human-computer interaction. Proc. CHI 1998, 312-319.
49. Zeleznik, R., Miller, T., and Forsberg, A., Pop through mouse button interactions. Proc. UIST 2001, 195-196.

50. Zhai, S. User Performance in Relation to 3D Input Device Design, Computer Graphics 32(4), November 1998. pp 50-54.
51. Zhai, S., Milgram, P., and Buxton, W. The influence of muscle groups on performance of multiple degree-offree-dom input. Proc. CHI 1996, 308-315.
52. Zhao, S., Agrawala, M., and Hinckley, K., Zone and polygon menus: using relative position to increase the breadth of multi-stroke marking menus. Proc. CHI 2006, 1077-1086.
53. Akamatsu, M., MacKenzie, I. S., & Hasbrouq, T. (1995). A comparison of tactile, auditory, and visual feedback in a pointing task using a mouse-type device. Ergonomics, 38, 816-827.
54. Albinsson, P. and Zhai, S. 2003. High precision touch screen interaction. Proc. CHI 2003, 105-112.
55. Benko, H., Wilson, A. D., and Baudisch, P. 2006. Precise selection techniques for multi-touch screens. Proc CHI 2006, 1263-1272.
56. Blaskó, G. and Feiner, S., Single-handed interaction techniques for multiple pressure-sensitive strips. Proc. CHI 2004 Extended Abstracts, 1461-1464.
57. Bohan, M. and Chaparro, A. 1998. To click or not to click: a comparison of two target-selection methods for HCI. Proc. CHI 98, 219-220.
58. Buxton, W. 1990. A three-state model of graphical input. In Proceedings of the IFIP Tc13 Third international Conference on Human-Computer interaction, 449-456.
59. Cechanowicz, J., Irani, P., Subramanian, S. 2007. Augmenting the Mouse with Pressure-Based Input, to appear at CHI'07.
60. Dillon, R. F., Edey, J. D., and Tombaugh, J. W. 1990. Measuring the true cost of command selection: techniques and results. In Proceedings of the SIGCHI Conference on Human Factors in Computing Systems, NY, 19-26.
61. Edward C. Clarkson, Shwetak N. Patel, Jeffrey S. Pierce, and Gregory D. Abowd 2006, Exploring Continuous Pressure Input for Mobile Phones, GVU Tech. Report; GIT-GVU-06-20. http://hdl.handle.net/1853/ 13 138.
62. Fagarasanu, M. & Kumar, S. 2003. Carpal tunnel syndrome due to keyboarding and mouse tasks: a review. International Journal of Industrial Ergonomics, 31, 119-136.
63. Forlines, C., Shen, C., and Buxton, B., Glimpse: a novel input model for multi-level devices. Proc. CHI 2005 Extended Abstracts, 1375-1378.
64. GentleMouse™ http://www.gentlemouse.com/
65. Greenberg, S. and Fitchett, C., Phidgets: easy development of physical interfaces through physical widgets. Proc. UIST 2001, 209-218.
66. Guimbretiere, F., Martin, A., and Winograd, T. 2005. Benefits of merging command selection and direct manipulation. ACM Trans. Comput.-Hum. Interact. 12, 3 (September 2005), 460-476.
67. Hinckley, K., Guimbretiere, F., Baudisch, P., Sarin, R., Agrawala, M., and Cutrell, E. 2006. The springboard: multiple modes in one spring-loaded control. In Proceedings of the SIGCHI Conference on Human Factors in Computing Systems, 181-190.
68. Hourcade, J. P. and Berkel, T. R. 2006. Tap or touch?: pen-based selection accuracy for the young and old. Proc. CHI 2006 Extended Abstracts, 88 1-886.
69. Inkpen, K. M. 2001. Drag-and-drop versus point-and-click mouse interaction styles for children. ACM To-CHI. 8 (1), 1-33.
70. Li, Y., Hinckley, K., Guan, Z., and Landay, J. A., Experimental analysis of mode switching techniques in pen-based user interfaces. Proc. CHI 2005, 461-470.
71. MacKenzie, I. S. and Oniszczak, A. 1998. A comparison of three selection techniques for touchpads. Proc. CHI '98, 336-343.
72. MightyMouse™ http://www.apple.com/mightymouse/
73. Mizobuchi, S., Terasaki, S., Keski-Jaskari, T., Nousiainen, J., Ryynanen, M., and Silfverberg, M., Making an impression: force-controlled pen input for handheld devices. Proc. CHI 2005 Extended Abstracts, 1661-1664.
74. Palm Mouse™, http://www.infogrip.com/
75. Potter, R. L., Weldon, L. J., and Shneiderman, B. 1988. Improving the accuracy of touch screens: an experimental evaluation of three strategies. Proc. CHI 88, 27-32.
76. Ramos, G. and Balakrishnan, R., Zliding: fluid zooming and sliding for high precision parameter manipulation. Proc. UIST 2005, 143-152.
77. Ramos, G. and Balakrishnan, R. 2007. Pressure Marks, to appear at CHI'07.
78. Ramos, G., Boulos, M., and Balakrishnan, R., Pressure widgets. Proc. CHI 2004, 487-494.
79. Rekimoto, J. and Schwesig, C., PreSenseII: bi-directional touch and pressure sensing interactions with tactile feedback. Proc. CHI 2006 Extended Abstracts, 1253-1258.
80. Ren, X. and Moriya, S. 2000. Improving selection performance on pen-based systems: a study of pen-based interaction for selection tasks. ACM ToCHI. 7(3), 384-416.
81. Sears, A. and Shneiderman, B. 1991. High precision touchscreens: design strategies and comparisons with a mouse. Int. J. Man-Mach. Stud. 34, 4 (April 1991), 593-613.
82. Srinivasan, M. A and Chen, J. S, Human performance in controlling normal forces of contact with rigid objects. Winter Annual Meeting of the American Society of Mechanical Engineers 1993, Vol. 49, 1 19-125.
83. Zeleznik, R., Miller, T., and Forsberg, A., Pop through mouse button interactions. Proc. UIST 2001, 195-196.

The invention claimed is:
1. An input device for an electronic device comprising:
a housing;
electronic circuitry in the housing arranged to detect user inputs and generate control signals corresponding to said user inputs to be transmitted to the electronic device;
the electronic circuitry comprising:
a first switch arranged to generate a first control signal when depressed by the user;
a second switch arranged to generate a second control signal when depressed by the user;
at least the second switch comprising a pressure sensitive switch arranged to generate continuous raw analog pressure values and convert the raw analog pressure values into at least two different identifiable discrete pressure ranges corresponding to different pressures being applied by the user in depressing the pressure sensitive switch by dividing an entire range of the pressure values non-linearly into discrete pressure units in which non-linearity of the discrete pressure units is controlled using a non-linear discretization function;
the non-linear discretization function comprising a quadratic function centered at a lowermost pressure value such that a lowermost one of the discrete pressure ranges contains a greater number of pressure units than an uppermost one of the discrete pressure ranges.

2. The input device according to claim 1 for an electronic device comprising a plurality of sequential selection items arranged in a plurality of groups, wherein the pressure sensitive switch is arranged to generate an advancing control signal arranged to advance selection of one group through the plurality of groups when the pressure sensitive switch is momentarily depressed and wherein the discrete pressure ranges are arranged to correspond to the selection items of the selected group when continuous pressure is applied to the pressure sensitive switch for selecting one of the selection items within the selected group.

3. The input device according to claim 2 wherein the electronic circuitry comprises two pressure sensitive switches, the pressure sensitive switches being arranged to generate an advancing control signal arranged to advance selection of one group through the plurality of groups when the pressure sensitive switch is momentarily depressed in opposing directions relative to one another and wherein the discrete pressure ranges of each pressure sensitive switch are arranged to correspond to the selection items of the selected group when continuous pressure is applied to the pressure sensitive switch for selecting one of the selection items within the selected group.

4. The input device according to claim 1 for use with an electronic device including a plurality of sequential selection items to be selected in a range from a first selection item to a last selection item, wherein both the first switch and the second switch comprise a pressure sensitive switch arranged to generate continuous pressure values in at least two different identifiable discrete pressure ranges corresponding to different pressures being applied by the user in depressing the pressure sensitive switch, each discrete pressure range of at least one of the pressure sensitive switches corresponding to one of the selection items whereby increasing pressure applied to said at least one pressure sensitive switch advances the selection item being selected towards the last selection item and reducing pressure applied to said at least one pressure sensitive switch returns the selection item being selected towards the first selection item.

5. The input device according to claim 1 for an electronic device comprising a plurality of sequential selection items arranged in cascading levels, wherein both the first switch and the second switch comprise a pressure sensitive switch arranged to generate continuous pressure values in at least two different identifiable discrete pressure ranges corresponding to different pressures being applied by the user in depressing the pressure sensitive switch, the discrete pressure ranges of the pressure sensitive switches being arranged to correspond to the selection items of alternating cascading levels when continuous pressure is applied to the pressure sensitive switch for selecting one of the selection items within a selected level, and wherein switching applied pressure between the two pressure switches is arranged to generate a control signal which confirms entry to the electronic device of the selected item within each level.

6. The input device according to claim 1 wherein both the first switch and the second switch comprise a pressure sensitive switch arranged to generate continuous pressure values in at least two different identifiable discrete pressure ranges corresponding to different pressures being applied by the user in depressing the pressure sensitive switch and wherein there is provided a third switch comprising a two state button.

7. The input device according to claim 1 wherein said quadratic function is given by the following equation, $$y = \text{floor}\left(\frac{(x^2 * l)}{R^2}\right)$$

where x is the raw pressure value from the pressure switch, l is the number of pressure ranges, and R is the total number of raw pressure values.

8. The input device according to claim 1 wherein the electronic circuitry includes a tracking mechanism arranged to track movement of the housing relative to a supporting surface and wherein the pressure switch and the tracking mechanism are arranged to controllably vary two different variable functions simultaneously.

9. The input device according to claim 1 wherein the pressure switch is operable in a first mode in which a variable function associated with the pressure switch is arranged to be varied in a first direction responsive to increased pressure applied to the switch and a second mode in which the variable function is arranged to be varied in a second direction opposite to the first direction responsive to increased pressure applied to the switch.

10. The input device according to claim 1 for an electronic device comprising a selection function and an action initiation function wherein the pressure switch is arranged to generate a first signal responsive to a first user interaction and a second signal responsive to a second user interaction, the pressure switch being arranged to generate a selection signal responsive to the first and second signals being generated in which the selection signal is identifiable as a selection by the selection function of the electronic device.

11. A method of providing an input to an electronic device, the method comprising:
   a) providing an input device comprising:
      i) a housing; and
      ii) electronic circuitry in the housing arranged to detect user inputs and generate control signals corresponding to said user inputs to be transmitted to the electronic device, in which the electronic circuitry includes a pressure switch arranged to generate a control signal when depressed by the user comprising continuous pressure values in at least two different identifiable discrete pressure ranges corresponding to different pressures being applied by the user in depressing the pressure sensitive switch; and
   b) dynamically dividing the entire range of pressure values into discrete pressure units with a dynamic discretization function to distinguish among pressure values in discrete pressure ranges corresponding to different pressures being applied by the user to the pressure sensitive switch such that a currently selected one of the discrete pressure units is always arranged to be larger between respective upper and lower pressure value limits than remaining non-selected discrete pressure units by:
      i) dividing the range of pressure values into a first set of discrete pressure units according to a first selected one of the discrete pressure units; and
      ii) subsequently dividing the range of pressure values into a second set of discrete pressure units different from the first set of discrete pressure units according to a second selected one of the discrete pressure units different from the first selected one of the discrete pressure units.

12. The method according to claim 11 wherein the dynamic discretization function comprises a fisheye function given by the following equation, $$y = \begin{cases} \text{floor}\left(\dfrac{(x-r)*(l-1)}{R-r}\right)+1 & x > r - \dfrac{R-r}{l-1} \\ 0 & x \leq r - \dfrac{R-r}{l-1} \end{cases}$$

where x is the raw pressure value from the pressure switch, l is the number of pressure ranges, r is the fisheye radius, and R is the total number of raw pressure values.

13. A method of providing an input selection to an electronic device comprising a plurality of sequential selection items, the method comprising:
 a) providing the plurality of sequential selection items arranged in a plurality of sequential groups in which each sequential group contains a respective portion of the sequential selection items;
 b) providing an input device comprising:
  i) a housing; and
  ii) electronic circuitry in the housing arranged to detect user inputs and generate control signals corresponding to said user inputs to be transmitted to the electronic device in which the electronic circuitry comprises at least one pressure sensitive switch;
  iii) said at least one pressure sensitive switch being arranged to generate an advancing control signal arranged to advance selection of one group through the plurality of groups when said at least one pressure sensitive switch is momentarily depressed for a duration which is less than a prescribed duration; and
  iv) said at least one pressure sensitive switch being arranged to generate continuous pressure values in at least two different identifiable discrete pressure ranges corresponding to different pressures being applied by the user in depressing said at least one pressure sensitive switch when continuous pressure is applied to said at least one pressure sensitive switch;
 c) momentarily depressing said at least one pressure sensitive switch to select a first one of the sequential groups such that the discrete pressure ranges of said at least one pressure sensitive switch correspond only to the selection items of the first one of the sequential groups to enable selection from the selection items within the first one of the sequential groups using continuous pressure applied to said at least one pressure sensitive switch; and
 d) momentarily depressing said at least one pressure sensitive switch to select a second one of the sequential groups such that the discrete pressure ranges of said at least one pressure sensitive switch change to correspond only to the selection items of the second one of the sequential groups to enable selection from the selection items within the second one of the sequential groups using continuous pressure applied to said at least one pressure sensitive switch.

14. The method according to claim 13 wherein said at least one pressure sensitive switch comprises a first pressure sensitive switch and a second pressure sensitive switch, the first and second pressure sensitive switches being arranged to generate respective advancing control signals to advance selection of one group through the plurality of groups in opposing directions relative to one another when the pressure sensitive switches are momentarily depressed and wherein the discrete pressure ranges of each pressure sensitive switch are arranged to correspond to the selection items of the selected group when continuous pressure is applied to the pressure sensitive switch for selecting one of the selection items within the selected group.

15. A method of providing an input selection to an electronic device comprising a plurality of sequential selection items, the method comprising:
 a) providing the plurality of sequential selection items arranged in a plurality of sequential groups in which each group contains a respective portion of the sequential selection items;
 b) providing an input device comprising:
  i) a housing; and
  ii) electronic circuitry in the housing arranged to detect user inputs and generate control signals corresponding to said user inputs to be transmitted to the electronic device in which the electronic circuitry comprises a first switch arranged to generate a first control signal when depressed by the user and a second switch arranged to generate a second control signal when depressed by the user;
  ii) the first switch being arranged to generate an advancing control signal arranged to advance selection of one group through the plurality of groups when the first switch is momentarily depressed; and
  iii) the second switch comprising a pressure sensitive switch arranged to generate continuous pressure values in at least two different identifiable discrete pressure ranges corresponding to different pressures being applied by the user in depressing the pressure sensitive switch;
 c) momentarily depressing the first switch to select a first one of the sequential groups such that the discrete pressure ranges of the second switch correspond only to the selection items of the first one of the sequential groups to enable selection from the selection items within the first one of the sequential groups using continuous pressure applied to the second switch; and
 d) momentarily depressing the first switch to select a second one of the sequential groups such that the discrete pressure ranges of the second switch change to correspond only to the selection tem of the second one of the sequential groups to enable selection from the selection items within the second one of the sequential groups using continuous pressure applied to the second switch.

16. The method according to claim 15 wherein both the first switch and the second switch comprise pressure sensitive switches arranged to generate continuous pressure values in at least two different identifiable discrete pressure ranges corresponding to different pressures being applied by the user in depressing the pressure sensitive switch and wherein the first switch is arranged to generate the advancing control signal when momentarily depressed for a duration which is less than a prescribed duration.

* * * * *